United States Patent
Mori et al.

(10) Patent No.: US 11,964,713 B2
(45) Date of Patent: Apr. 23, 2024

(54) VEHICLE STEERING DEVICE

(71) Applicant: NSK Ltd., Tokyo (JP)

(72) Inventors: Kenji Mori, Kanagawa (JP); Sakiya Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 190 days.

(21) Appl. No.: 17/595,568

(22) PCT Filed: May 25, 2020

(86) PCT No.: PCT/JP2020/020606
§ 371 (c)(1),
(2) Date: Nov. 19, 2021

(87) PCT Pub. No.: WO2020/241591
PCT Pub. Date: Dec. 3, 2020

(65) Prior Publication Data
US 2022/0315103 A1    Oct. 6, 2022

(30) Foreign Application Priority Data

| May 29, 2019 | (JP) | 2019-100124 |
| May 29, 2019 | (JP) | 2019-100643 |
| Jun. 12, 2019 | (JP) | 2019-109168 |

(51) Int. Cl.
*B62D 6/00* (2006.01)
*B62D 6/02* (2006.01)

(52) U.S. Cl.
CPC .......... *B62D 6/002* (2013.01); *B62D 6/008* (2013.01); *B62D 6/02* (2013.01)

(58) Field of Classification Search
CPC .......... B62D 6/002; B62D 6/008; B62D 6/02; B62D 5/061; B62D 5/001; B62D 5/005;
(Continued)

(56) References Cited

U.S. PATENT DOCUMENTS

| 6,725,965 B2 | 4/2004 | Kogiso et al. |
| 2007/0205040 A1 | 9/2007 | Miyasaka et al. |

(Continued)

FOREIGN PATENT DOCUMENTS

| DE | 19908323 A1 * | 8/2000 | ............... B62D 3/12 |
| JP | 61-092964 A | 5/1986 | |

(Continued)

OTHER PUBLICATIONS

Office Action dated Oct. 18, 2022 from the Japanese Patent Office in JP Application No. 2019-100124.

(Continued)

*Primary Examiner* — Adam R Mott
*Assistant Examiner* — Erick T. Detweiler
(74) *Attorney, Agent, or Firm* — Sughrue Mion, PLLC

(57) ABSTRACT

A vehicle steering device capable of stabilizing behavior of a vehicle when traveling backward. The device includes a reaction force device configured to apply steering reaction force to a wheel, a drive device configured to turn tires in accordance with steering of the wheel, and a control unit configured to control the reaction force device and the drive device. The control unit includes a turning ratio map unit configured to set a turning ratio gain in accordance with the vehicle speed of a vehicle, and a target turning angle generation unit configured to generate a target turning angle by multiplying the steering angle of the wheel by the turning ratio gain. The turning ratio gain at backward traveling of the vehicle is equal to or larger than the turning ratio gain at forward traveling of the vehicle.

14 Claims, 55 Drawing Sheets

(58) Field of Classification Search
CPC . B62D 6/00; B62D 5/04; B62D 5/008; B62D 5/006; B62D 7/09; B62D 7/1509; B62D 5/046; B60W 50/085; B60W 10/20
See application file for complete search history.

(56) References Cited

U.S. PATENT DOCUMENTS

| | | | |
|---|---|---|---|
| 2013/0190986 A1* | 7/2013 | Nishimori | B62D 6/007 |
| | | | 701/41 |
| 2018/0050723 A1 | 2/2018 | Jung | |
| 2019/0270482 A1 | 9/2019 | Nakakuki et al. | |
| 2020/0180681 A1 | 6/2020 | Toyama et al. | |
| 2020/0307680 A1 | 10/2020 | Kakimoto et al. | |
| 2020/0369316 A1 | 11/2020 | Tsubaki et al. | |

FOREIGN PATENT DOCUMENTS

| | | |
|---|---|---|
| JP | 10-291484 A | 11/1998 |
| JP | 10-297517 A | 11/1998 |
| JP | 2001-026277 A | 1/2001 |
| JP | 2002-284027 A | 10/2002 |
| JP | 2003-072582 A | 3/2003 |
| JP | 2004-314909 A | 11/2004 |
| JP | 2006-199240 A | 8/2006 |
| JP | 3891275 B2 | 3/2007 |
| JP | 2007-230360 A | 9/2007 |
| JP | 2010-280312 A | 12/2010 |
| JP | 2011-105103 A | 6/2011 |
| JP | 2012-035708 A | 2/2012 |
| JP | 2014-201269 A | 10/2014 |
| JP | 2018-47725 A | 3/2018 |
| JP | 2020-90180 A | 6/2020 |
| JP | 2020-163990 A | 10/2020 |
| KR | 10-2018-0019820 A | 2/2018 |
| WO | 2019/082835 A1 | 5/2019 |

OTHER PUBLICATIONS

International Search Report for PCT/JP2020/020606 dated Jul. 14, 2020 (PCT/ISA/210).
Communication dated Nov. 22, 2022, issued in Japanese Application No. 2019-100643.
Communication dated Dec. 20, 2022, issued in Japanese Application No. 2019-109168.
Extended European Search Report issued Nov. 6, 2023 in European Application No. 20813711.7.

* cited by examiner

VEHICLE STEERING DEVICE

CROSS REFERENCE TO RELATED APPLICATIONS

This application is a National Stage of International Application No. PCT/JP2020/020606 filed May 25, 2020, claiming priorities based on Japanese Patent Application No. 2019-100124 filed May 29, 2019, Japanese Patent Application No. 2019-100643 filed May 29, 2019 and Japanese Patent Application No. 2019-109168 filed Jun. 12, 2019.

FIELD

The present invention relates to a vehicle steering device.

BACKGROUND

<First Background Art>

A steer-by-wire (SBW) vehicle steering device in which a force feedback actuator (FFA; steering mechanism) through which a driver performs steering and a road wheel actuator (RWA; rotation mechanism) configured to steer a vehicle are mechanically separated from each other is available as a vehicle steering device. Such a SBW vehicle steering device has a configuration in which the steering mechanism and the rotation mechanism are electrically connected to each other through a control unit and control between the steering mechanism and the rotation mechanism is performed by electric signals. For example, Patent Literature 1 below discloses that, in a SBW vehicle steering device, a rudder angle ratio of the rotational speed (real steering angular velocity) of a rotational shaft on a steering device side and the rotational speed (real turning angular velocity) of a rotational shaft on a rotation device side is changed in accordance with the vehicle speed.

<Second Background Art>

An electric power steering device (EPS) as a vehicle steering device applies assist force (steering supplementary force) to a steering system of a vehicle by rotational force of a motor. The EPS applies drive power of the motor controlled by electric power supplied from an inverter, as assist force to a steering shaft or a rack shaft through a transmission mechanism including a deceleration mechanism. For example, a power steering device configured to gradually increase the steering supplementary force from that in normal operation at low-speed driving such as a parking operation and gradually decrease the increased steering supplementary force to the steering supplementary force in normal operation when parking has ended is disclosed (for example, Patent Literature 2).

<Third Background Art>

A steer-by-wire (STB) vehicle steering device in which a force feedback actuator (FFA; steering mechanism) through which a driver performs steering and a road wheel actuator (RWA; rotation mechanism) configured to steer a vehicle are mechanically separated from each other is available as a vehicle steering device. Such a SBW vehicle steering device has a configuration in which the steering mechanism and the rotation mechanism are electrically connected to each other through a control unit and control between the steering mechanism and the rotation mechanism is performed by electric signals. In the SBW vehicle steering device, since the steering mechanism and the rotation mechanism are mechanically separated from each other as described above, a steering angle corresponding to a structurally determined maximum operation angle (hereinafter also referred to as a "maximum turning angle") of a mechanical tire angle needs to be determined by electrical control. For example, Patent Literature 3 below discloses that, in a SBW vehicle steering device, steering reaction force equivalent to steering torque is provided to set the wheel to a locked state when a predetermined steering angle is reached.

CITATION LIST

Patent Literature

Patent Literature 1: Japanese Patent Laid-open No. 2014-201269
Patent Literature 2: Japanese Patent No. 3891275
Patent Literature 3: Japanese Patent Laid-open No. 2010-280312

SUMMARY

Technical Problem

<Problem Related to First Background Art>

Recently, a back monitor for monitoring a situation behind a vehicle during backward traveling of the vehicle has been mounted on the vehicle in an increasing number of cases. However, the visibility of the back monitor has limitations, and it is impossible to determine a situation behind the vehicle only from a video on the back monitor. Thus, during backward traveling of the vehicle, the driver needs to visually check safety behind the vehicle in addition to a video on the back monitor. When the ratio of the turning angle of the tires relative to the steering angle of the wheel is small, the grip on the wheel need to be changed in some cases, but during backward traveling of the vehicle, the driver is likely to lose the posture since the driver visually checks safety behind the vehicle while operating the wheel, and accordingly, behavior of the vehicle potentially becomes unstable as the driver changes the grip on the wheel.

The present invention is made in view of the above-described problem and intended to provide a vehicle steering device capable of stabilizing behavior of a vehicle when traveling backward.

<Problem Related to Second Background Art>

Typically, control to reduce steering supplementary force is performed at low-speed driving. However, when the steering supplementary force is simply reduced at low-speed driving, it is difficult for a driver to recognize a steering angle at which the rudder angle is near zero. In particular, for example, during backward traveling (reversing) of a vehicle to park the vehicle in a parking area or the like, it is difficult for the driver to have a steering sense when visually checking safety behind the vehicle.

The present invention is made in view of the above-described problem and intended to provide a vehicle steering device capable of improving steering feeling.

<Problem Related to Third Background Art>

In the above-described conventional technologies, correction of a target turning angle in accordance with the vehicle speed is described, but a steering angle at which the wheel is set to a locked state is constant. Thus, it is thought that the steering angle and the maximum turning angle for setting the locked state do not match each other, depending on a condition.

The present invention is made in view of the above-described problem and intended to provide a vehicle steering device capable of restricting an operation of a wheel in accordance with a structurally determined mechanically maximum turning angle.

Solution to Problem

<Solution to Problem Related to First Background Art>

To achieve the above object, a vehicle steering device comprising: a reaction force device configured to apply steering reaction force to a wheel; a drive device configured to turn tires in accordance with steering of the wheel; and a control unit configured to control the reaction force device and the drive device, wherein the control unit includes a turning ratio map unit configured to set a turning ratio gain in accordance with a vehicle speed of a vehicle, and a target turning angle generation unit configured to generate a target turning angle by multiplying a steering angle of the wheel by the turning ratio gain, and the turning ratio gain at backward traveling of the vehicle is equal to or larger than the turning ratio gain at forward traveling of the vehicle.

With the above-described configuration, it is possible to stabilize behavior of a vehicle when traveling backward.

As a desirable aspect of the vehicle steering device, it is preferable that, when a first region is defined to be a region in which the magnitude of the vehicle speed at forward traveling of the vehicle is equal to or larger than zero and smaller than a first vehicle speed, a first gain be defined to be the turning ratio gain in the first region, that a second region be defined to be a region in which the magnitude of the vehicle speed at forward traveling of the vehicle is equal to or larger than the first vehicle speed and smaller than a second vehicle speed higher than the first vehicle speed, that a second gain be defined to be the turning ratio gain in the second region, that a third region be defined to be a region in which the magnitude of the vehicle speed at forward traveling of the vehicle is equal to or larger than the second vehicle speed, that a third gain be defined to be the turning ratio gain in the third region, that a fourth region be defined to be a region in which the magnitude of the vehicle speed at backward traveling of the vehicle is larger than zero and smaller than a third vehicle speed, that a fourth gain be defined to be the turning ratio gain in the fourth region, that a fifth region be defined to be a region in which the magnitude of the vehicle speed at backward traveling of the vehicle is equal to or larger than the third vehicle speed and smaller than a fourth vehicle speed higher than the third vehicle speed, that a fifth gain be defined to be the turning ratio gain in the fifth region, that a sixth region be defined to be a region in which the magnitude of the vehicle speed at backward traveling of the vehicle is equal to or larger than the fourth vehicle speed, and that a sixth gain be defined to be the turning ratio gain in the sixth region, that the fourth gain be a constant value larger than the first gain, the second gain, the third gain, the fifth gain, and the sixth gain. Accordingly, it is possible to reduce the frequency that the driver changes the grip on the wheel during backward traveling of the vehicle. In addition, it is possible to stably drive the vehicle to park the vehicle.

As a desirable aspect of the vehicle steering device, it is preferable that the third gain be a constant value, that the first gain be a constant value larger than the third gain and smaller than the fourth gain, and that the second gain gradually decrease in a range from the first gain to the third gain as the magnitude of the vehicle speed at forward traveling of the vehicle increases from the first vehicle speed. Accordingly, in a low-speed range at forward traveling of the vehicle, it is possible to stably travel on a crossroad, a crank-shaped road, or any other road having a narrow road width, and reduce a load on the driver. In addition, in a high-speed range at forward traveling of the vehicle, it is possible to stabilize behavior of the vehicle. In addition, it is possible to prevent abrupt change of the turning angle of the tires at forward traveling of the vehicle, thereby providing stable steering feeling.

As a desirable aspect of the vehicle steering device, it is preferable that the sixth gain be a constant value equal to or larger than the third gain and smaller than the fourth gain; and that the fifth gain gradually decrease in a range from the fourth gain to the sixth gain as the magnitude of the vehicle speed at backward traveling of the vehicle increases from the third vehicle speed. Accordingly, it is possible to stabilize behavior of the vehicle at backward traveling of the vehicle. In addition, it is possible to prevent abrupt change of the turning angle of the tires at backward traveling of the vehicle, thereby providing stable steering feeling.

<Solution to Problem Related to Second Background Art>

To achieve the above-described intention, a vehicle steering device according to an aspect of the present invention is a vehicle steering device configured to assist and control a steering system of a vehicle by driving and controlling a motor configured to assist steering force, the vehicle steering device has, as driving modes of the vehicle, a first mode and a second mode different from the first mode, the change rate of target steering torque of the motor in the second mode is equal to or larger than that in the first mode in a predetermined region in which the absolute value of the steering angle of a wheel is equal to or larger than zero, and the change rate of the target steering torque in the second mode is smaller than that in the first mode in a region other than the predetermined region.

As a desirable aspect of the vehicle steering device, it is preferable that: the vehicle steering device include a determination unit configured to determine the second mode when having sensed a predetermined operation, and a target steering torque generation unit configured to generate a first torque signal that increases along a curve having a change rate gradually decreasing as the absolute value of the steering angle of the wheel increases, multiply a second torque signal generated based on the first torque signal by a correction gain to generate a third torque signal, and add a fourth torque signal to the third torque signal to generate the target steering torque; and that in the second mode, the target steering torque generation unit generate a positive correction gain smaller than one and generate a fourth torque signal having a gradient larger than that of the first torque signal when the absolute value of the steering angle is zero. With the above-described configuration, it is possible to reduce a load on the driver in the second mode, thereby improving steering feeling.

As a desirable aspect of the vehicle steering device, it is preferable that the fourth torque signal in the second mode be a constant value in a region in which the steering angle is equal to or larger than a predetermined value. Accordingly, it is possible to reduce the target steering torque in the second mode, thereby lightening an operation of the wheel.

As a desirable aspect of the vehicle steering device, it is preferable that the target steering torque generation unit set the correction gain to be one and set the fourth torque signal to be zero in the first mode. Accordingly, it is possible to obtain target steering torque suitable for the first mode.

As a desirable aspect of the vehicle steering device, the target steering torque in the second mode is smaller than the target steering torque in the first mode. Accordingly, it is possible to lighten an operation of the wheel.

<Solution to Problem Related to Third Background Art>

To achieve the above-described intention, a vehicle steering device according to an aspect of the present invention includes a reaction force device configured to apply steering reaction force to a wheel, a drive device configured to turn tires in accordance with steering of the wheel, and a control unit configured to control the reaction force device and the drive device, in which: the control unit includes a target steering torque generation unit configured to generate target steering torque as a target value of steering torque, and an end target steering torque generation unit configured to generate, based on the steering angle of the wheel and an end steering angle corresponding to a maximum turning angle, a first torque signal that is zero in a region in which the absolute value of the steering angle of the wheel is smaller than the end steering angle and that increases zero at a predetermined change rate in a region in which the absolute value of the steering angle is equal to or larger than the end steering angle; and the target steering torque generation unit generates a second torque signal based on a predetermined basic map in accordance with at least the vehicle speed of a vehicle and the steering angle and generates the target steering torque by adding the first torque signal to the second torque signal. With the above-described configuration, in a region in which the absolute value of the steering angle corresponding to the maximum turning angle is equal to or larger than the end steering angle, reaction force that a driver receives from the wheel is large, which restricts an operation of the wheel by the driver. Accordingly, it is possible to restrict an operation of the wheel in accordance with the maximum turning angle.

As a desirable aspect of the vehicle steering device, it is preferable that the second torque signal increase along a curve having a change rate gradually decreasing as at least the absolute value of the steering angle increases, and that the change rate of the first torque signal in a region in which the absolute value of the steering angle is equal to or larger than the end steering angle be larger than a maximum change rate of the second torque signal.

As a desirable aspect of the vehicle steering device, it is preferable that the end target steering torque generation unit generate the first torque signal by using Expression (1) below when Tref_e represents the first torque signal, θh represents the steering angle, θh_e represents the end steering angle, and Ke represents a coefficient that determines the gradient of the first torque signal in the region in which the absolute value of the steering angle is equal to or larger than the end steering angle.

$$Tref\_e = Ke \times \max(0, (|\theta h| - \theta h\_e)) \times \text{sign}(\theta h) \quad (1)$$

As a desirable aspect of the vehicle steering device, it is preferable that the control unit include an end steering angle setting unit configured to set the end steering angle in accordance with at least the vehicle speed, and a turning ratio gain calculation unit configured to calculate a turning ratio gain by which the steering angle is multiplied to generate a target turning angle of the tires based on the end steering angle. With the above-described configuration, it is possible to restrict an operation of the wheel to the steering angle in accordance with the vehicle speed by changing the end steering angle corresponding to the maximum turning angle in accordance with the vehicle speed.

As a desirable aspect of the vehicle steering device, it is preferable that the turning ratio gain calculation unit generate the turning ratio gain by using Expression (2) below when G represents the turning ratio gain, θh represents the steering angle, θh_e represents the end steering angle, θt_max represents the maximum turning angle, and Kt represents a reference value of the turning ratio gain.

$$G = (\theta t\_\max/Kt)/\theta h\_e \quad (2)$$

As a desirable aspect of the vehicle steering device, it is preferable that when a first region be defined to be a region in which the vehicle speed of the vehicle is equal to or higher than the first vehicle speed, that a second region be defined to be a region in which the vehicle speed of the vehicle is equal to or higher than a third vehicle speed lower than the first vehicle speed and is lower than the first vehicle speed, and that a third region be defined to be a region in which the vehicle speed of the vehicle is equal to or higher than zero and lower than the third vehicle speed, that the end steering angle setting unit set the end steering angle in the third region to be a value smaller than the end steering angle in the first region. Accordingly, it is possible to prevent abrupt change of the turning angle of the tires along with change of the vehicle speed, thereby providing stable steering feeling.

As a desirable aspect of the vehicle steering device, it is preferable that the end steering angle setting unit set the end steering angle in the first region to be a constant value, set the end steering angle in the third region to be a constant value different from the end steering angle in the first region, and set the end steering angle in the second region to be a value gradually decreasing in a range from the end steering angle in the first region to the end steering angle in the third region. Accordingly, it is possible to change the turning ratio gain in cooperation with the end steering angle in accordance with the vehicle speed, thereby contributing to improvement of traveling stability.

As a desirable aspect of the vehicle steering device, it is preferable that the end steering angle setting unit include an end steering angle map in which a basic end steering angle in accordance with the vehicle speed of the vehicle is set, and an end steering angle calculation unit configured to calculate the end steering angle based on the steering angle and the basic end steering angle. Accordingly, it is possible to reduce discomfort on steering feeling of the driver due to variation of the vehicle speed of the vehicle and the steering angle.

As a desirable aspect of the vehicle steering device, it is preferable that the end steering angle calculation unit output the basic end steering angle when the absolute value of the steering angle is smaller than a predetermined first threshold value, and output the previous value of the end steering angle when the absolute value of the steering angle is equal to or larger than the first threshold value. Accordingly, change of the end steering angle is restricted when the absolute value of the steering angle is equal to or larger than the predetermined first threshold value. Accordingly, it is possible to prevent change of the turning angle of the tires due to change of the vehicle speed in a large rudder angle region in which the change ratio is relatively large, thereby reducing discomfort on steering feeling of the driver.

As a desirable aspect of the vehicle steering device, it is preferable that the end steering angle calculation unit output the basic end steering angle when the absolute value of the steering angle is smaller than the basic end steering angle, output the absolute value of the steering angle when the absolute value of the steering angle is equal to or larger than the basic end steering angle and the absolute value of the steering angle is smaller than the previous value of the end steering angle, and output the previous value of the end steering angle when the absolute value of the steering angle is equal to or larger than the basic end steering angle and the absolute value of the steering angle is equal to or larger than the previous value of the end steering angle. Accordingly, change of the end steering angle is restricted in a region in which the absolute value of the steering angle is equal to or larger than the basic end steering angle. Accordingly, it is possible to prevent change of the end steering angle along with change of the vehicle speed, thereby reducing discomfort on steering feeling of the driver.

As a desirable aspect of the vehicle steering device, it is preferable that the end steering angle setting unit further include a change amount restriction unit configured to restrict the change amount of the end steering angle, and that the end steering angle calculation unit output the basic end steering angle when the absolute value of the steering angle is smaller than a predetermined first threshold value, and output the previous value of the end steering angle when the absolute value of the steering angle is equal to or larger than the first threshold value, that the change amount restriction unit output the end steering angle when the absolute value of the difference value between the end steering angle and the previous value of the end steering angle is smaller than a predetermined second threshold value, add the second threshold value to the previous value of the end steering angle and output a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, and subtract the second threshold value from the previous value of the end steering angle and outputs a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value. Accordingly, change of the end steering angle is restricted when the absolute value of the steering angle is equal to or larger than the predetermined first threshold value. Accordingly, it is possible to prevent change of the turning angle of the tires due to change of the vehicle speed in a large rudder angle region in which the change ratio is relatively large, thereby reducing discomfort on steering feeling of the driver. In addition, when the change amount of the end steering angle is equal to or larger than the predetermined second threshold value, the end steering angle is set to be a value obtained by adding or subtracting a predetermined value to or from the previous value of the end steering angle. Accordingly, the temporal change amount of the turning ratio gain is restricted. Thus, it is possible to prevent abrupt change of behavior of the vehicle along with abrupt change of the turning angle, thereby reducing discomfort on steering feeling of the driver.

As a desirable aspect of the vehicle steering device, it is preferable that the end steering angle setting unit further include a change amount restriction unit configured to restrict the change amount of the end steering angle, and that the end steering angle calculation unit output the basic end steering angle when the absolute value of the steering angle is smaller than the basic end steering angle, output the absolute value of the steering angle when the absolute value of the steering angle is equal to or larger than the basic end steering angle and the absolute value of the steering angle is smaller than the previous value of the end steering angle, and output the previous value of the end steering angle when the absolute value of the steering angle is equal to or larger than the basic end steering angle and the absolute value of the steering angle is equal to or larger than the previous value of the end steering angle, and that the change amount restriction unit output the end steering angle when the absolute value of the difference value between the end steering angle and the previous value of the end steering angle is smaller than a predetermined second threshold value, and add the second threshold value to the previous value of the end steering angle and output a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, and subtract the second threshold value from the previous value of the end steering angle and output a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value.

Accordingly, change of the end steering angle is restricted in a region in which the absolute value of the steering angle is equal to or larger than the basic end steering angle. Accordingly, it is possible to prevent change of the end steering angle along with change of the vehicle speed, thereby reducing discomfort on steering feeling of the driver. In addition, when the change amount of the end steering angle is equal to or larger than the predetermined second threshold value, the end steering angle is set to be a value obtained by adding or subtracting the second threshold value to or from the previous value of the end steering angle. Accordingly, the temporal change amount of the turning ratio gain is restricted. Thus, it is possible to prevent abrupt change of behavior of the vehicle along with abrupt change of the turning angle, thereby reducing discomfort on steering feeling of the driver.

Advantageous Effects of Invention

<Effect of Means for Solving Problem of First Background Art>

According to the present invention, it is possible to provide a vehicle steering device capable of stabilizing behavior of a vehicle when traveling backward.

<Effect of Means for Solving Problem of Second Background Art>

According to the present invention, it is possible to provide a vehicle steering device capable of improving steering feeling.

<Effect of Means for Solving Problem of Third Background Art>

According to the present invention, it is possible to provide a vehicle steering device capable of restricting an operation of a wheel in accordance with a structurally determined mechanically maximum turning angle.

DESCRIPTION OF EMBODIMENTS

Modes for carrying out the invention (hereinafter referred to as embodiments) will be described below in detail with reference to the accompanying drawings. Note that, the present invention is not limited by the following embodiments. In addition, components in the embodiments described below include their equivalents such as those that could be easily thought of by the skilled person in the art and those identical in effect. Moreover, components disclosed in the embodiments described below may be combined as appropriate.

Note that, FIGS. 1 to 9 relate to a disclosure of an aspect for solving the problem related to the first background art, FIGS. 10 to 38 relate to a disclosure of an aspect for solving the problem related to the second background art, and FIGS. 39 to 64 relate to a disclosure of an aspect for solving the problem related to the third background art.

<Disclosure of Aspect for Solving Problem Related to First Background Art>

The aspect for solving the problem related to the second background art will be described below based on FIGS. 1 to 9.

Figure 1:
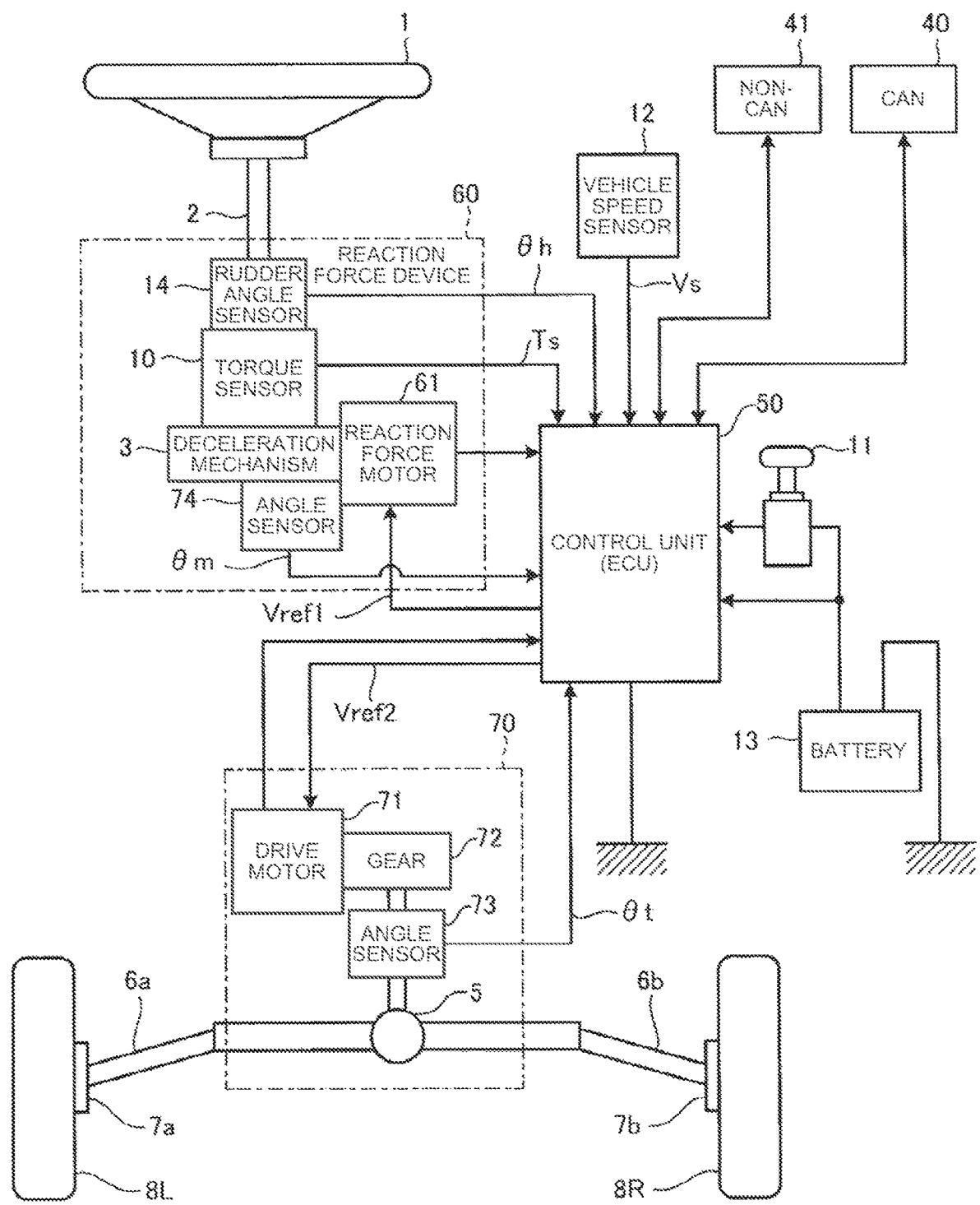
FIG. 1 is a diagram illustrating the entire configuration of a steer-by-wire vehicle steering device according to an embodiment.

FIG. 1 is a diagram illustrating the entire configuration of a steer-by-wire vehicle steering device according to an embodiment. The steer-by-wire (SBW) vehicle steering device (hereinafter also referred to as an "SBW system") illustrated in FIG. 1 is a system configured to transfer, by an electric signal, an operation of a wheel 1 to a rotation mechanism including steering wheels 8L and 8R. As illustrated in FIG. 1, the SBW system includes a reaction force device 60 and a drive device 70, and a control unit (ECU) 50 as a control unit controls the devices. The reaction force device 60 includes a torque sensor 10 configured to detect steering torque Ts of the wheel 1, a rudder angle sensor 14 configured to detect a steering angle θh, a deceleration mechanism 3, and an angle sensor 74, and a reaction force motor 61. These components are provided to a column shaft 2 of the wheel 1. The reaction force device 60 performs detection of the steering angle θh at the rudder angle sensor 14 and simultaneously transfers, to the driver as reaction force torque, the motion state of a vehicle conveyed from the steering wheels 8L and 8R. The reaction force torque is generated by the reaction force motor 61. Note that, although a SBW system of a certain type includes no torsion bar in a reaction force device, the SBW system to which the present disclosure is applied is a type including a torsion bar, and detects the steering torque Ts by the torque sensor 10. In addition, the angle sensor 74 detects a motor angle θm of the reaction force motor 61.

The drive device 70 includes a drive motor 71, a gear 72, and an angle sensor 73. Drive power generated by the drive motor 71 is coupled to the steering wheels 8L and 8R through the gear 72, a pinion rack mechanism 5, and tie rods 6a and 6b and further through hub units 7a and 7b. The drive device 70 drives the drive motor 71 in accordance with steering of the wheel 1 by the driver, applies the drive power thereof to the pinion rack mechanism 5 through the gear 72, and turns the steering wheels 8L and 8R through the tie rods 6a and 6b. The angle sensor 73 is disposed near the pinion rack mechanism 5 and detects a turning angle θt of the steering wheels 8L and 8R. To cooperatively control the reaction force device 60 and the drive device 70, the ECU 50 generates, based on a vehicle speed Vs from a vehicle speed sensor 12 and other information in addition to information such as the steering angle θh and the turning angle θt output from both devices, a voltage control command value Vref1 for driving and controlling the reaction force motor 61 and a voltage control command value Vref2 for driving and controlling the drive motor 71.

Figure 2:
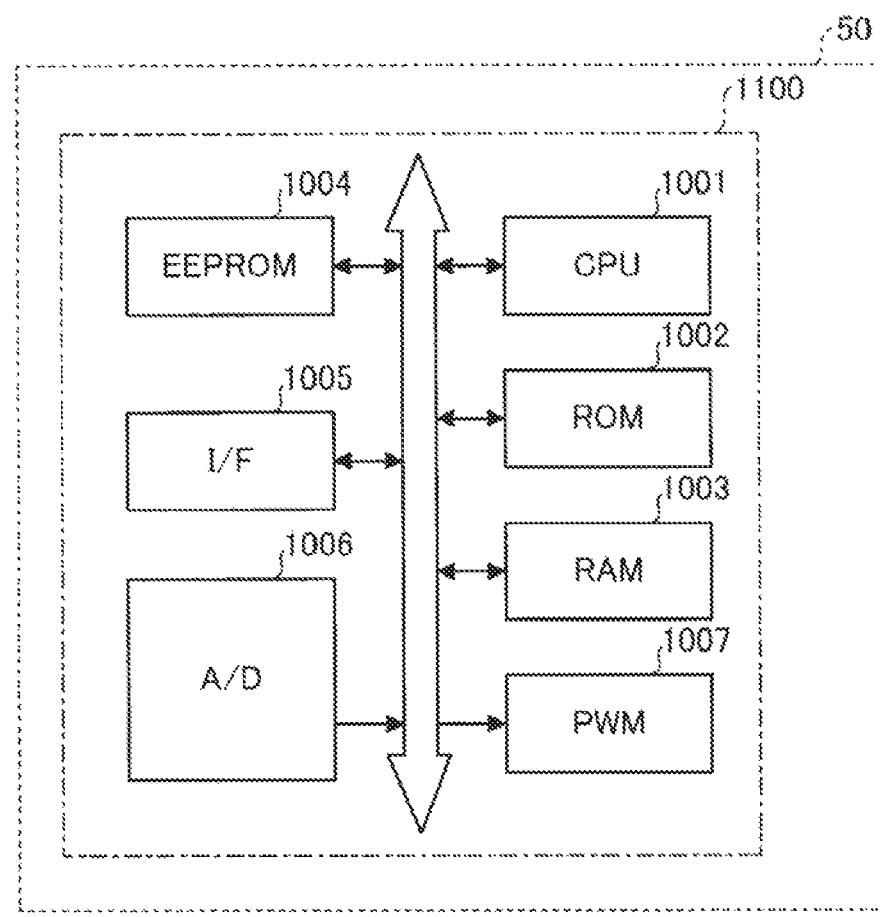
FIG. 2 is a schematic diagram illustrating a hardware configuration of a control unit configured to control a SBW system.

Electric power is supplied from a battery 13 to the control unit (ECU) 50, and an ignition key signal is input to the control unit 50 through an ignition key 11. The control unit 50 performs calculation of a current command value based on the steering torque Ts detected by the torque sensor 10 and the vehicle speed Vs detected by the vehicle speed sensor 12 and controls current supplied to the reaction force motor 61 and the drive motor 71. The control unit 50 is connected to an on-board network such as a controller area network (CAN) 40 through which various kinds of information of the vehicle are transmitted and received. In addition, a control unit 30 is connectable to a non-CAN 41 configured to transmit and receive communication other than the CAN 40, analog and digital signals, radio wave, and the like. The control unit 50 is mainly configured as a CPU (including an MCU and an MPU). FIG. 2 is a schematic diagram illustrating a hardware configuration of the control unit configured to control the SBW system.

A control computer 1100 configured as the control unit 50 includes a central processing unit (CPU) 1001, a read only memory (ROM) 1002, a random access memory (RAM) 1003, an electrically erasable programmable ROM (EEPROM) 1004, an interface (I/F) 1005, an analog/digital (A/D) converter 1006, and a pulse width modulation (PWM) controller 1007, and these components are connected to a bus. The CPU 1001 is a processing device configured to execute a computer program for control (hereinafter referred to as a control program) of the SBW system and control the SBW system. The ROM 1002 stores a control program for controlling the SBW system. In addition, the RAM 1003 is used as a work memory for operating the control program. The EEPROM 1004 stores, for example, control data input to and output from the control program. The control data is used on the control program loaded onto the RAM 1003 after the control unit 30 is powered on, and is overwritten to the EEPROM 1004 at a predetermined timing. The ROM 1002, the RAM 1003, the EEPROM 1004, and the like are storage devices configured to store information and are storage devices (primary storage devices) directly accessible from the CPU 1001.

The A/D converter 1006 receives, for example, signals of the steering torque Ts and the steering angle θh and converts the signals into digital signals. The interface 1005 is connected to the CAN 40. The interface 1005 receives a signal (vehicle speed pulse) of a vehicle speed V from the vehicle speed sensor 12. The PWM controller 1007 outputs a PWM control signal of each UVW phase based on a current command value to the reaction force motor 61 and the drive motor 71.

Figure 3:
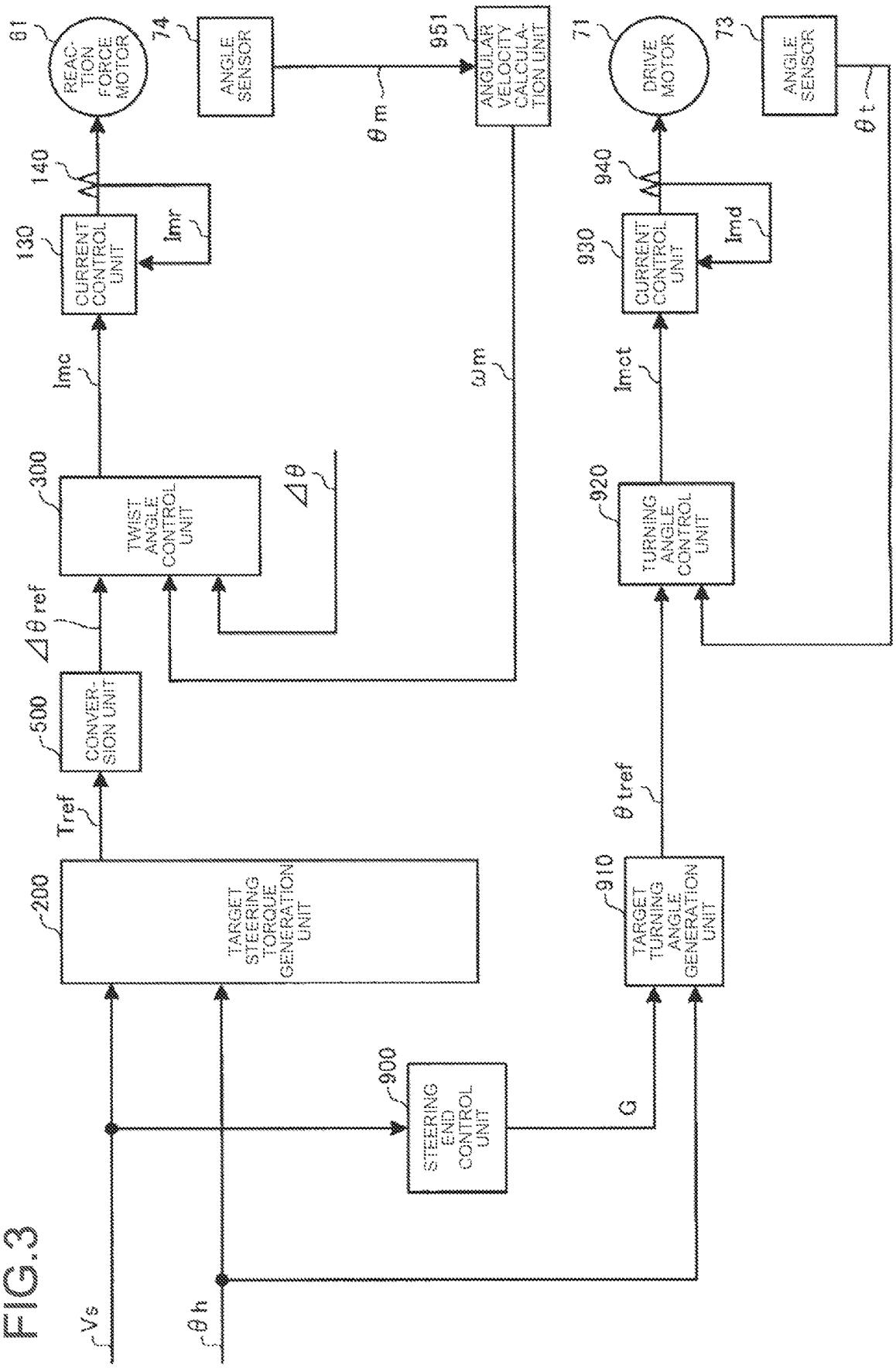
FIG. 3 is a diagram illustrating an exemplary internal block configuration of the control unit according to the embodiment.

The configuration of the embodiment in which the present disclosure is applied to such a SBW system will be described below. FIG. 3 is a diagram illustrating an exemplary internal block configuration of the control unit according to the embodiment. In the present embodiment, control (hereinafter referred to as "twist angle control") of a twist angle Δθ and control (hereinafter referred to as "turning angle control") of the turning angle θt are performed, the reaction force device is controlled by the twist angle control, and the drive device is controlled by the turning angle control. Note that, the drive device may be controlled by another control method.

The control unit 50 includes, as an internal block configuration, a target steering torque generation unit 200, a twist angle control unit 300, a conversion unit 500, a turning ratio map unit 900, a target turning angle generation unit 910, and a turning angle control unit 920. The target steering torque generation unit 200 generates a target steering torque Tref as a target value of steering torque when a steering system of the vehicle is assisted and controlled in the present disclosure. The conversion unit 500 converts the target steering torque Tref into a target twist angle Δθref. The twist angle control unit 300 generates a motor current command value Imc as a control target value of current supplied to the reaction force motor 61.

In the twist angle control, such control that the twist angle Δθ follows the target twist angle Δθref calculated through the target steering torque generation unit 200 and the conversion unit 500 by using the steering angle θh and the like is performed. The motor angle θm of the reaction force motor 61 is detected by the angle sensor 74, and a motor angular velocity ωm is calculated by differentiating the motor angle θm at an angular velocity calculation unit 951. The turning angle θt of the drive motor 71 is detected by the angle sensor 73. In addition, a current control unit 130 performs current control by driving the reaction force motor 61 based on the motor current command value Imc output from the twist angle control unit 300 and a current value Imr of the reaction force motor 61 detected by a motor current detector 140.

The twist angle control unit 300 will be described below with reference to FIG. 4.

Figure 4:
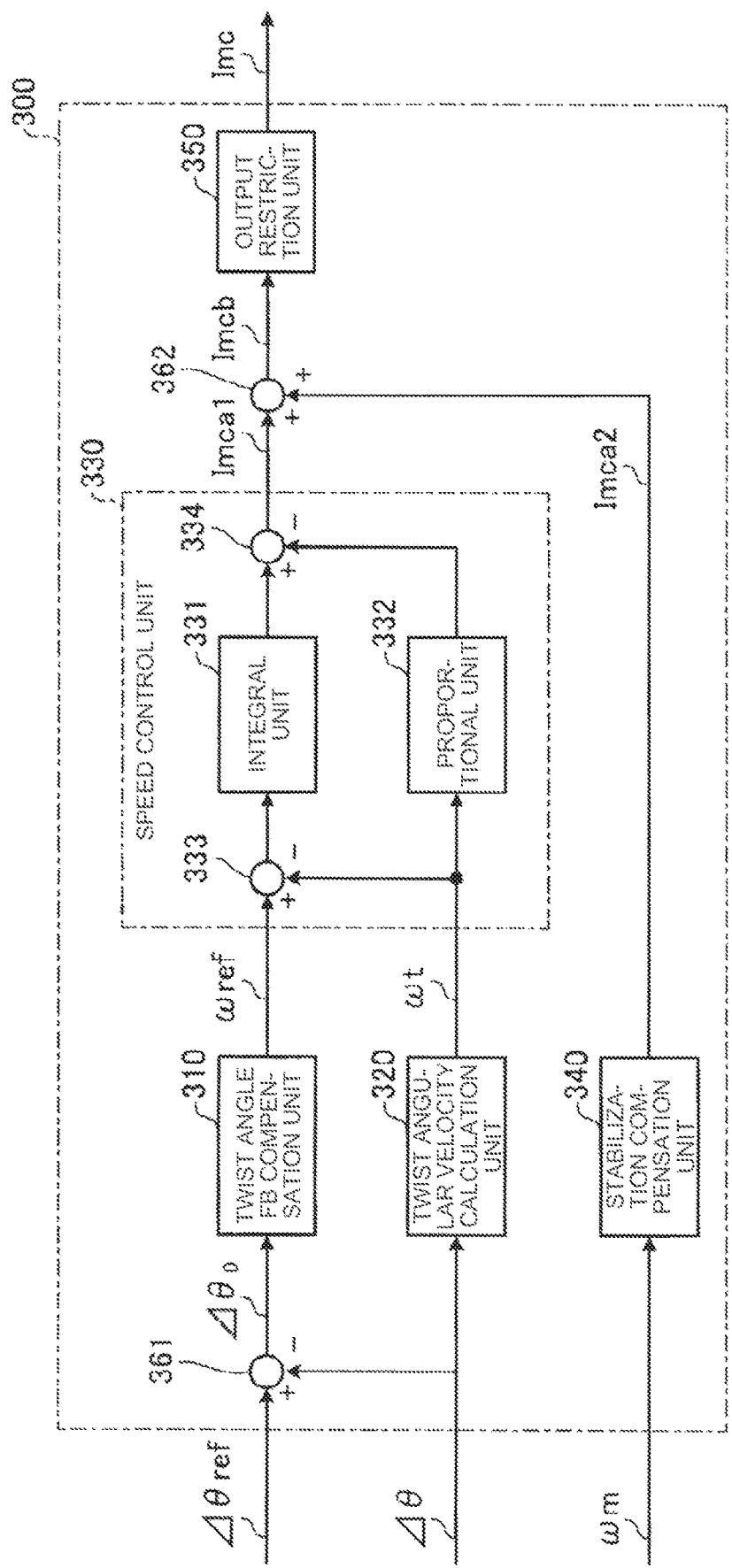
FIG. 4 is a block diagram illustrating an exemplary configuration of a twist angle control unit.

FIG. 4 is a block diagram illustrating an exemplary configuration of the twist angle control unit. The twist angle control unit 300 calculates the motor current command value Imc based on the target twist angle Δθref, the twist angle Δθ, and the motor angular velocity ωm. The twist angle control unit 300 includes a twist angle feedback (FB) compensation unit 310, a twist angular velocity calculation unit 320, a speed control unit 330, a stabilization compensation unit 340, an output restriction unit 350, a subtraction unit 361, and an addition unit 362.

The target twist angle Δθref output from the conversion unit 500 is input to the subtraction unit 361 through addition. The twist angle Δθ is input to the subtraction unit 361 through subtraction and also input to the twist angular velocity calculation unit 320. The motor angular velocity ωm is input to the stabilization compensation unit 340. The twist angle FB compensation unit 310 multiplies a deviation Δθ0 between the target twist angle Δθref and the twist angle Δθ, which is calculated at the subtraction unit 361, by a compensation value CFB (transfer function) and outputs a target twist angular velocity ωref with which the twist angle Δθ follows the target twist angle Δθref. The compensation value CFB may be a simple gain Kpp, or a typically used compensation value such as a PI control compensation value. The target twist angular velocity ωref is input to the speed control unit 330. With the twist angle FB compensation unit 310 and the speed control unit 330, it is possible to cause the twist angle Δθ to follow the target twist angle Δθref, thereby achieving desired steering torque.

The twist angular velocity calculation unit 320 calculates a twist angular velocity ωt by performing differential arithmetic processing on the twist angle Δθ. The twist angular velocity ωt is output to the speed control unit 330. The twist angular velocity calculation unit 320 may perform, as differential calculation, pseudo differentiation with a HPF and a gain. In addition, the twist angular velocity calculation unit 320 may calculate the twist angular velocity ωt by another means or not from the twist angle Δθ and may output the calculated twist angular velocity ωt to the speed control unit 330. The speed control unit 330 calculates, by I-P control (proportional processing PI control), a motor current command value Imca1 with which the twist angular velocity ωt follows the target twist angular velocity ωref. A subtraction unit 333 calculates a difference (ωref−ωt) between the target twist angular velocity ωref and the twist angular velocity ωt. An integral unit 331 integrates the difference (ωref−ωt) between the target twist angular velocity ωref and the twist angular velocity ωt, and inputs a result of the integration to a subtraction unit 334 through addition. The twist angular velocity ωt is also output to a proportional unit 332. The proportional unit 332 performs proportional processing with a gain Kvp on the twist angular velocity ωt and inputs a result of the proportional processing to the subtraction unit 334 through subtraction. A result of the subtraction at the subtraction unit 334 is output as the motor current command value Imca1. Note that, the speed control unit 330 may calculate the motor current command value Imca1 not by I-P control but by a typically used control method such as PI control, P (proportional) control, PID (proportional-integral-differential) control, PI-D control (differential processing PID control), model matching control, or model reference control.

The stabilization compensation unit 340 has a compensation value Cs (transfer function) and calculates a motor current command value Imca2 from the motor angular velocity ωm. When gains of the twist angle FB compensation unit 310 and the speed control unit 330 are increased to improve the following capability and the disturbance characteristic, a controlled oscillation phenomenon occurs in a higher range. To avoid this, the transfer function (Cs) that it necessary for stabilization of the motor angular velocity ωm is set to the stabilization compensation unit 340. Accordingly, stabilization of the entire EPS control system can be achieved. The addition unit 362 adds the motor current command value Imca1 from the speed control unit 330 and the motor current command value Imca2 from the stabilization compensation unit 340, and outputs a result of the addition as a motor current command value Imcb. The upper and lower limit values of the motor current command value Imcb are set to the output restriction unit 350 in advance.

The output restriction unit 350 outputs the motor current command value Imc with restriction on the upper and lower limit values of the motor current command value Imcb. Note that, the configuration of the twist angle control unit 300 in the present embodiment is exemplary and may be different from the configuration illustrated in FIG. 4. For example, the twist angle control unit 300 need not necessarily include the stabilization compensation unit 340.

In the turning angle control, a target turning angle θtref is generated at a target turning angle generation unit 910 based on the steering angle θh and a turning ratio gain G output from a turning ratio map unit 900 to be described later. The target turning angle θtref together with the turning angle θt is input to a turning angle control unit 920, and a motor current command value Imct with which the turning angle θt is equal to the target turning angle θtref is calculated at the turning angle control unit 920. Then, with configurations and operations same as those of the current control unit 130, a current control unit 930 performs current control by driving the drive motor 71 based on the motor current command value Imct and a current value Imd of the drive motor 71 detected by a motor current detector 940.

The target turning angle generation unit 910 will be described below with reference to FIG. 5.

Figure 5:
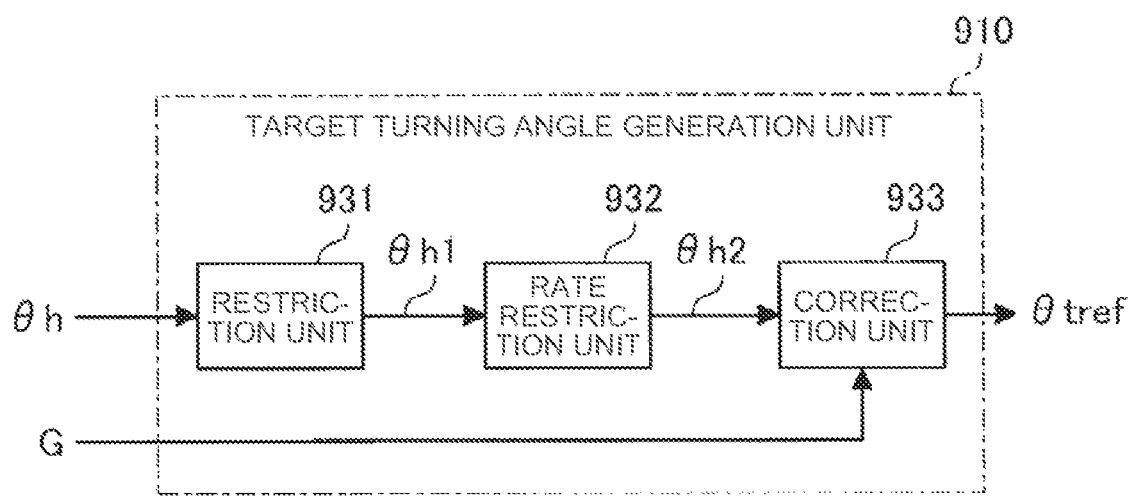
FIG. 5 is a block diagram illustrating an exemplary configuration of a target turning angle generation unit.

FIG. 5 is a block diagram illustrating an exemplary configuration of the target turning angle generation unit. The target turning angle generation unit 910 includes a restriction unit 931, a rate restriction unit 932, and a correction unit 933. The restriction unit 931 outputs a steering angle θh1 with restriction on the upper and lower limit values of the steering angle θh. Similarly to the output restriction unit 350 in the twist angle control unit 300 illustrated in FIG. 4, the upper and lower limit values of the steering angle θh are set in advance and restricted. To avoid abrupt change of the steering angle, the rate restriction unit 932 provides restriction by setting a restriction value for the change amount of the steering angle θh1 and outputs the steering angle θh2. For example, the change amount is set to be the difference from the steering angle θh1 at the previous sample. When the absolute value of the change amount is larger than a predetermined value (restriction value), the steering angle θh1 is increased or decreased so that the absolute value of the change amount becomes equal to the restriction value, and the increased or decreased steering angle θh1 is output as the steering angle θh2. When the absolute value of the change amount is equal to or smaller than the restriction value, the steering angle θh1 is directly output as the steering angle θh2. Note that restriction may be provided by setting the upper and lower limit values of the change amount instead of setting the restriction value for the absolute value of the change amount, or restriction may be provided on a change rate or a difference rate in place of the change amount. The correction unit 933 corrects the steering angle θh2 and outputs the target turning angle θtref. In the present embodiment, the target turning angle θtref is calculated by multiplying the steering angle θh2 by the turning ratio gain G output from the turning ratio map unit 900 to be described later.

The turning angle control unit 920 will be described below with reference to FIG. 6.

Figure 6:
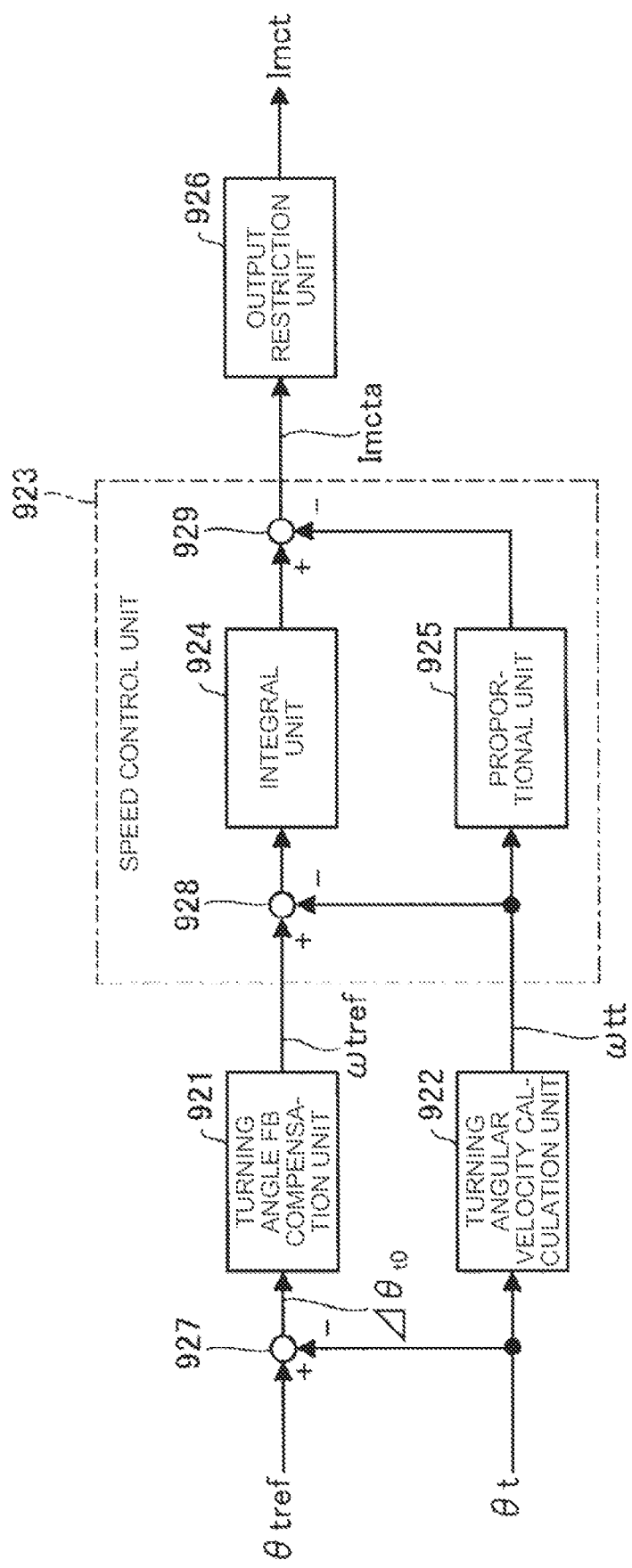
FIG. 6 is a block diagram illustrating an exemplary configuration of a turning angle control unit.

FIG. 6 is a block diagram illustrating an exemplary configuration of the turning angle control unit. The turning angle control unit 920 calculates the motor current command value Imct based on the target turning angle θtref and the turning angle θt of the steering wheels 8L and 8R. The turning angle control unit 920 includes a turning angle feedback (FB) compensation unit 921, a turning angular velocity calculation unit 922, a speed control unit 923, an output restriction unit 926, and a subtraction unit 927. The target turning angle θtref output from the target turning angle generation unit 910 is input to the subtraction unit 927 through addition. The turning angle θt is input to a subtraction unit 927 through subtraction and also input to the turning angular velocity calculation unit 922. The turning angle FB compensation unit 921 multiplies a deviation Δθt0 between a target turning angular velocity ωtref and the turning angle θt, which is calculated at the subtraction unit 927, by the compensation value CFB (transfer function), and outputs the target turning angular velocity ωtref with which the turning angle θt follows the target turning angle θtref. The compensation value CFB may be a simple gain Kpp, or a typically used compensation value such as a PI control compensation value. The target turning angular velocity ωtref is input to the speed control unit 923. With the turning angle FB compensation unit 921 and the speed control unit 923, it is possible to cause the target turning angle θtref to follow the turning angle θt, thereby achieving desired torque.

The turning angular velocity calculation unit 922 calculates a turning angular velocity ωtt by performing differential arithmetic processing on the turning angle θt. The turning angular velocity ωtt is output to the speed control unit 923. The speed control unit 923 may perform, as differential calculation, pseudo differentiation with a HPF and a gain. In addition, the speed control unit 923 may calculate the turning angular velocity ωtt by another means or not from the turning angle θt and may output the calculated turning angular velocity ωtt to the speed control unit 923. The speed control unit 923 calculates, by I-P control (proportional processing PI control), a motor current command value Imcta with which the turning angular velocity ωtt follows the target turning angular velocity ωtref. Note that, the speed control unit 923 may calculate the motor current command value Imcta not by I-P control but by a typically used control method such as PI control, P (proportional) control, PID (proportional-integral-differential) control, PI-D control (differential processing PID control), model matching control, or model reference control.

A subtraction unit 928 calculates a difference (ωtref−ωtt) between the target turning angular velocity ωtref and the turning angular velocity ωtt. An integral unit 924 integrates the difference (ωtref−ωtt) between the target turning angular velocity ωtref and the turning angular velocity ωtt and inputs a result of the integration to a subtraction unit 929 through addition. The turning angular velocity ωtt is also output to a proportional unit 925. The proportional unit 925 performs proportional processing on the turning angular velocity ωtt and outputs a result of the proportional processing to the output restriction unit 926 as the motor current command value Imcta. The upper and lower limit values of the motor current command value Imcta are set to the output restriction unit 926 in advance. The output restriction unit 926 outputs the motor current command value Imct with restriction on the upper and lower limit values of the motor current command value Imcta.

Figure 7:
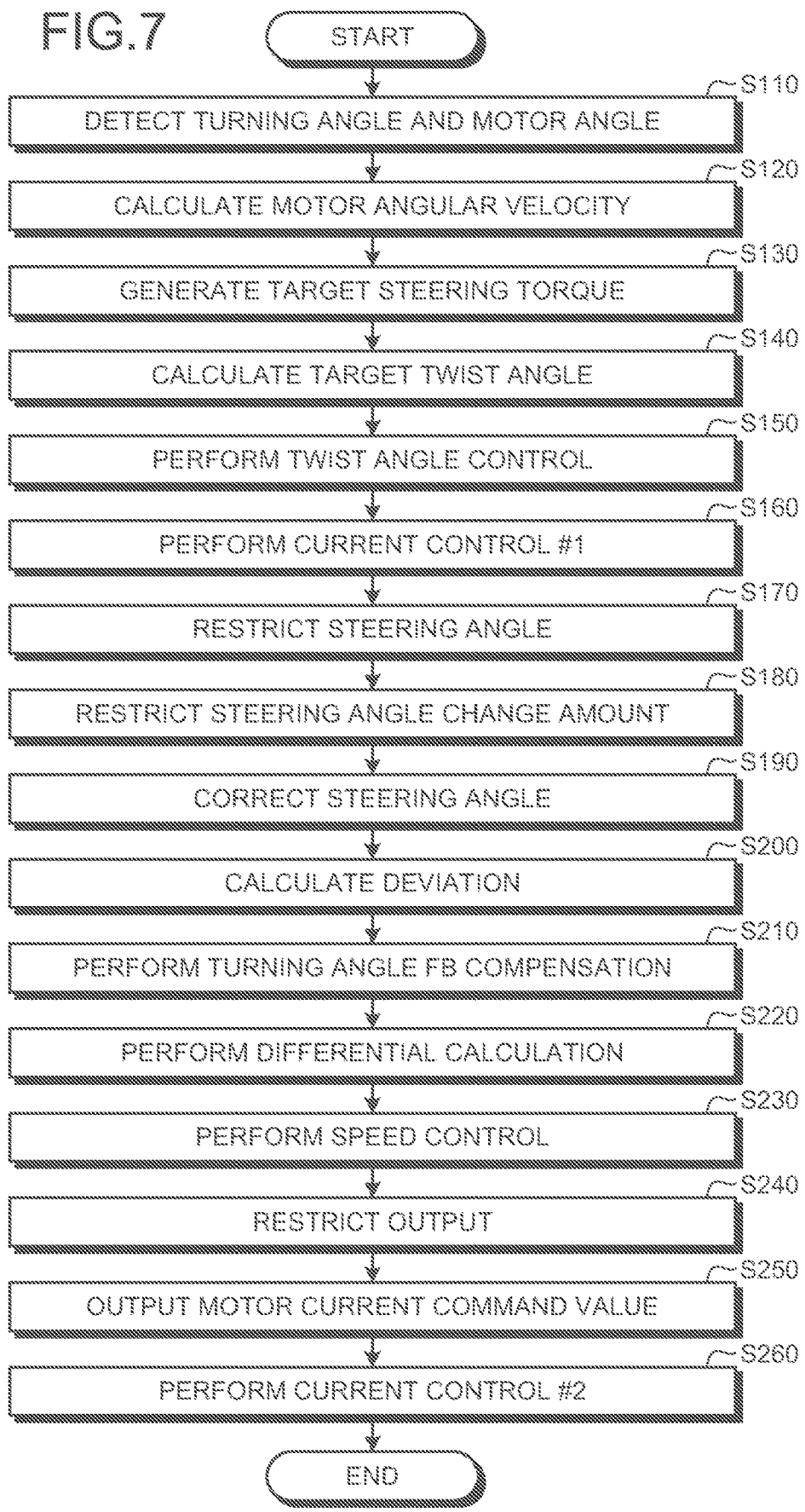
FIG. 7 is a flowchart illustrating exemplary operation of the embodiment.

Exemplary operation of the embodiment in such a configuration will be described below with reference to a flowchart in FIG. 7. FIG. 7 is a flowchart illustrating the exemplary operation of the embodiment. Note that, the configuration of the turning angle control unit 920 in the present embodiment is exemplary and may be different from the configuration illustrated in FIG. 6.

Once the operation is started, the angle sensor 73 detects the turning angle θt and the angle sensor 74 detects the motor angle θm (step S110), and the turning angle θt and the motor angle θm are input to the turning angle control unit 920 and the angular velocity calculation unit 951, respectively. The angular velocity calculation unit 951 calculates the motor angular velocity ωm by differentiating the motor angle θm and outputs the calculated motor angular velocity ωm to the twist angle control unit 300 (step S120). Thereafter, a target steering torque generation unit 202 executes operation same as that at steps S10 to S40 illustrated in FIG. 7 to perform current control by driving the reaction force motor (steps S130 to S160).

Meanwhile, in the turning angle control, the target turning angle generation unit 910 receives the steering angle θh, and the steering angle θh is input to the restriction unit 931. The restriction unit 931 restricts the upper and lower limit values of the steering angle θh to upper and lower limit values set in advance (step S170) and outputs the steering angle θh as the steering angle θh1 to the rate restriction unit 932. The rate restriction unit 932 restricts the change amount of the steering angle θh1 based on a restriction value set in advance (step S180) and outputs the steering angle θh1 as the steering angle θh2 to the correction unit 933. The correction unit 933 obtains the target turning angle θtref by correcting the steering angle θh2 (step S190) and outputs the target turning angle θtref to the turning angle control unit 920.

Having received the turning angle θt and the target turning angle θtref, the turning angle control unit 920 calculates the deviation Δθt0 by subtracting the turning angle θt from the target turning angle θtref at the subtraction unit 927 (step S200). The deviation Δθt0 is input to the turning angle FB compensation unit 921, and the turning angle FB compensation unit 921 compensates the deviation Δθt0 by multiplying the deviation Δθt0 by a compensation value (step S210) and outputs the target turning angular velocity ωtref to the speed control unit 923. The turning angular velocity calculation unit 922 receives the turning angle θt, calculates the turning angular velocity ωtt through differential calculation on the turning angle θt (step S220), and outputs the turning angular velocity ωtt to the speed control unit 923. Similarly to the speed control unit 330, the speed control unit 923 calculates the motor current command value Imcta by I-P control (step S230) and outputs the motor current command value Imcta to the output restriction unit 926. The output restriction unit 926 restricts the upper and lower limit values of the motor current command value Imcta to upper and lower limit values set in advance (step S240) and outputs the motor current command value Imcta as the motor current command value Imct (step S250).

The motor current command value Imct is input to the current control unit 930, and the current control unit 930 performs current control by driving the drive motor 71 based on the motor current command value Imct and the current value Imd of the drive motor 71 detected by the motor current detector 940 (step S260). Note that, the order of data input, calculation, and the like in FIG. 7 may be changed as appropriate. In addition, following control at the turning angle control unit 920 may be performed in a typically used control structure. The turning angle control unit 920 is not limited to a control configuration used for a vehicle device but may have any control configuration with which a real angle (in this example, the turning angle θt) follows a target angle (in this example, the target turning angle θtref), and for example, may have a control configuration used for an industrial positioning device, an industrial robot, or the like.

In addition, in the present embodiment, one ECU 50 controls the reaction force device 60 and the drive device 70 as illustrated in FIG. 1, but an ECU for the reaction force device 60 and an ECU for the drive device 70 may be provided. In this case, the ECUs perform data transmission and reception through communication. In addition, although the SBW system illustrated in FIG. 1 has no mechanical connection between the reaction force device 60 and the drive device 70, the present disclosure is also applicable to a SBW system including a mechanical torque transmission mechanism configured to mechanically connect the column shaft 2 and the rotation mechanism through a clutch or the like when anomaly has occurred to the system. In such a SBW system, when the system is normal, the clutch is turned off to set mechanical torque transfer to an open state, or when the system is anomalous, the clutch is turned on to set mechanical torque transfer to an enabled state.

Figure 8:
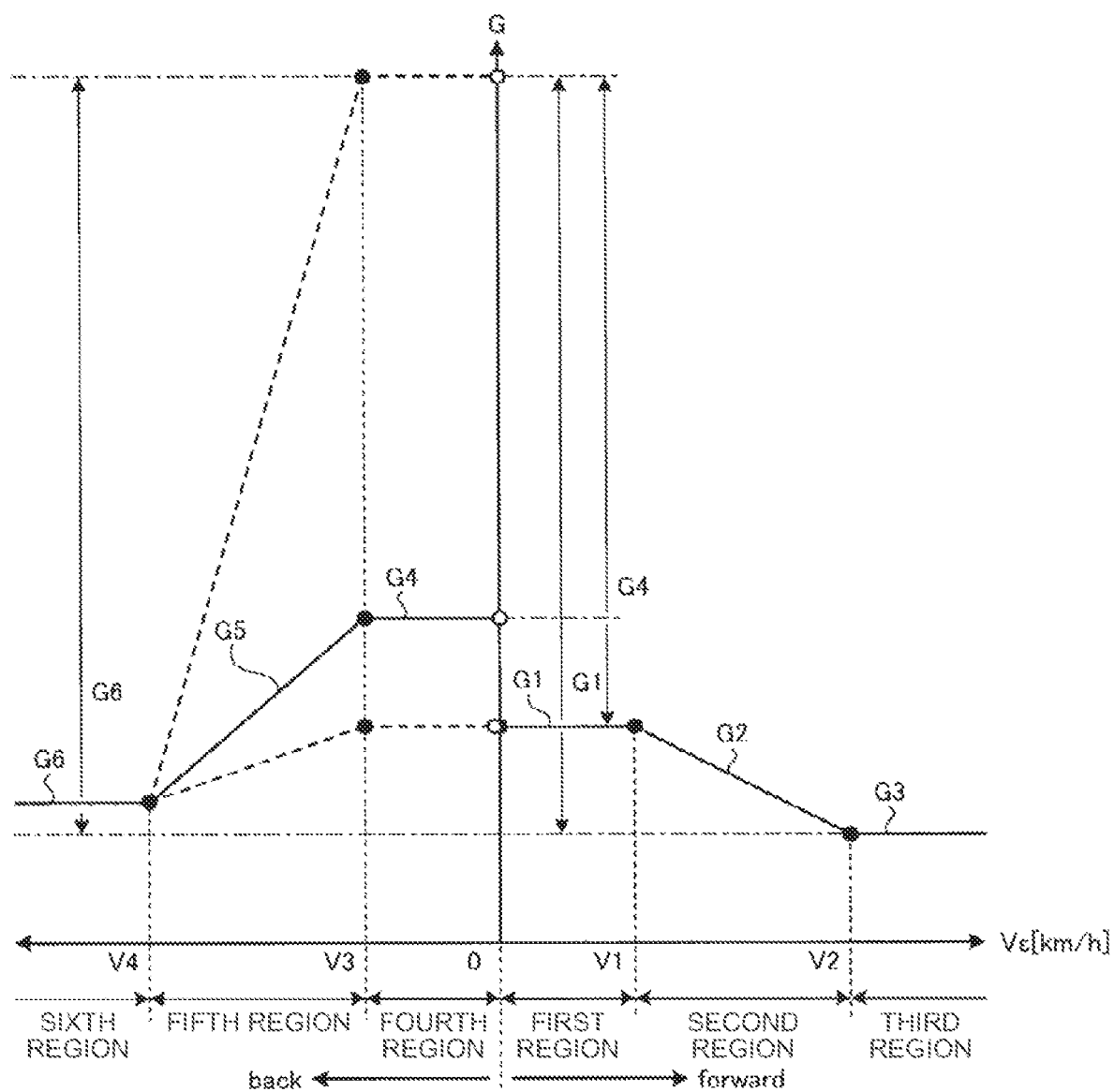
FIG. 8 is a diagram illustrating exemplary characteristics of a turning ratio map held by a turning ratio map unit.

FIG. 8 is a diagram illustrating exemplary characteristics of a turning ratio map held by the turning ratio map unit. The vehicle speed Vs is input to the turning ratio map unit 900 (refer to FIG. 2). In the present embodiment, the vehicle speed Vs includes information indicating whether the vehicle is traveling forward or backward. For example, the vehicle speed Vs has a positive value when the vehicle is traveling forward, or the vehicle speed Vs has a negative value when the vehicle is traveling backward. Note that, the information indicating whether the vehicle is traveling forward or backward is not limited thereto, but for example, a signal detected from a reverse position of a manual shift lever or an automatic shift lever of a transmission may be input, and whether the vehicle is traveling forward or backward may be determined based on the signal.

The turning ratio map unit 900 outputs the turning ratio gain G in accordance with the vehicle speed Vs by using the turning ratio map illustrated in FIG. 8. In the example illustrated in FIG. 8, the horizontal axis represents the vehicle speed Vs, and the vertical axis represents the turning ratio gain G. In addition, in the example illustrated in FIG. 8, a region in which the vehicle speed Vs is on the right side of 0 [km/h] indicates the forward travel speed of the vehicle, and a region in which the vehicle speed Vs is on the left side of 0 [km/h] indicates the backward travel speed of the vehicle. In the example illustrated in FIG. 8, a first region is defined to be a region in which the magnitude of the forward travel speed Vs of the vehicle is equal to or larger than 0 [km/h] and smaller than a first vehicle speed V1, and a first gain G1 is defined to be the turning ratio gain G in the first region. In addition, a second region is defined to be a region in which the magnitude of the forward travel speed Vs of the vehicle is equal to or larger than the first vehicle speed V1 and smaller than a second vehicle speed V2 larger than the first vehicle speed V1, and a second gain G2 is defined to be the turning ratio gain G in the second region. In addition, a third region is defined to be a region in which the magnitude of the forward travel speed Vs of the vehicle is equal to or larger than a second vehicle speed V2, and a third gain G3 is defined to be the turning ratio gain G in the third region. In addition, a fourth region is defined to be a region in which the magnitude of the backward travel speed Vs of the vehicle is larger than 0 [km/h] and smaller than a third vehicle speed V3, and a fourth gain G4 is defined to be the turning ratio gain G in the fourth region. In addition, a fifth region is defined to be a region in which the magnitude of the backward travel speed Vs of the vehicle is equal to or larger than the third vehicle speed V3 and smaller than a fourth vehicle speed V4 larger than the third vehicle speed V3, and a fifth gain G5 is defined to be the turning ratio gain G in the fifth region. In addition, a sixth region is defined to be a region in which the magnitude of the backward travel speed Vs of the vehicle is equal to or larger than the fourth vehicle speed V4, and a sixth gain G6 is defined to be the turning ratio gain G in the sixth region. As illustrated in FIG. 8, the fourth gain G4 is set to be a constant value larger than any of the first gain G1, the second gain G2, the third gain G3, the fifth gain G5, and the sixth gain G6.

At backward traveling of the vehicle, the driver needs to visually check safety behind the vehicle. In this case, when the ratio of the turning angle of tires (the steering wheels 8L and 8R) relative to the steering angle of the wheel 1 is small, the grip on the wheel 1 needs to be changed in some cases. At backward traveling of the vehicle, the driver is likely to lose the posture because the driver visually checks safety behind the vehicle while operating the wheel 1, and accordingly, behavior of the vehicle potentially becomes unstable as the driver changes the grip on the wheel 1.

In the present embodiment, when the third vehicle speed V3 at backward traveling of the vehicle is set to be, for example, 10 [km/h], the fourth gain G4 is increased in a low-speed range, in other words, the fourth region in which the backward travel speed Vs of the vehicle is higher than 0 [km/h] and lower than 10 [km/h]. Accordingly, the ratio of the turning angle of the tires relative to the steering angle of the wheel 1 in the low-speed range at backward traveling of the vehicle can be increased. In other words, a larger turning angle with a small steering angle can be obtained. Thus, it is possible to reduce the frequency that the driver changes the grip on the wheel 1 during backward traveling (reversing) of the vehicle to, for example, park the vehicle in a parking area or the like. In addition, since the fourth gain G4 in the fourth region is set to be a constant value, the turning angle of the tires can be set to be constant in the low-speed range, in other words, the fourth region in which the backward travel speed Vs of the vehicle is higher than 0 [km/h] and lower than 10 [km/h] (=V3). Accordingly, the vehicle can be stably driven to park in the parking area. In addition, in the present embodiment, the third gain G3 in the third region is set to be a constant value, and the first gain G1 in the first region is set to be a constant value larger than the third gain G3 and smaller than the fourth gain G4 in the fourth region.

At forward traveling of the vehicle, particularly in a low-speed range, the turning angle of the tires becomes large on a cross road, a crank-shaped road, or any other road having a narrow road width, in some cases. In such a case, the wheel 1 needs to be largely operated when the ratio of the turning angle of the tires relative to the steering angle of the wheel 1 is small. In the present embodiment, when the first vehicle speed V1 at forward traveling of the vehicle is set to be, for example, 10 [km/h], the first gain G1 is increased in the low-speed range, in other words, the first region in which the forward travel speed Vs of the vehicle is equal to or larger than 0 [km/h] and lower than 10 [km/h]. Accordingly, the ratio of the turning angle of the tires relative to the steering angle of the wheel 1 in the low-speed range at forward traveling of the vehicle can be increased. In other words, a larger turning angle can be obtained with a small steering angle. Thus, it is possible to reduce a load on the driver when traveling on a cross road, a crank-shaped road, or any other road having a narrow road width.

In addition, since the first gain G1 in the first region is set to be a constant value, the turning angle of the tires can be set to be constant in the low-speed range, in other words, the first region in which the forward travel speed Vs of the vehicle is equal to or larger than 0 [km/h] and lower than 10 [km/h] (=V1). Accordingly, it is possible to stably travel on a cross road, a crank-shaped road, or any other road.

In addition, in the present embodiment, as illustrated in FIG. 8, the second gain G2 in the second region is set to gradually decrease in a range from the first gain G1 in the first region to the third gain G3 in the third region as the magnitude of the forward travel speed Vs of the vehicle increases from the first vehicle speed V1.

In the present embodiment, when the second vehicle speed V2 at forward traveling of the vehicle is set to be, for example, 25 [km/h], the third gain G3 is decreased in a high-speed range, in other words, the third region in which the forward travel speed Vs of the vehicle is higher than 25 [km/h]. Accordingly, the ratio of the turning angle of the tires relative to the steering angle of the wheel 1 in the high-speed range at forward traveling of the vehicle can be decreased. In addition, since the third gain G3 in the third region is set to be a constant value, the turning angle of the tires can be set to be constant in the high-speed range, in other words, the third region in which the forward travel speed Vs of the vehicle is higher than 25 [km/h]. Thus, behavior of the vehicle at forward traveling of the vehicle can be stabilized.

In addition, it is possible to prevent abrupt change of the turning angle of the tires at forward traveling of the vehicle by gradually decreasing the second gain G2 in an intermediate-speed range, in other words, the second region in which the forward travel speed Vs of the vehicle is equal to or higher than 10 [km/h] (=V1) and lower than 25 [km/h] (=V2) as the forward travel speed Vs of the vehicle increases, thereby providing stable steering feeling. Note that, the first gain G1 may be set to be a value suitable for an individual SBW system. Specifically, for example, the first gain G1 may be equal to or larger than the third gain G3 in the third region and equal to or smaller than the fourth gain G4 gain in the fourth region.

In addition, as illustrated in FIG. 8, the sixth gain G6 in the sixth region is set to be a constant value equal to or larger than the third gain G3 in the third region and smaller than the fourth gain G4 in the fourth region, and the fifth gain G5 in the fifth region is set to be gradually decrease in a range from the fourth gain G4 in the fourth region to the sixth gain G6 in the sixth region as the magnitude of the backward travel speed Vs of the vehicle increases from the third vehicle speed V3. Note that, the sixth gain G6 in the sixth region may be set to be a value suitable for an individual SBW system.

In the present embodiment, when the fourth vehicle speed V4 at backward traveling of the vehicle is set to be, for example, 25 [km/h], the sixth gain G6 in the high-speed range, in other words, the sixth region in which the backward travel speed Vs of the vehicle is higher than 25 [km/h] is decreased. Accordingly, the ratio of the turning angle of the tires relative to the steering angle of the wheel 1 in the high-speed range at backward traveling of the vehicle can be decreased. In addition, since the sixth gain G6 in the sixth region is set to be a constant value, the turning angle of the tires can be set to be constant in the high-speed range, in other words, the sixth region in which the backward travel speed Vs of the vehicle is higher than 25 [km/h]. Thus, behavior of the vehicle at backward traveling of the vehicle can be stabilized. In addition, it is possible to prevent abrupt change of the turning angle of the tires at backward traveling of the vehicle by gradually decreasing the fifth gain G5 in the intermediate-speed range, in other words, the fifth region in which the backward travel speed Vs of the vehicle is equal to or higher than 10 [km/h] (=V3) and lower than 25 [km/h] (=V4) as the backward travel speed Vs of the vehicle increases, thereby providing stable steering feeling.

Figure 9:
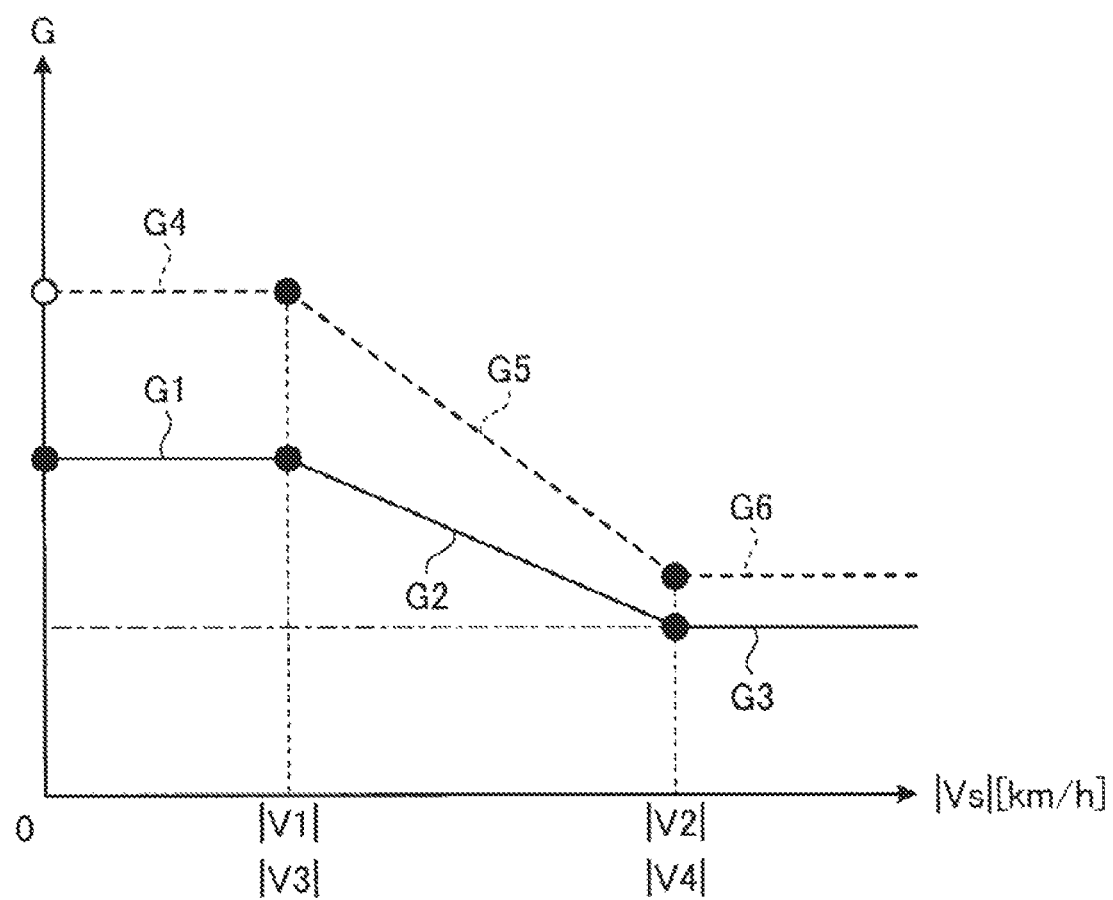
FIG. 9 is a diagram illustrating the exemplary characteristics of the turning ratio map illustrated in FIG. 8 with the absolute value of vehicle speed.

FIG. 9 is a diagram illustrating the exemplary characteristics of the turning ratio map illustrated in FIG. 8 with the absolute value of the vehicle speed. In the example illustrated in FIG. 9, a solid line represents the turning ratio gain G at forward traveling of the vehicle, and a dashed line represents the turning ratio gain G at backward traveling of the vehicle. Note that, FIG. 9 illustrates the example in which the magnitude |V1| of the first vehicle speed at forward traveling of the vehicle is equal to the magnitude |V3| of the third vehicle speed at backward traveling of the vehicle, and the magnitude |V2| of the second vehicle speed at forward traveling of the vehicle is equal to the magnitude |V4| of the fourth vehicle speed at backward traveling of the vehicle, but the present embodiment is not limited thereto.

In the present embodiment, as illustrated in FIG. 9, the turning ratio gain G (a dashed line in FIG. 9) at backward traveling of the vehicle is equal to or larger than the turning ratio gain G (a solid line in FIG. 9) at forward traveling of the vehicle. Accordingly, it is possible to stabilize behavior of a vehicle when traveling backward. Note that, specific numerical values of the first vehicle speed V1 at forward traveling of the vehicle, the second vehicle speed V2 at forward traveling of the vehicle, the third vehicle speed V3 at backward traveling of the vehicle, and the fourth vehicle speed V4 at backward traveling of the vehicle are exemplary, and the present embodiment is not limited thereto.

In addition, the embodiment describes above the example in which the second gain G2 in the second region is linearly changed between the first vehicle speed V1 and the second vehicle speed V2 at forward traveling of the vehicle, but the present embodiment is not limited thereto. For example, the first vehicle speed V1 and the second vehicle speed V2 at forward traveling of the vehicle may be connected by a curve such as a quadratic curve or a cubic curve. In addition, the embodiment describes above the example in which the fifth gain G5 in the fifth region is linearly changed between the third vehicle speed V3 and the fourth vehicle speed V4 at backward traveling of the vehicle, but the present embodiment is not limited thereto. For example, the third vehicle speed V3 and the fourth vehicle speed V4 at backward traveling of the vehicle may be connected by a curve such as a quadratic curve or a cubic curve.

Note that, the drawings used in the above description are conceptual diagrams for performing qualitative description of the present disclosure, and the present disclosure is not limited to these drawings. The above-described embodiments are preferable examples of the present disclosure, but not limited thereto, and may be modified in various manners without departing from the scope of the present disclosure.

Technological ideas that solve the problem related to the first background art will be described below.

(1) A vehicle steering device including: a reaction force device configured to apply steering reaction force to a wheel; a drive device configured to turn tires in accordance with steering of the wheel; and a control unit configured to control the reaction force device and the drive device, in which: the control unit includes a turning ratio map unit configured to set a turning ratio gain in accordance with the vehicle speed of a vehicle, and a target turning angle generation unit configured to generate a target turning angle by multiplying the steering angle of the wheel by the turning ratio gain; and the turning ratio gain at backward traveling of the vehicle is equal to or larger than the turning ratio gain at forward traveling of the vehicle.

(2) The vehicle steering device described in (1), in which, when a first region is defined to be a region in which the magnitude of the vehicle speed at forward traveling of the vehicle is equal to or larger than zero and smaller than a first vehicle speed, a first gain is defined to be the turning ratio gain in the first region, a second region is defined to be a region in which the magnitude of the vehicle speed at forward traveling of the vehicle is equal to or larger than the first vehicle speed and smaller than a second vehicle speed higher than the first vehicle speed, a second gain is defined to be the turning ratio gain in the second region, a third region is defined to be a region in which the magnitude of the vehicle speed at forward traveling of the vehicle is equal to or larger than the second vehicle speed, a third gain is defined to be the turning ratio gain in the third region, a fourth region is defined to be a region in which the magnitude of the vehicle speed at backward traveling of the vehicle is larger than zero and smaller than a third vehicle speed, a fourth gain is defined to be the turning ratio gain in the fourth region, a fifth region is defined to be a region in which the magnitude of the vehicle speed at backward traveling of the vehicle is equal to or larger than the third vehicle speed and smaller than a fourth vehicle speed higher than the third vehicle speed, a fifth gain is defined to be the turning ratio gain in the fifth region, a sixth region is defined to be a region in which the magnitude of the vehicle speed at backward traveling of the vehicle is equal to or larger than the fourth vehicle speed, and a sixth gain is defined to be the turning ratio gain in the sixth region, the fourth gain is a constant value larger than the first gain, the second gain, the third gain, the fifth gain, and the sixth gain.

(3) The vehicle steering device described in (2), in which the third gain is a constant value, the first gain is a constant value larger than the third gain and smaller than the fourth gain, and the second gain gradually decreases in a range from the first gain to the third gain as the magnitude of the vehicle speed at forward traveling of the vehicle increases from the first vehicle speed.

(4) The vehicle steering device described in (2) or (3), in which the third gain is a constant value, the sixth gain is a constant value equal to or larger than the third gain and smaller than the fourth gain, and the fifth gain gradually decreases in a range from the fourth gain to the sixth gain as the magnitude of the vehicle speed at backward traveling of the vehicle increases from the third vehicle speed.

<Disclosure of Aspect for Solving Problem Related to Second Background Art>

The aspect for solving the problem related to the second background art will be described below based on FIGS. 10 to 38.

First Embodiment

Figure 10:
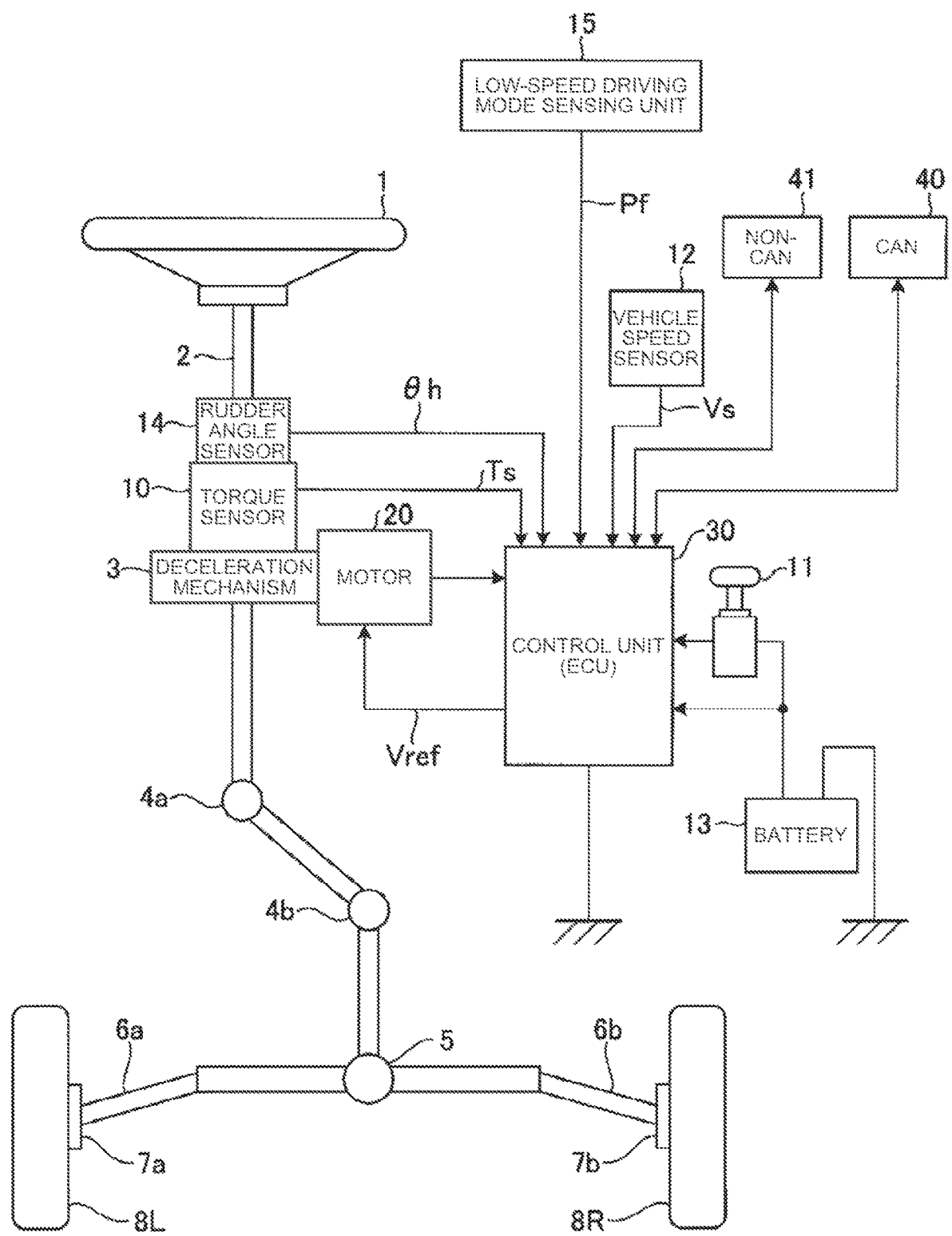
FIG. 10 is a diagram illustrating a typical configuration of an electric power steering device.

FIG. 10 is a diagram illustrating a typical configuration of an electric power steering device. The electric power steering device (EPS) as a vehicle steering device is coupled to steering wheels 8L and 8R through a column shaft (steering shaft or wheel shaft) 2 of a wheel 1, a deceleration mechanism 3, universal joints 4a and 4b, a pinion rack mechanism 5, and tie rods 6a and 6b and further through hub units 7a and 7b in an order in which force provided by a steering person transfers. In addition, a torque sensor 10 configured to detect steering torque Ts of the wheel 1 and a rudder angle sensor 14 configured to detect a steering angle θh are provided to the column shaft 2 including a torsion bar, and a motor 20 configured to assist steering force of the wheel 1 is coupled to the column shaft 2 through the deceleration mechanism 3. Electric power is supplied from a battery 13 to a control unit (ECU) 30 configured to control the electric power steering device, and an ignition key signal is input to the control unit 30 through an ignition key 11. The control unit 30 performs calculation of a current command value of an assist (steering auxiliary) command based on the steering torque Ts detected by the torque sensor 10 and vehicle speed Vs detected by a vehicle speed sensor 12, and controls current supplied to the motor 20 through a voltage control command value Vref obtained by providing compensation or the like to the current command value.

The control unit 30 is connected with an on-board network such as a controller area network (CAN) 40 through which various kinds of information of a vehicle are transmitted and received. In addition, the control unit 30 is connectable with a non-CAN 41 configured to transmit and receive communication other than the CAN 40, analog and digital signals, radio wave, and the like. The control unit 30 is mainly configured as a CPU (including an MCU and an MPU). FIG. 2 is a schematic diagram illustrating a hardware configuration of the control unit configured to control the electric power steering device. A control computer 1100 configured as the control unit 30 includes a central processing unit (CPU) 1001, a read only memory (ROM) 1002, a random access memory (RAM) 1003, an electrically erasable programmable ROM (EEPROM) 1004, an interface (I/F) 1005, an analog/digital (A/D) converter 1006, and a pulse width modulation (PWM) controller 1007, and these components are connected with a bus.

The CPU 1001 is a processing device configured to execute a computer program for control (hereinafter referred to as a control program) of the electric power steering device and control the electric power steering device. The ROM 1002 stores a control program for controlling the electric power steering device. In addition, the RAM 1003 is used as a work memory for operating the control program. The EEPROM 1004 stores, for example, control data input to and output from the control program. The control data is used on the control program loaded onto the RAM 1003 after the control unit 30 is powered on, and is overwritten to the EEPROM 1004 at a predetermined timing. The ROM 1002, the RAM 1003, the EEPROM 1004, and the like are storage devices configured to store information and are storage devices (primary storage devices) directly accessible from the CPU 1001.

The A/D converter 1006 receives, for example, signals of the steering torque Ts, a detected current value Im of the motor 20, and the steering angle θh and converts the signals into digital signals. The interface 1005 is connected with the CAN 40. The interface 1005 receives a signal (vehicle speed pulse) of a vehicle speed V from the vehicle speed sensor 12. The PWM controller 1007 outputs a PWM control signal of each UVW phase based on a current command value to the motor 20.

Figure 11:
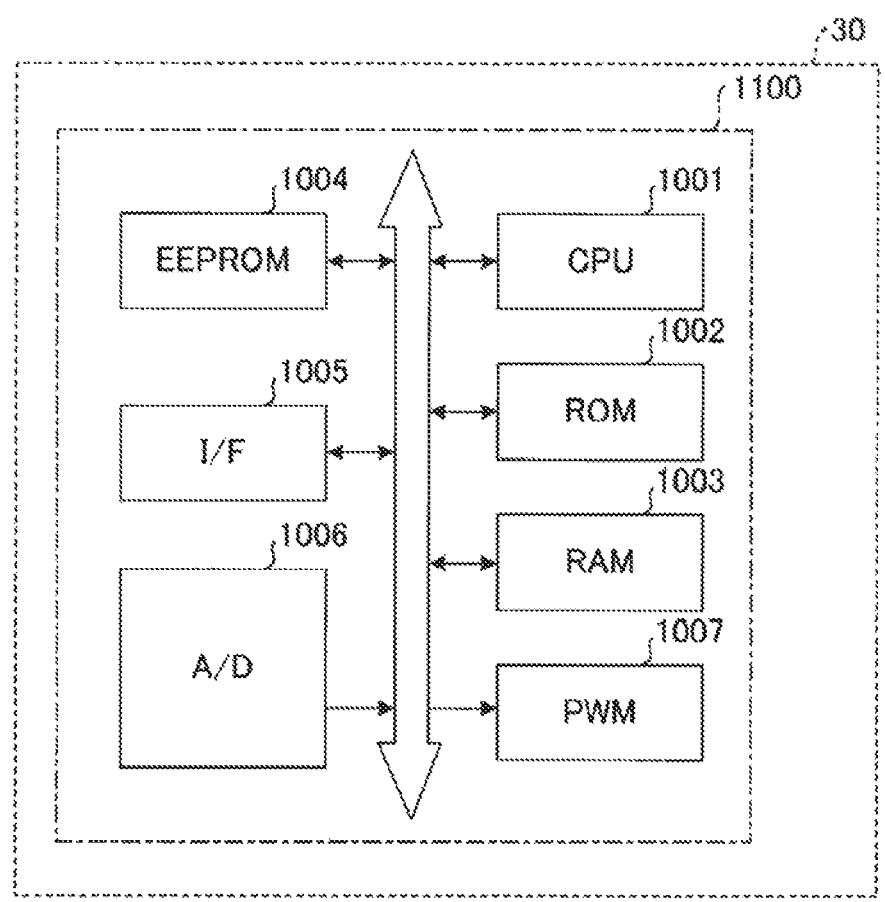
FIG. 11 is a schematic diagram illustrating a hardware configuration of a control unit configured to control the electric power steering device.
Figure 12:
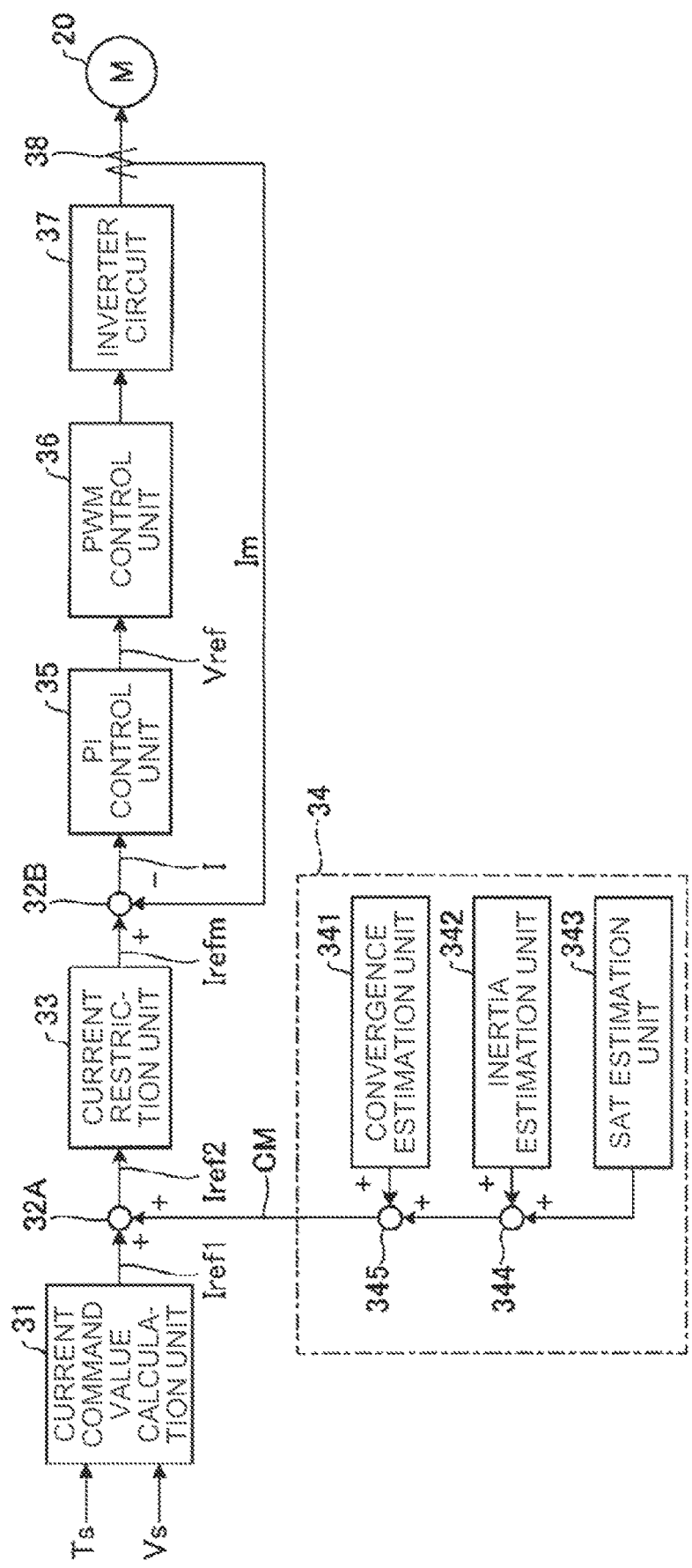
FIG. 12 is a diagram illustrating an exemplary internal block configuration of the control unit in the electric power steering device.

FIG. 11 is a diagram illustrating an exemplary internal block configuration of a control unit in an electric power steering device. The steering torque Ts and the vehicle speed Vs are input to a current command value calculation unit 31. The current command value calculation unit 31 refers to, based on the steering torque Ts and the vehicle speed Vs, a look-up table (such as an assist map) stored in advance and calculates a current command value Iref1 that is a control target value of current supplied to the motor 20.

A compensation signal generation unit 34 generates a compensation signal CM. The compensation signal generation unit 34 includes a convergence estimation unit 341, an inertia estimation unit 342, and a self-aligning torque (SAT) estimation unit 343. The convergence estimation unit 341 estimates the yaw rate of the vehicle based on the angular velocity of the motor 20, and estimates a compensation value with which shake operation of the wheel 1 is reduced to improve convergence of the yaw of the vehicle. The inertia estimation unit 342 estimates the inertial force of the motor 20 based on the angular acceleration of the motor 20, and estimates a compensation value with which the inertial force of the motor 20 is compensated to increase response. The SAT estimation unit 343 estimates self-aligning torque $T_{SAT}$ based on the steering torque Ts, assist torque, and the angular velocity and angular acceleration of the motor 20, and estimates a compensation value with which the assist torque is compensated with the self-aligning torque as reaction force. The compensation signal generation unit 34 may include an estimation unit configured to estimate another compensation value in addition to the convergence estimation unit 341, the inertia estimation unit 342, and the SAT estimation unit 343. The compensation signal CM is a sum obtained by adding, at an addition unit 345, the compensation value of the convergence estimation unit 341 and a sum obtained by adding the compensation value of the inertia estimation unit 342 and the compensation value of the SAT estimation unit 343 at an addition unit 344. Note that, in the present disclosure, the self-aligning torque $T_{SAT}$ estimated by the SAT estimation unit 343 is also output to a target steering torque generation unit 200 to be described later.

At an addition unit 32A, the compensation signal CM from the compensation signal generation unit 34 is added to the current command value Iref1, and characteristic compensation of a steering system is provided to the current command value Iref1 through the addition of the compensation signal CM to improve convergence, an inertia characteristic, and the like. Then, the current command value Iref1 becomes a current command value Iref2 provided with characteristic compensation through the addition unit 32A, and the current command value Iref2 is input to a current restriction unit 33. At the current restriction unit 33, largest current of the current command value Iref2 is restricted, and a current command value Irefm is generated. The current command value Irefm is input to a subtraction unit 32B, and a deviation I (Irefm−Im) from the detected current value Im fed back from the motor 20 side is calculated at the subtraction unit 32B. The deviation I is input to a PI control unit 35 for characteristic improvement of steering operation. Accordingly, the voltage control command value Vref, characteristics of which are improved at the PI control unit 35 is input to a PWM control unit 36, and in addition, the motor 20 is PWM-driven through an inverter circuit 37 as a motor drive unit. The detected current value Im of the motor 20 is detected by a current detector 38 and fed back to the subtraction unit 32B. In addition, the inverter circuit 37 includes a field effect transistor (hereinafter referred to as a FET) as a drive element and is configured as a bridge circuit of the FET.

In assist control by the conventional electric power steering device, steering torque manually applied by a driver is detected by a torque sensor as twist torque of the torsion bar, and motor current is controlled as assist current mainly in accordance with the torque. However, when control is performed by this method, the steering torque changes depending on the steering angle because of difference in the state (for example, tilt) of a road surface in some cases. The steering torque is also affected by variation of a motor output characteristic due to long-term use in some cases.

Figure 13:
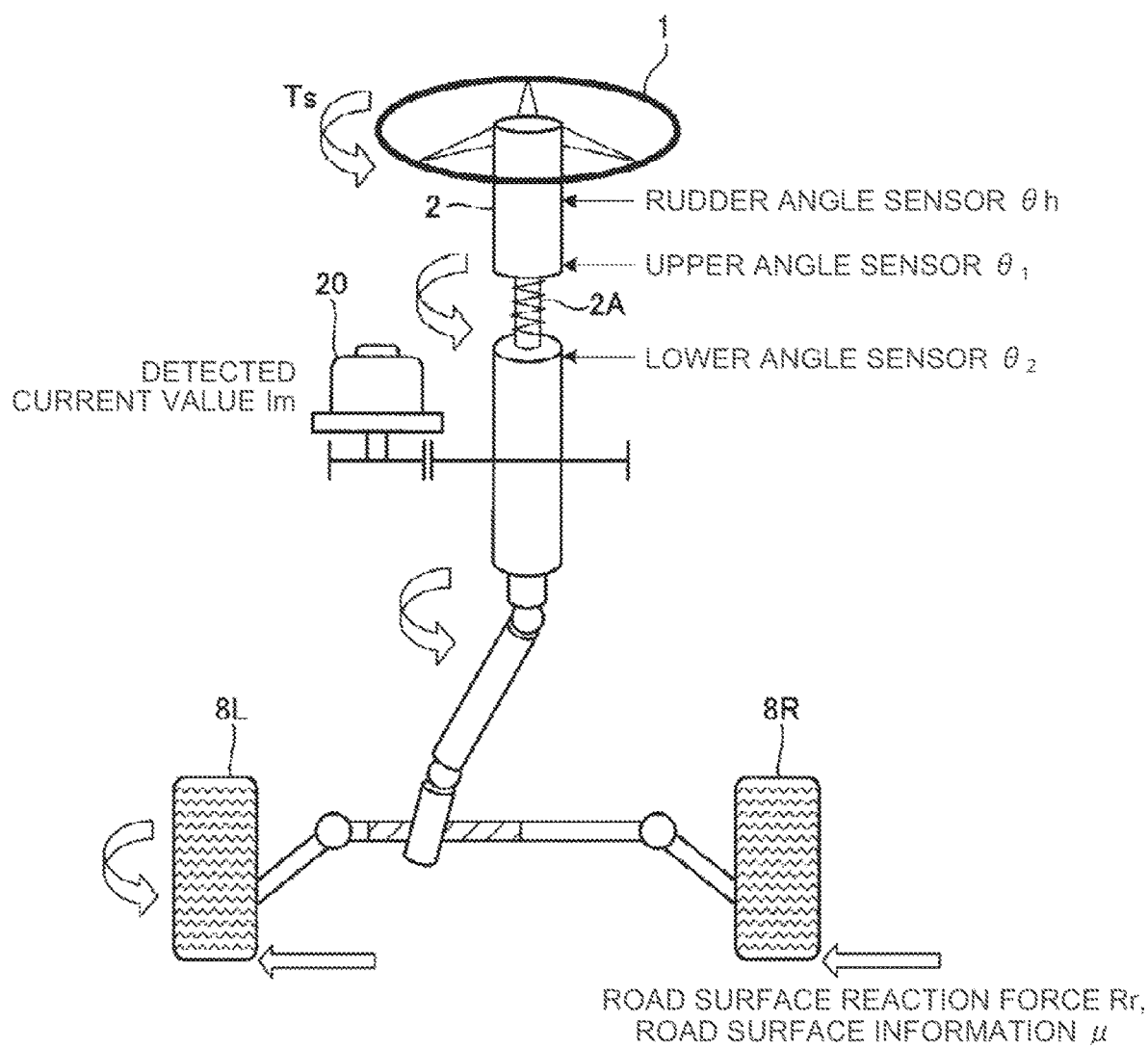
FIG. 13 is a structural diagram illustrating exemplary installation of a rudder angle sensor.

FIG. 13 is a structural diagram illustrating exemplary installation of the rudder angle sensor. The column shaft 2 includes a torsion bar 2A. Road surface reaction force Rr and road surface information (road surface friction resistance p) act on the steering wheels 8L and 8R. An upper angle sensor is provided on the wheel side of the column shaft 2 with respect to the torsion bar 2A. A lower angle sensor is provided on the steering wheel side of the column shaft 2 with respect to the torsion bar 2A. The upper angle sensor detects a wheel angle $\theta_1$, and the lower angle sensor detects a column angle $\theta_2$. The steering angle θh is detected by a rudder angle sensor provided at an upper part of the column shaft 2. The twist angle Δθ of the torsion bar is expressed in Expression (1) below based on the deviation between the wheel angle $\theta_1$ and the column angle $\theta_2$. In addition, torsion bar torque Tt is expressed in Expression (2) below by using the twist angle Δθ of the torsion bar expressed in Expression (1). Note that, Kt represents the spring constant of the torsion bar 2A.

$$\Delta\theta = \theta_2 - \theta_1 \quad (1)$$

$$Tt = -Kt \times \Delta\theta \quad (2)$$

The torsion bar torque Tt may be detected by using a torque sensor. In the present embodiment, the torsion bar torque Tt is treated as the steering torque Ts.

Figure 14:
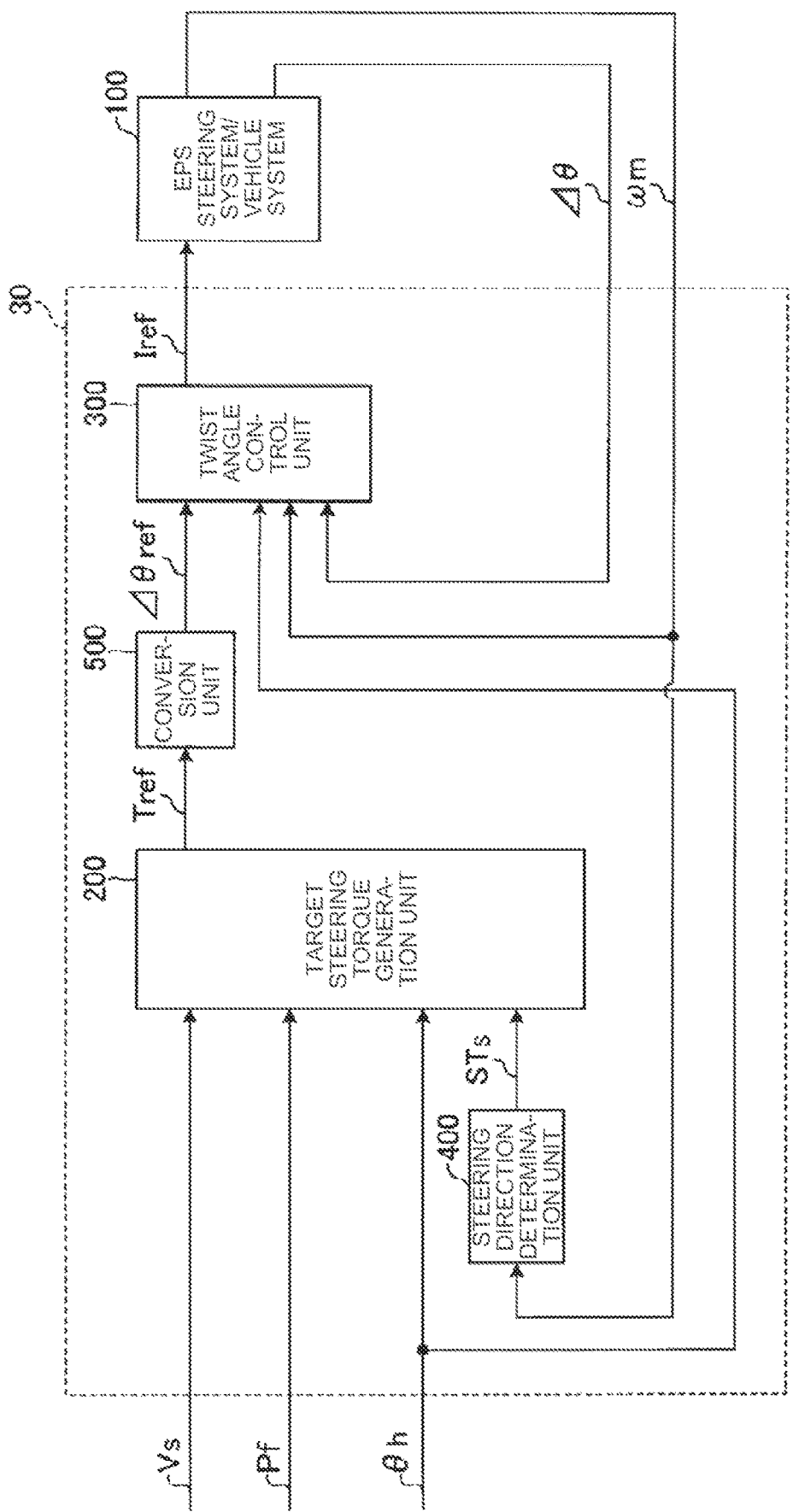
FIG. 14 is a diagram illustrating an exemplary internal block configuration of a control unit according to a first embodiment.

FIG. 14 is a diagram illustrating an exemplary internal block configuration of the control unit according to a first embodiment. The control unit 30 includes, as internal block components, a target steering torque generation unit 200, a twist angle control unit 300, a steering direction determination unit 400, and a conversion unit 500. In the present embodiment, wheel steering by the driver is assisted and controlled by the motor 20 of an EPS steering system/vehicle system 100. The EPS steering system/vehicle system 100 includes an angle sensor and an angular velocity calculation unit in addition to the motor 20.

Figure 15:
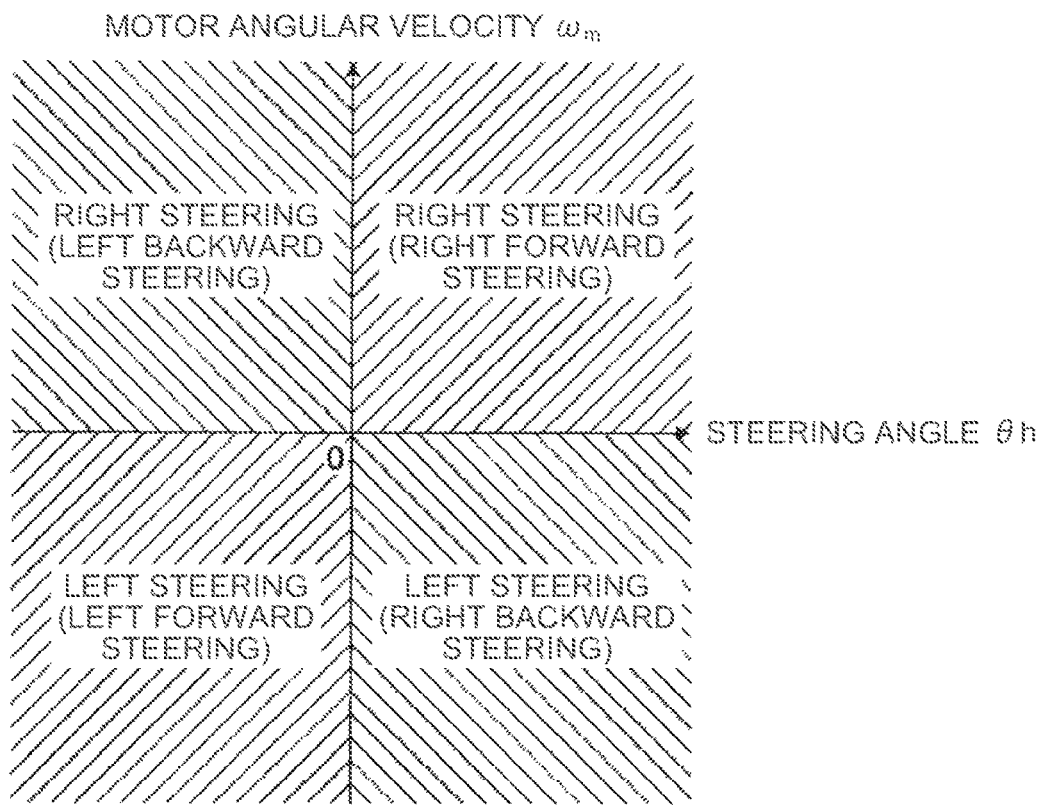
FIG. 15 is an explanatory diagram of a steering direction.

The target steering torque generation unit 200 generates a target steering torque Tref that is a target value of the steering torque when the steering system of the vehicle is assisted and controlled in the present disclosure. The conversion unit 500 converts the target steering torque Tref into a target twist angle Δθref. The twist angle control unit 300 generates a motor current command value Iref that is a control target value of current supplied to the motor 20. The twist angle control unit 300 calculates the motor current command value Iref with which the twist angle Δθ is equal to the target twist angle Δθref. The motor 20 is driven by the motor current command value Iref. The steering direction determination unit 400 determines whether the steering direction is right or left based on a motor angular velocity ωm output from the EPS steering system/vehicle system 100, and outputs a result of the determination as a steering state signal STs. FIG. 15 is an explanatory diagram of the steering direction.

A steering state indicating whether the steering direction is right or left can be obtained as, for example, the relation between the steering angle θh and the motor angular velocity ωm as illustrated in FIG. 15. Specifically, the steering direction is determined to be "right" when the motor angular velocity ωm is a positive value, or the steering direction is determined to be "left" when the motor angular velocity ωm is a negative value. Note that, an angular velocity calculated by performing speed calculation on the steering angle θh, the wheel angle $\theta_1$, or the column angle $\theta_2$ may be used in place of the motor angular velocity ωm. The conversion unit 500 converts the target steering torque Tref generated at the target steering torque generation unit 200 into the target twist angle Δθref by using the relation of Expression (2) above.

Figure 16:
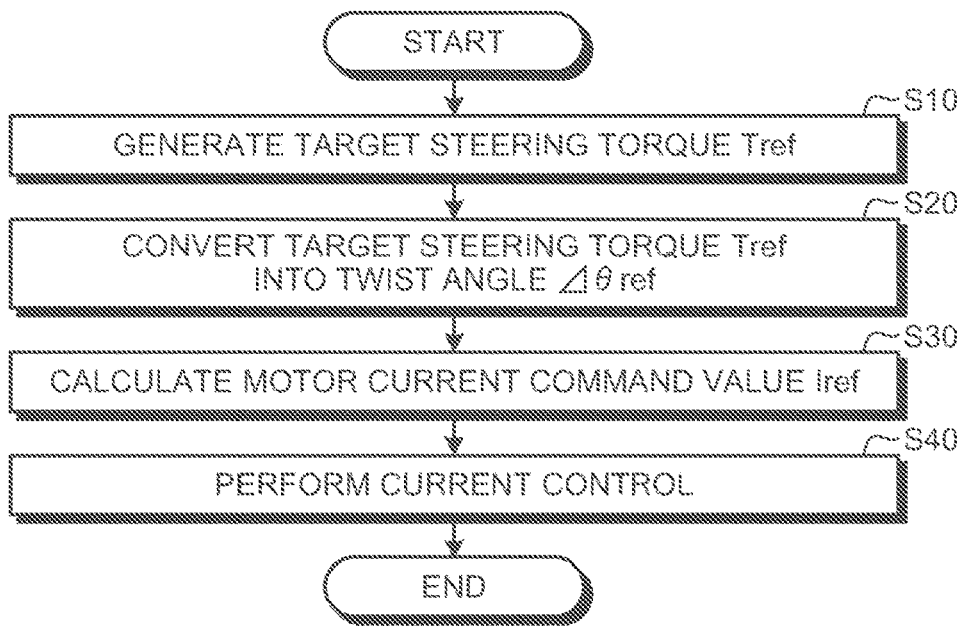
FIG. 16 is a flowchart illustrating exemplary operation of the control unit according to the first embodiment.

Subsequently, exemplary basic operation at the control unit of the first embodiment will be described below. FIG. 16 is a flowchart illustrating exemplary operation of the control unit according to the first embodiment. The steering direction determination unit 400 determines whether the steering direction is right or left based on the sign of the motor angular velocity ωm output from the EPS steering system/vehicle system 100, and outputs a result of the determination as the steering state signal STs to the target steering torque generation unit 200 (step S10). The target steering torque generation unit 200 generates the target steering torque Tref based on the vehicle speed Vs, a vehicle speed determination signal Vfail, the steering state signal STs, the steering angle θh, and a real yaw rate γre (step S20). The conversion unit 500 converts the target steering torque Tref generated at the target steering torque generation unit 200 into the target twist angle Δθref (step S20). The target twist angle Δθref is output to the twist angle control unit 300. The twist angle control unit 300 calculates the motor current command value Iref based on the target twist angle Δθref, the steering angle θh, the twist angle Δθ, and the motor angular velocity ωm (step S30). Then, current control is performed to drive the motor 20 based on the motor current command value Iref output from the twist angle control unit 300 (step S40).

Figure 17:
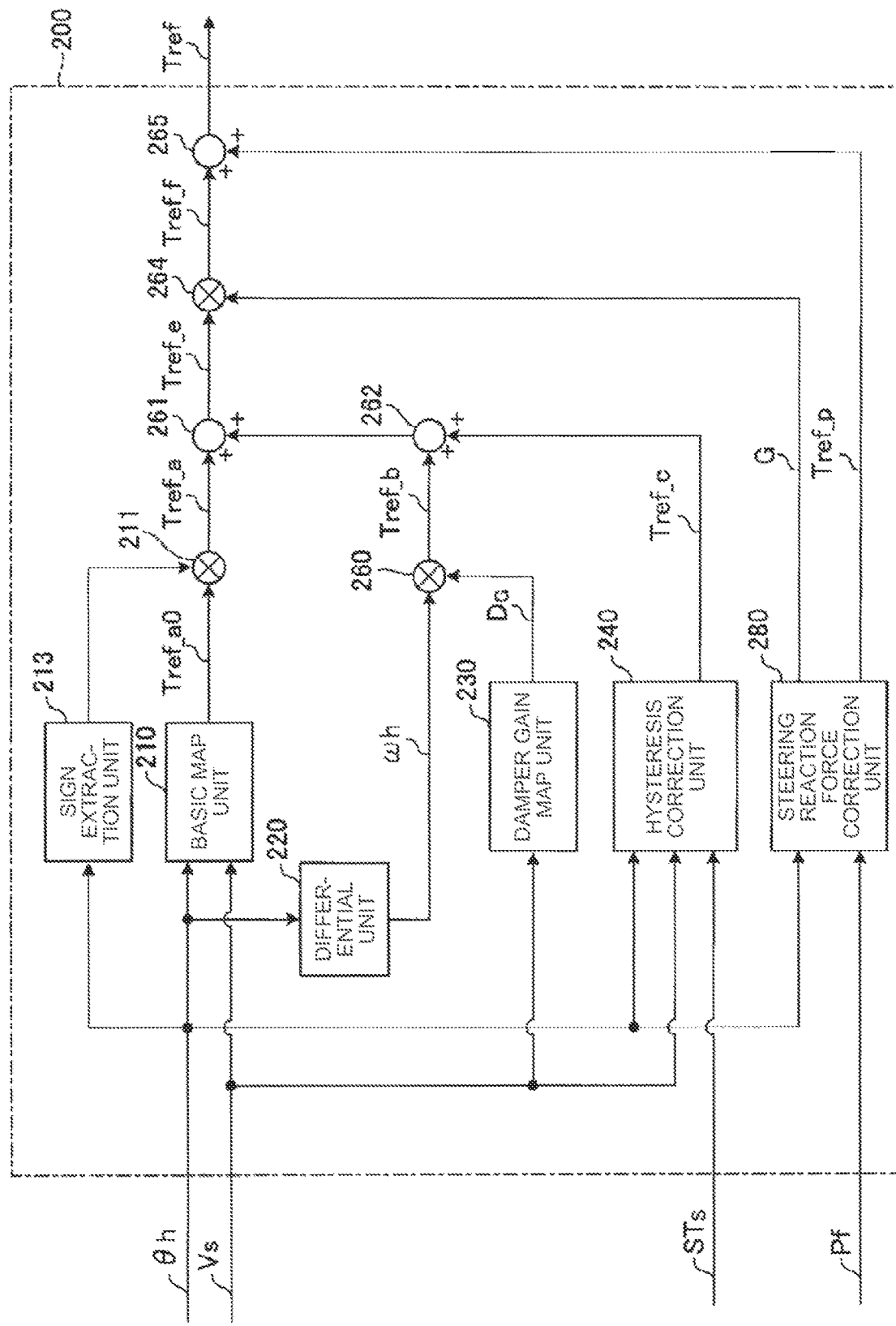
FIG. 17 is a block diagram illustrating an exemplary configuration of a target steering torque generation unit of the first embodiment.
Figure 18:
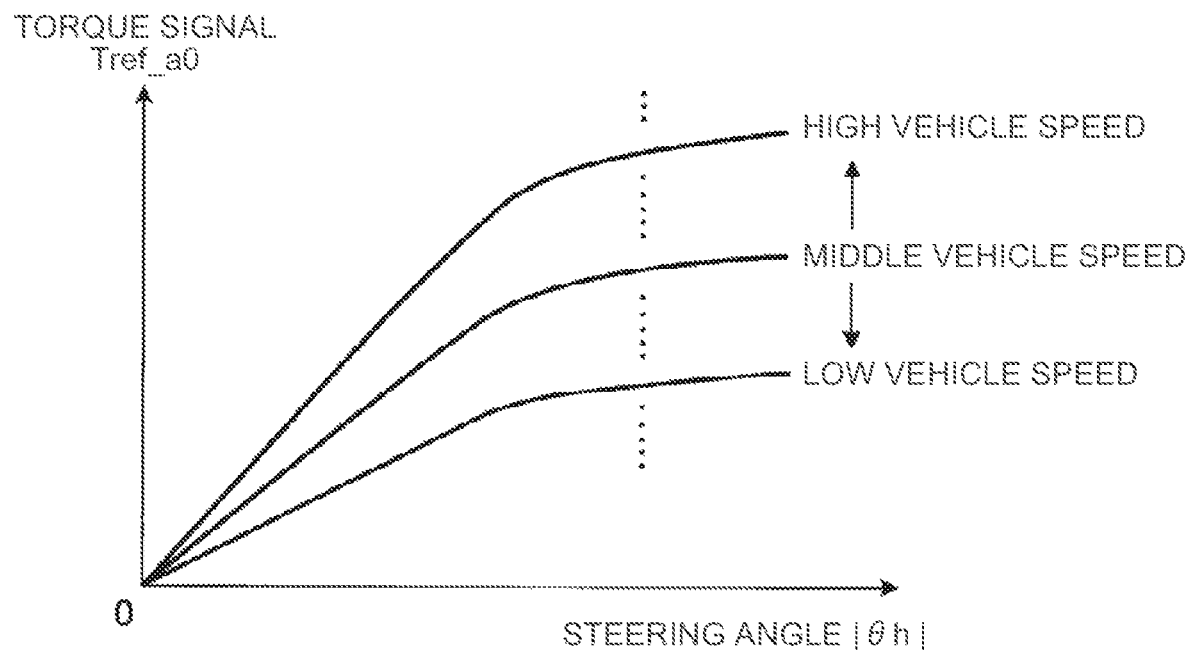
FIG. 18 is a diagram illustrating exemplary characteristics of a basic map held by a basic map unit.
Figure 19:
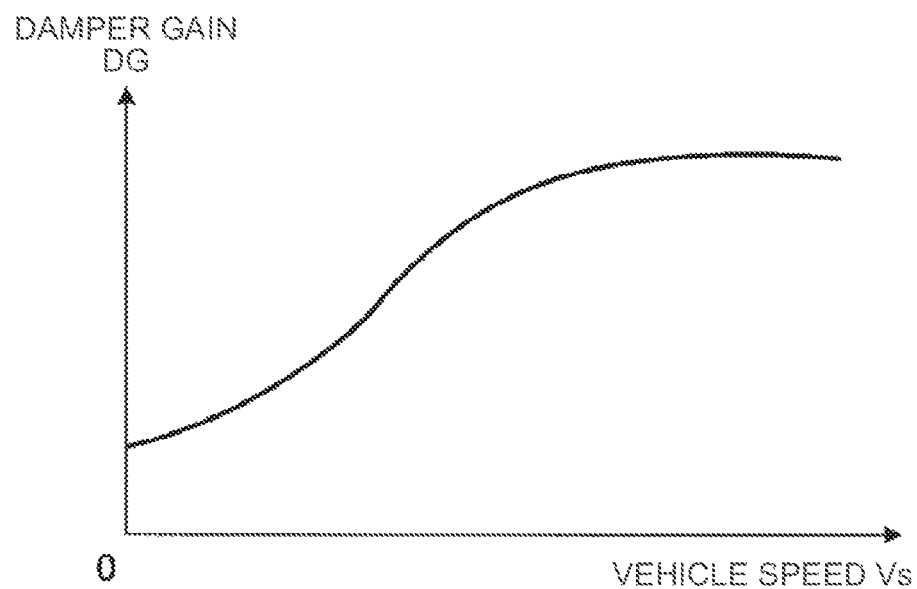
FIG. 19 is a diagram illustrating exemplary characteristics of a damper gain map held by a damper gain map unit.

FIG. 17 is a block diagram illustrating an exemplary configuration of the target steering torque generation unit of the first embodiment. As illustrated in FIG. 17, the target steering torque generation unit 200 includes a basic map unit 210, a multiplication unit 211, a sign extraction unit 213, a differential unit 220, a damper gain map unit 230, a hysteresis correction unit 240, a SAT information correction unit 250, multiplication units 260 and 264, addition units 261, 262, and 265, and a steering reaction force correction unit 280. FIG. 18 is a diagram illustrating exemplary characteristics of a basic map held by the basic map unit. FIG. 19 is a diagram illustrating exemplary characteristics of a damper gain map held by the damper gain map unit. The steering angle θh and the vehicle speed Vs are input to the basic map unit 210. The basic map unit 210 outputs a torque signal Tref_a0 having the vehicle speed Vs as a parameter by using the basic map illustrated in FIG. 18. Specifically, the basic map unit 210 outputs the torque signal Tref_a0 in accordance with the vehicle speed Vs.

As illustrated in FIG. 18, the torque signal Tref_a0 has such a characteristic that the torque signal Tref_a0 increases as the magnitude (absolute value) |θh| of the steering angle θh increases. In addition, the torque signal Tref_a has such a characteristic that the torque signal Tref_a increases as the vehicle speed Vs increases. Note that, although a map in accordance with the magnitude |θh| of the steering angle θh is configured in FIG. 9, a map in accordance with the positive or negative steering angle θh may be configured. In this case, the value of the torque signal Tref_a0 can be positive and negative values, and sign calculation to be described later is unnecessary.

The sign extraction unit 213 extracts the sign of the steering angle θh. Specifically, for example, the value of the steering angle θh is divided by the absolute value of the steering angle θh. Accordingly, the sign extraction unit 213 outputs "1" when the sign of the steering angle θh is "+", or outputs "−1" when the sign of the steering angle θh is "−". The steering angle θh is input to the differential unit 220. The differential unit 220 calculates a rudder angular velocity ωh that is angular velocity information by differentiating the steering angle θh. The differential unit 220 outputs the calculated rudder angular velocity ωh to the multiplication unit 260. The vehicle speed Vs is input to the damper gain map unit 230. The damper gain map unit 230 outputs a damper gain $D_G$ in accordance with the vehicle speed Vs by using a vehicle speed sensitive damper gain map illustrated in FIG. 19. As illustrated in FIG. 19, the damper gain $D_G$ has such a characteristic that the damper gain $D_G$ gradually increases as the vehicle speed Vs increases. The damper gain $D_G$ may be variable in accordance with the steering angle θh. The multiplication unit 260 multiplies the rudder angular velocity ωh output from the differential unit 220 by the damper gain $D_G$ output from the damper gain map unit 230, and outputs a result of the multiplication as a torque signal Tref_b to the addition unit 262.

The steering direction determination unit 400 performs determination as illustrated in, for example, FIG. 6. The steering angle θh, the vehicle speed Vs, and the steering state signal STs, which is a result of the determination illustrated in FIG. 6, are input to the hysteresis correction unit 240. The hysteresis correction unit 240 calculates a torque signal Tref_c based on the steering angle θh and the steering state signal STs by using Expressions (3) and (4) below. Note that, in Expressions (3) and (4) below, x represents the steering angle θh, and $y_R$=Tref_c and $y_L$=Tref_c represent the torque signal Tref_c. In addition, a coefficient "a" is a value larger than one, and a coefficient "c" is a value larger than zero. A coefficient Ahys indicates the output width of a hysteresis characteristic, and the coefficient "c" indicates the roundness of the hysteresis characteristic.

$$y_R = Ahys\{1 - a^{-c(x-b)}\} \quad (3)$$

$$y_L = -Ahys\{1 - a^{c(x-b')}\} \quad (4)$$

In a case of right steering, the torque signal Tref_c ($y_R$) is calculated by using Expression (3) above. In a case of left steering, the torque signal Tref_c ($y_L$) is calculated by using Expression (4) above. Note that, when switching is made from right steering to left steering or when switching is made from left steering to right steering, a coefficient "b" or "b'" indicated in Expression (5) or (6) below is substituted into Expressions (3) and (4) above after steering switching based on the values of final coordinates ($x_1$, $y_1$) that are the previous values of the steering angle θh and the torque signal Tref_c. Accordingly, continuity through steering switching is maintained.

$$b = x_1 + (1/c)\log_a\{1 - (y_1/Ahys)\} \quad (5)$$

$$b' = x_1 - (1/c)\log_a\{1 - (y_1/Ahys)\} \quad (6)$$

Expressions (5) and (6) above can be derived by substituting $x_1$ into x and substituting $y_1$ into $y_R$ and $y_L$ in Expressions (3) and (4) above. For example, when Napierian logarithm e is used as the coefficient "a", Expressions (3), (4), (5), and (6) above can be expressed as Expressions (7), (8), (9), and (10) below, respectively.

$$y_R = Ahys[1 - \exp\{-c(x-b)\}] \quad (7)$$

$$y_L = -Ahys[\{1 - \exp\{-c(x-b')\}] \quad (8)$$

$$b = x_1 + (1/c)\log_e\{1 - (y_1/Ahys)\} \quad (9)$$

$$b' = x_1 - (1/c)\log_e\{1 - (y_1/Ahys)\} \quad (10)$$

Figure 20:
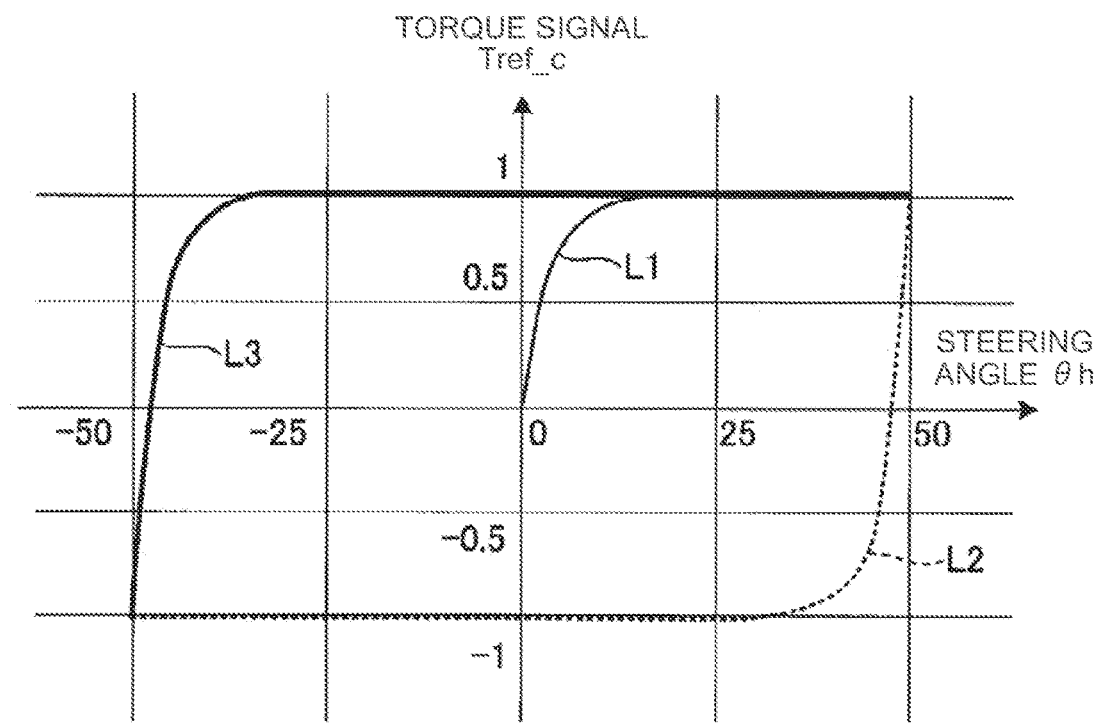
FIG. 20 is a diagram illustrating exemplary characteristics of a hysteresis correction unit.

FIG. 20 is a diagram illustrating exemplary characteristics of the hysteresis correction unit. The example illustrated in FIG. 20 indicates an exemplary characteristic of the torque signal Tref_c subjected to hysteresis correction when Ahys=1 [Nm] and c=0.3 are set in Expressions (9) and (10) above and steering is performed from 0 [deg] to +50 [deg] or −50 [deg]. As illustrated in FIG. 11, the torque signal Tref_c output from the hysteresis correction unit 240 has a hysteresis characteristic such as the origin at zero→L1 (thin line)→L2 (dashed line)→L3 (bold line). Note that, the coefficient Ahys, which indicates the output width of the hysteresis characteristic, and the coefficient "c", which indicates the roundness thereof may be variable in accordance with one or both of the vehicle speed Vs and the steering angle θh. In addition, the rudder angular velocity ωh is obtained through the differential calculation on the steering angle θh but is provided with low-pass filter (LPF) processing as appropriate to reduce influence of noise in a higher range. In addition, the differential calculation and the LPF processing may be performed with a high-pass filter (HPF) and a gain. Moreover the rudder angular velocity ωh may be calculated by performing the differential calculation and the LPF processing not on the steering angle θh but on a wheel angle θ1 detected by the upper angle sensor or a column angle θ2 detected by the lower angle sensor. The motor angular velocity ωm may be used as the angular velocity information in place of the rudder angular velocity ωh, and in this case, the differential unit 220 is not needed.

Referring back to FIG. 17, the multiplication unit 211 multiplies the torque signal Tref_a0 output from the basic map unit 210 by the sign of the steering angle θh output from the sign extraction unit 213, and outputs a result of the multiplication as the torque signal Tref_a to the addition unit 261. Accordingly, the torque signal Tref_a in accordance with the positive or negative steering angle θh can be obtained. The torque signal Tref_a, the torque signal Tref_b, and the torque signal Tref_c obtained as described above are added at the addition units 261 and 262 to obtain a torque signal Tref_e. The torque signal Tref_a in the present embodiment corresponds to a "first torque signal" of the present disclosure. In addition, the torque signal Tref_e in the present embodiment corresponds to a "second torque signal" of the present disclosure.

Figure 21:
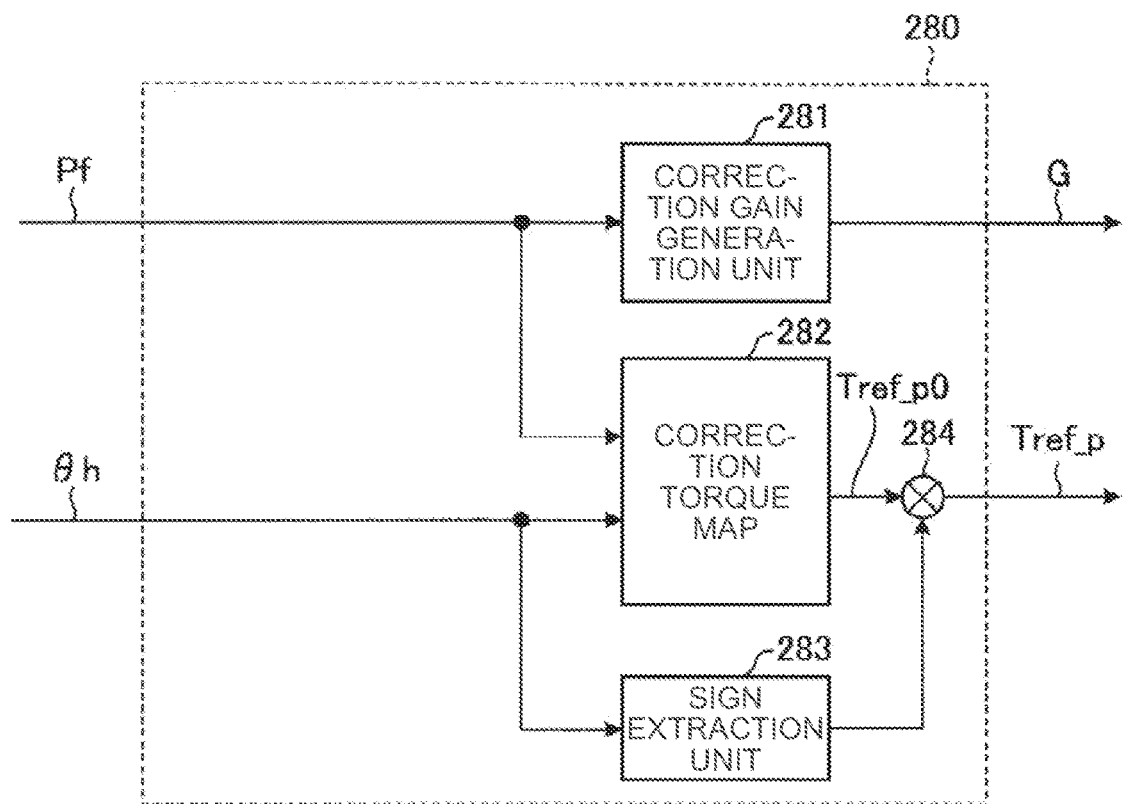
FIG. 21 is a block diagram illustrating an exemplary configuration of a steering reaction force correction unit.

FIG. 21 is a block diagram illustrating an exemplary configuration of the steering reaction force correction unit. As illustrated in FIG. 21, the steering reaction force correction unit 280 includes a correction gain generation unit 281, a correction torque map 282, a sign extraction unit 283, and a multiplication unit 284. The steering reaction force correction unit 280 receives a low-speed driving mode signal Pf output from the steering angle θh and a low-speed driving mode sensing unit 15 (refer to FIG. 10).

A "low-speed driving mode (second mode)" will be described below. In the present embodiment, the "low-speed driving mode (second mode)" is a driving mode selected when the driver has performed a predetermined low-speed driving mode transition operation in which, for example, the vehicle is moved to a predetermined stop position to, for example, park the vehicle in a car park or the vehicle is moved backward to return from a dead end into which the vehicle has entered. In other words, the low-speed driving mode (second mode) in the present embodiment is a driving mode for moving the vehicle at low speed when the predetermined low-speed driving mode transition operation is performed as described above.

The low-speed driving mode sensing unit 15 is a component configured to sense that the predetermined low-speed driving mode transition operation is performed by the driver, and output the low-speed driving mode signal Pf. The low-speed driving mode sensing unit 15 may sense that, for example, a "parking button" provided to a center console of the vehicle or the like is pressed by the driver, and output the low-speed driving mode signal Pf. In addition, the low-speed driving mode sensing unit 15 may sense that, for example, the driver operates a shift knob of the vehicle to select the position of "reverse (backward travel)", "parking F (forward travel)", or "parking B (backward travel)", and output the low-speed driving mode signal Pf. The "parking F (forward travel)" indicates a position selected in a case of forward traveling in the low-speed driving mode (second mode), and the "parking B (backward travel)" indicates a position selected in a case of backward traveling in the low-speed driving mode (second mode). The low-speed driving mode (second mode) by the driver may be selected in a manner other than that described above, and the present invention is not limited by the manner of selection of the low-speed driving mode (second mode) by the driver. Note that, in the following description, a normal driving mode when the low-speed driving mode (second mode) is not selected is also referred to as a "drive mode (first mode)". In other words, in the present disclosure, the low-speed driving mode sensing unit 15 corresponds to a "determination unit" configured to sense the predetermined low-speed driving mode transition operation and determine the low-speed driving mode (second mode) different from the drive mode (first mode).

In the low-speed driving mode (second mode), the correction gain generation unit 281 outputs a correction gain G (G is a positive value smaller than one) in accordance with the low-speed driving mode signal Pf. Specifically, in the low-speed driving mode (second mode), the correction gain generation unit 281 outputs, for example, the correction gain G=0.3. In addition, in the drive mode (first mode), the correction gain generation unit 281 outputs the correction gain G=1. The value of the correction gain G in the low-speed driving mode (second mode) is exemplary and not limited to 0.3. The value of the correction gain G in the low-speed driving mode (second mode) may be a predetermined positive value smaller than one.

Correction torque in accordance with the magnitude |θh| of the steering angle θh is set to the correction torque map 282. The correction torque map 282 outputs a correction torque signal Tref_p0 in accordance with the magnitude |θh| of the steering angle θh. The sign extraction unit 283 extracts the sign of the steering angle θh. Specifically, for example, the value of the steering angle θh is divided by the absolute value of the steering angle θh. Accordingly, the sign extraction unit 283 outputs "1" when the sign of the steering angle θh is "+", or outputs "−1" when the sign of the steering angle θh is "−". The multiplication unit 284 multiplies the correction torque signal Tref_p0 output from the correction torque map 282 by the sign of the steering angle θh output from the sign extraction unit 283, and outputs a result of the multiplication as a correction torque signal Tref_p. Accordingly, the correction torque signal Tref_p in accordance with the positive or negative steering angle θh can be obtained.

Figure 22:
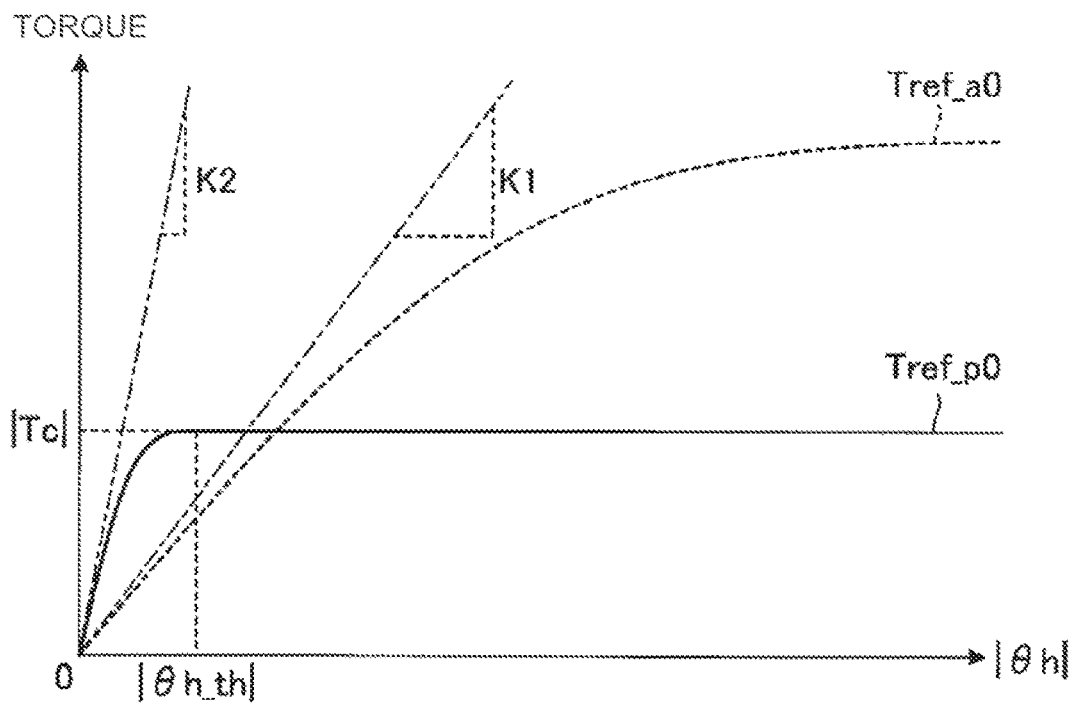
FIG. 22 is a diagram illustrating an exemplary correction torque map.

FIG. 22 is a diagram illustrating an exemplary correction torque map. In FIG. 22, the horizontal axis represents the absolute value |θh| of the steering angle θh, and the vertical axis represents torque. In FIG. 22, an example of the torque signal Tref_a0 is illustrated with a dashed line, and the correction torque signal Tref_p0 is illustrated with a solid line. Note that, although a map in accordance with the magnitude (absolute value) |θh| of the steering angle θh is configured in FIG. 22, a map in accordance with the positive or negative steering angle θh may be configured. In this case, the value of the correction torque signal Tref_p0 can be positive and negative values. The correction torque map 282 may be stored in, for example, the EEPROM 1004 of the control computer 1100 configured as the control unit 30 or may be held by the steering reaction force correction unit 280.

As illustrated in FIG. 22, the correction torque signal Tref_p0 has such a characteristic that, in a region in which the absolute value |θh| of the steering angle θh is smaller than a threshold value θh_th, the correction torque signal Tref_p0 increases along a curve having a change rate gradually decreasing as the absolute value |θh| of the steering angle θh increases. In addition, as illustrated in FIG. 13, the correction torque signal Tref_p0 has a constant value |Tc| in a region in which the absolute value |θh| of the steering angle θh is equal to or larger than a threshold value |θh_th|. In the present embodiment, a gradient K2 of the correction torque signal Tref_p0 at the absolute value |θh| of the steering angle θh=0 has a value larger than a gradient K1 of the torque signal Tref_a0 at the absolute value |θh| of the steering angle θh=0. The threshold value |θh_th| and the constant value |Tc| may be optional predetermined values.

The steering reaction force correction unit 280 outputs the correction torque signal Tref_p in accordance with the low-speed driving mode signal Pf. In the low-speed driving mode (second mode), the steering reaction force correction unit 280 outputs the correction torque signal Tref_p in accordance with the steering angle θh. In addition, in the drive mode (first mode), the steering reaction force correction unit 280 outputs the correction torque signal Tref_p=0 irrespective of the steering angle θh.

Referring back to FIG. 17, the multiplication unit 264 multiplies the torque signal Tref_e output from the addition unit 261 by the correction gain G output from the steering reaction force correction unit 280, and outputs a result of the multiplication as a torque signal Tref_f to the addition unit 265. The addition unit 265 adds the correction torque signal Tref_p output from the steering reaction force correction unit 280 to the torque signal Tref_f output from the multiplication unit 264, and outputs a result of the addition as the target steering torque Tref. Specifically, the target steering torque Tref can be expressed by Expression (11) described below.

$$\text{Tref} = (\text{Tref\_e}) \times G + \text{Tref\_p} = \text{Tref\_f} + \text{Tref\_p} \qquad (11)$$

The torque signal Tref_f in the present embodiment corresponds to a "third torque signal" of the present disclosure. In addition, the correction torque signal Tref_p in the present embodiment corresponds to a "fourth torque signal" of the present disclosure.

Figure 23:
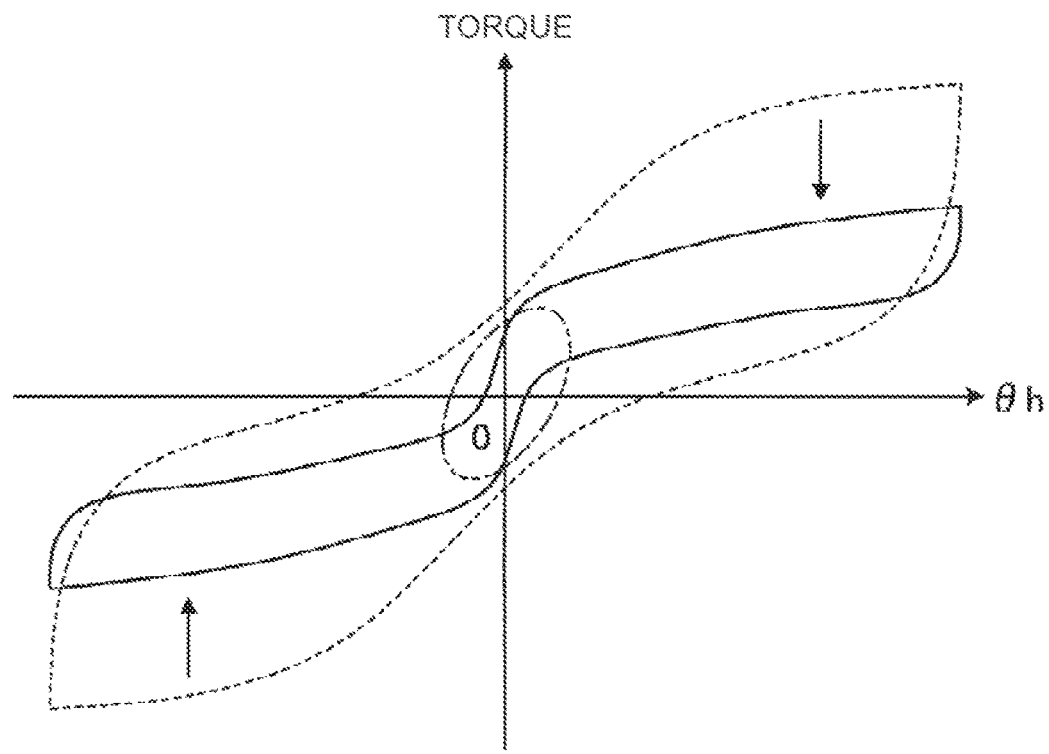
FIG. 23 is a diagram illustrating exemplary target steering torque output from a target steering torque generation unit.

FIG. 23 is a diagram illustrating an exemplary target steering torque output from the target steering torque generation unit. In FIG. 23, the horizontal axis represents the steering angle θh, and the vertical axis represents torque. In FIG. 14, exemplary target steering torque in the drive mode is illustrated with a dashed line, and the target steering torque in the low-speed driving mode is illustrated with a solid line.

In the drive mode (first mode), as described above, the torque signal Tref_e (second torque signal) is multiplied by the correction gain G=1, and the correction torque signal Tref_p (fourth torque signal)=0 is added to a result of the multiplication. Accordingly, the target steering torque Tref=the torque signal Tref_e (second torque signal) holds, and the target steering torque Tref suitable for the drive mode (first mode) can be obtained.

In the low-speed driving mode (second mode), as described above, the torque signal Tref_f (third torque signal) is generated by multiplying the torque signal Tref_e (second torque signal) by the positive correction gain G (for example, G=0.3) smaller than one, and in addition, the target steering torque Tref is generated by adding, to the torque signal Tref_f (third torque signal), the correction torque signal Tref_p (fourth torque signal) having a gradient larger than that of the torque signal Tref_a (first torque signal) at the absolute value |θh| of the steering angle θh=0. Accordingly, as illustrated in FIG. 14, in the low-speed driving mode (second mode), it is possible to make the target steering torque Tref smaller than in the drive mode (first mode), thereby lightening an operation of the wheel 1. In addition, as illustrated in FIG. 14, it is possible to increase change of the steering force relative to change of the steering angle θh in a predetermined region (region illustrated with a dashed and single-dotted line in FIG. 14) in which the steering angle θh is about zero. In other words, the change rate of the target steering torque Tref in the low-speed driving mode (second mode) is equal to or larger than that in the drive mode (first mode) in a predetermined region in which the absolute value |θh| of the steering angle θh of the wheel 1 is equal to or larger than zero, and the change rate of the target steering torque Tref in the low-speed driving mode (second mode) is smaller than that in the drive mode (first mode) in a region other than the predetermined region. Accordingly, the driver can easily recognize that the rudder angle is zero. Thus, it is possible to reduce a load on the driver, thereby improving steering feeling.

Note that, in the example illustrated in FIG. 17, the torque signal Tref_f (third torque signal) is generated by multiplying, by the correction gain G, the torque signal Tref_e (second torque signal) acquired by adding the torque signal Tref_a (first torque signal), the torque signal Tref_b, and the torque signal Tref_c, but the torque signal Tref_a (first torque signal), the torque signal Tref_b, and the torque signal Tref_c may be multiplied by individual correction gains G smaller than one, respectively, and then added together to generate the torque signal Tref_f (third torque signal).

Figure 24:
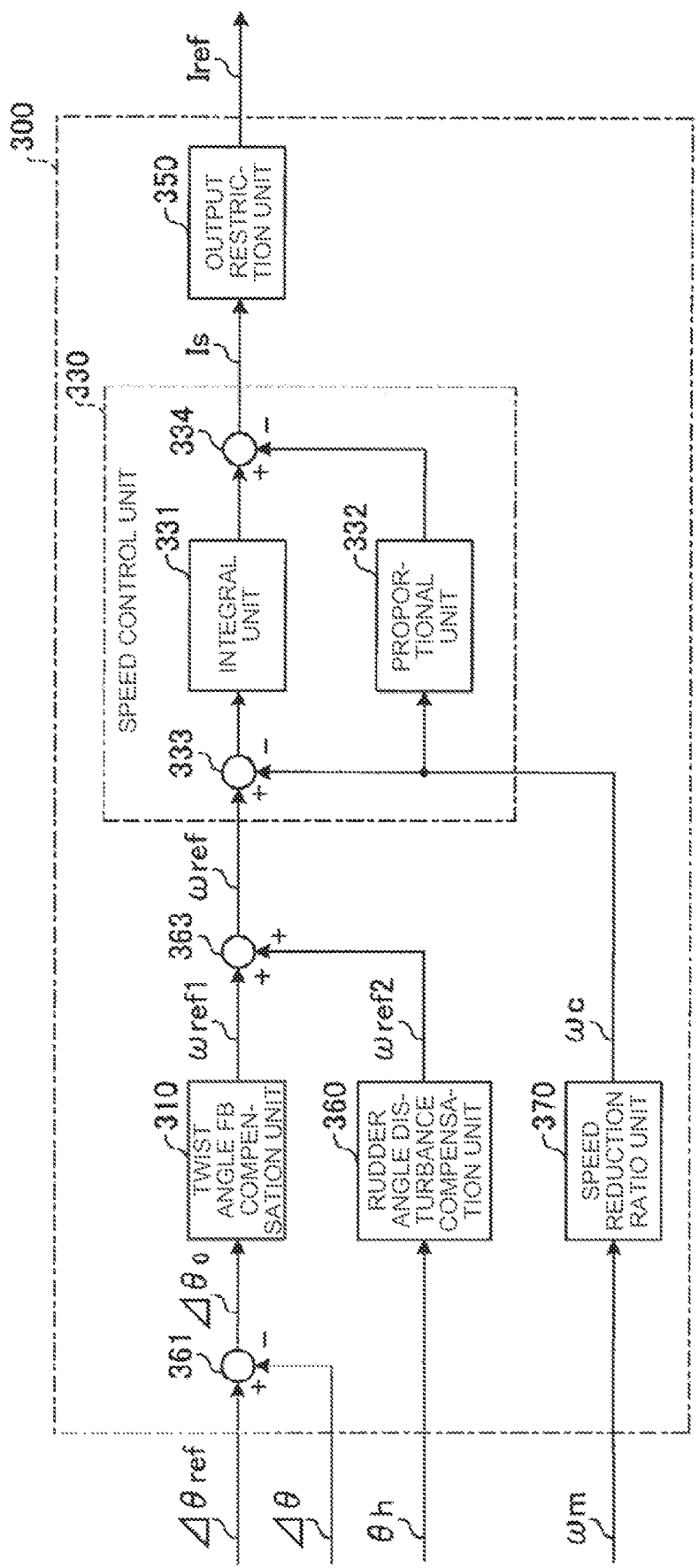
FIG. 24 is a block diagram illustrating an exemplary configuration of a twist angle control unit of the first embodiment.

The twist angle control unit 300 of the first embodiment (refer to FIG. 14) will be described below with reference to FIG. 24. FIG. 24 is a block diagram illustrating an exemplary configuration of the twist angle control unit of the first embodiment. The twist angle control unit 300 calculates the motor current command value Iref based on the target twist angle Δθref, the twist angle Δθ, the steering angle θh, and the motor angular velocity ωm. The twist angle control unit 300 includes a twist angle feedback (FB) compensation unit 310, a speed control unit 330, a stabilization compensation unit 340, an output restriction unit 350, a rudder angle disturbance compensation unit 360, a subtraction unit 361, an addition unit 363, and a speed reduction ratio unit 370.

The target twist angle Δθref output from the conversion unit 500 is input to the subtraction unit 361 through addition. The twist angle Δθ is input to the subtraction unit 361 through subtraction. The steering angle θh is input to the rudder angle disturbance compensation unit 360. The motor angular velocity ωm is input to the stabilization compensation unit 340. The twist angle FB compensation unit 310 multiplies a deviation Δθ0 between the target twist angle Δθref and the twist angle Δθ, which is calculated at the subtraction unit 361, by a compensation value CFB (transfer function) and outputs a target column angular velocity ωref1 with which the twist angle Δθ follows the target twist angle Δθref. The target column angular velocity ωref1 is output to the addition unit 363 through addition. The compensation value CFB may be a simple gain Kpp, or a typically used compensation value such as a PI control compensation value.

The rudder angle disturbance compensation unit 360 multiplies the steering angle θh by a compensation value Ch (transfer function) and outputs a target column angular velocity ωref2. The target column angular velocity ωref2 is output to the addition unit 363 through addition. The addition unit 363 adds the target column angular velocity ωref1 and the target column angular velocity ωref2, and outputs a result of the addition as a target column angular velocity ωref to the speed control unit 330. Accordingly, it is possible to reduce influence on the torsion bar twist angle Δθ due to change of the steering angle θh input by the driver, thereby improving the capability of the twist angle Δθ to follow the target twist angle Δθref in response to abrupt steering. When the steering angle θh changes in response to steering by the driver, the change of the steering angle θh affects the twist angle Δθ as disturbance, and error occurs to the target twist angle Δθref. In particular, upon abrupt steering, significant error occurs to the target twist angle Δθref due to change of the steering angle θh. A basic purpose of the rudder angle disturbance compensation unit 360 is to reduce influence of the steering angle θh as disturbance.

The speed control unit 330 calculates, through I-P control (proportional preceding PI control), a motor current command value Is with which a column angular velocity ωc follows the target column angular velocity ωref. The column angular velocity ωc may be a value obtained by multiplying the motor angular velocity ωm by a speed reduction ratio 1/N of the speed reduction ratio unit 370 as a deceleration mechanism as illustrated in FIG. 15. A subtraction unit 333 calculates the difference (ωref−ωc) between the target column angular velocity ωref and the column angular velocity ωc. An integral unit 331 integrates the difference (ωref−ωc) between the target column angular velocity ωref and the column angular velocity ωc and inputs a result of the integration to a subtraction unit 334 through addition. A twist angular velocity ωt is also output to a proportional unit 332. The proportional unit 332 performs proportional processing with a gain Kvp on the column angular velocity ωc and inputs a result of the proportional processing to the subtraction unit 334 through subtraction. A result of the subtraction at the subtraction unit 334 is output as the motor current command value Is. Note that, the speed control unit 330 may calculate the motor current command value Is not by I-P control but by a typically used control method such as PI control, P (proportional) control, PID (proportional-integral-differential) control, PI-D control (differential preceding PID control), model matching control, or model reference control. The upper and lower limit values of the motor current command value Is are set in advance at the output restriction unit 350. The motor current command value Iref is output with restriction on the upper and lower limit values of the motor current command value Is.

Note that, the configuration of the twist angle control unit 300 in the present embodiment is exemplary and may be different from the configuration illustrated in FIG. 15. For example, the twist angle control unit 300 need not necessarily include the rudder angle disturbance compensation unit 360, the addition unit 363, nor the speed reduction ratio unit 370.

Second Embodiment

Figure 25:
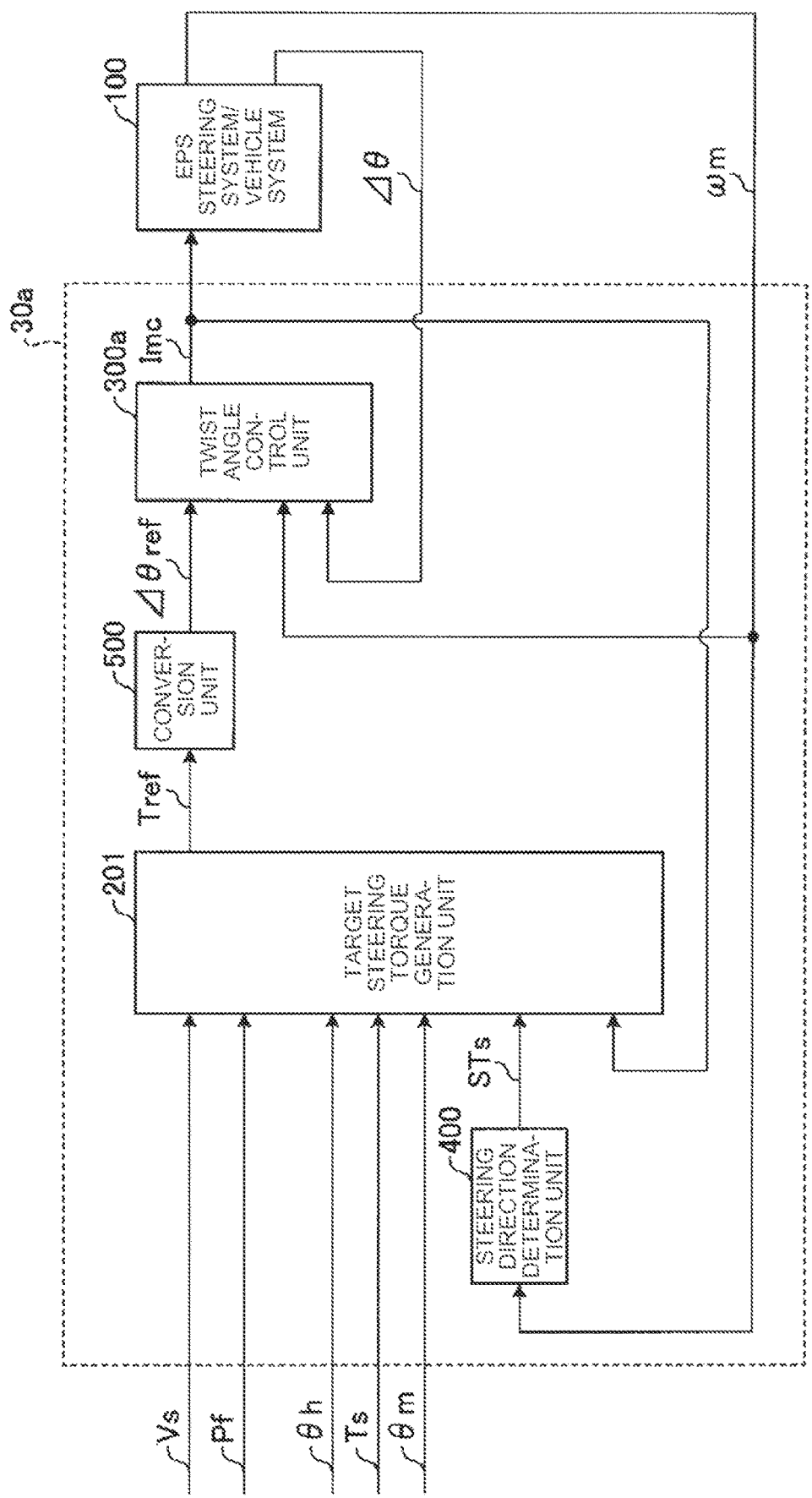
FIG. 25 is a diagram illustrating an exemplary internal block configuration of a control unit according to a second embodiment.

FIG. 25 is a diagram illustrating an exemplary internal block configuration of a control unit according to a second embodiment. Note that, a component same as that in the configuration described above in the first embodiment is denoted by the same reference sign and duplicate description thereof is omitted. A control unit (ECU) 30a according to the second embodiment is different from that of the first embodiment in the configurations of a target steering torque generation unit 201 and a twist angle control unit 300a.

The steering torque Ts and a motor angle θm in addition to the steering angle θh, the vehicle speed Vs, and the vehicle speed determination signal Vfail are input to the target steering torque generation unit 201. The twist angle control unit 300a calculates a motor current command value Imc with which the twist angle Δθ is equal to the target twist angle Δθref. The motor 20 is driven by the motor current command value Imc.

Figure 26:
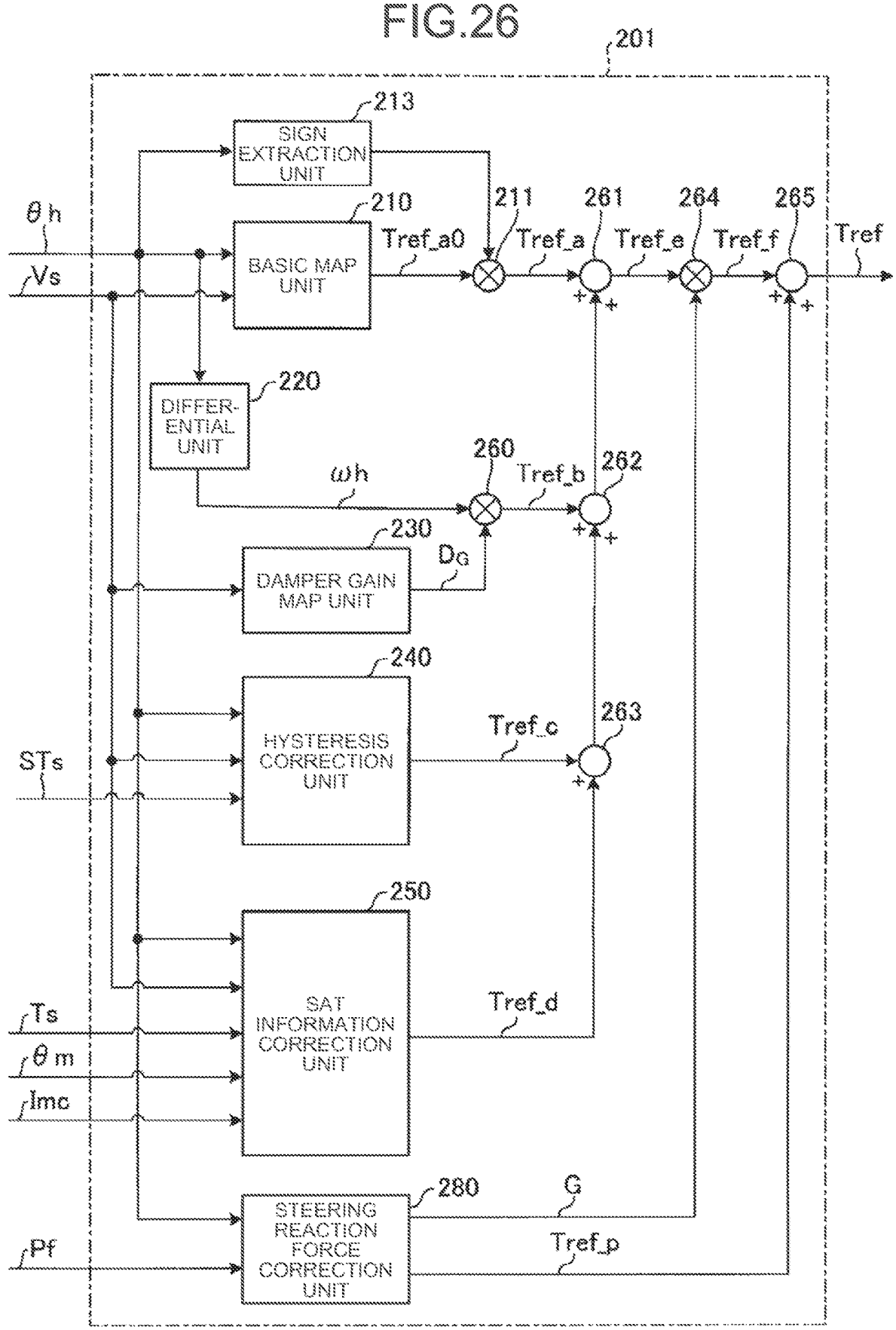
FIG. 26 is a block diagram illustrating an exemplary configuration of a target steering torque generation unit of the second embodiment.

FIG. 26 is a block diagram illustrating an exemplary configuration of the target steering torque generation unit of the second embodiment. As illustrated in FIG. 26, the target steering torque generation unit 201 of the second embodiment includes the SAT information correction unit 250 and an addition unit 263 in addition to the configuration described in the first embodiment. The steering angle θh, the vehicle speed Vs, the steering torque Ts, the motor angle θm, and the motor current command value Imc are input to the SAT information correction unit 250. The SAT information correction unit 250 calculates self-aligning torque (SAT) based on the steering torque Ts, the motor angle θm, and the motor current command value Imc and further provides filter processing, gain multiplication, and restriction processing to calculate a torque signal Tref_d.

Figure 27:
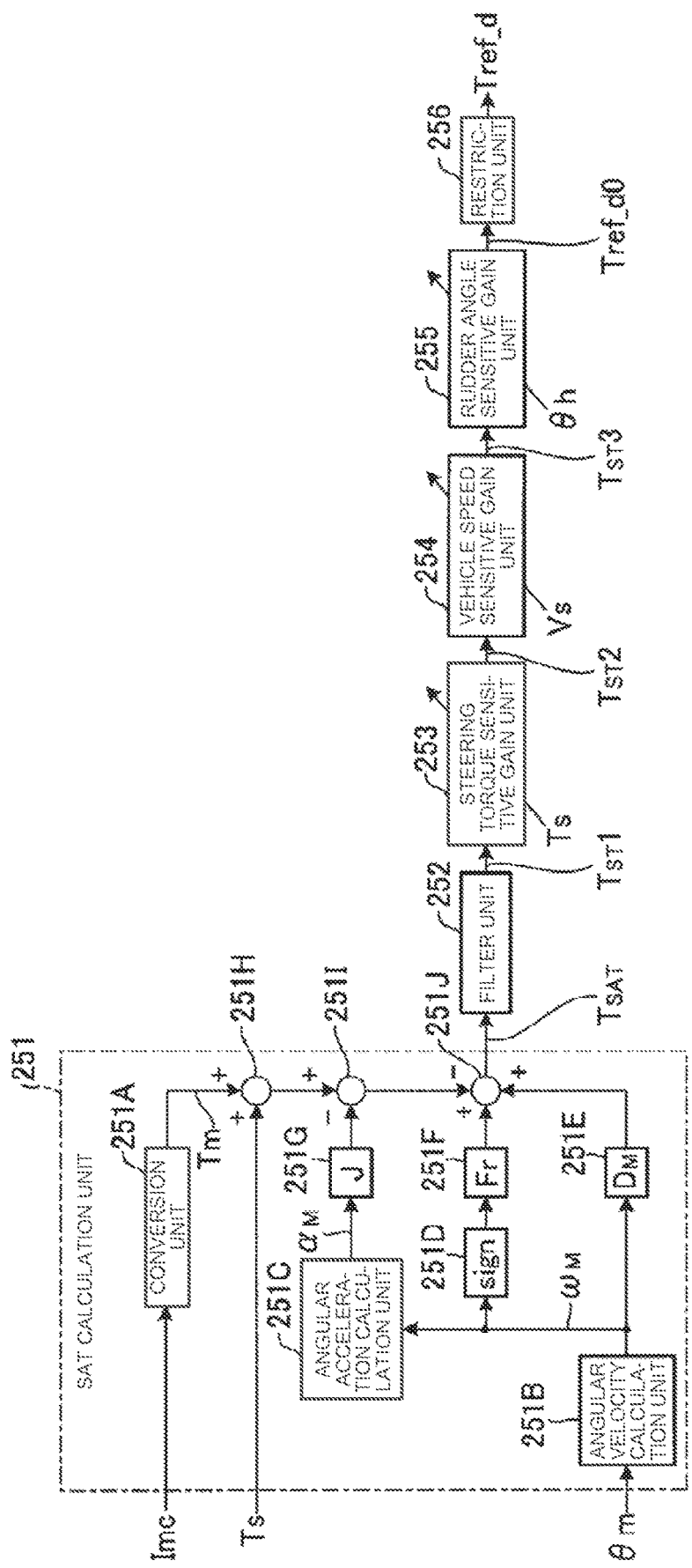
FIG. 27 is a block diagram illustrating an exemplary configuration of a SAT information correction unit.

FIG. 27 is a block diagram illustrating an exemplary configuration of the SAT information correction unit. The SAT information correction unit 250 includes a SAT calculation unit 251, a filter unit 252, a steering torque sensitive gain unit 253, a vehicle speed sensitive gain unit 254, a rudder angle sensitive gain unit 255, and a restriction unit 256.

Figure 28:
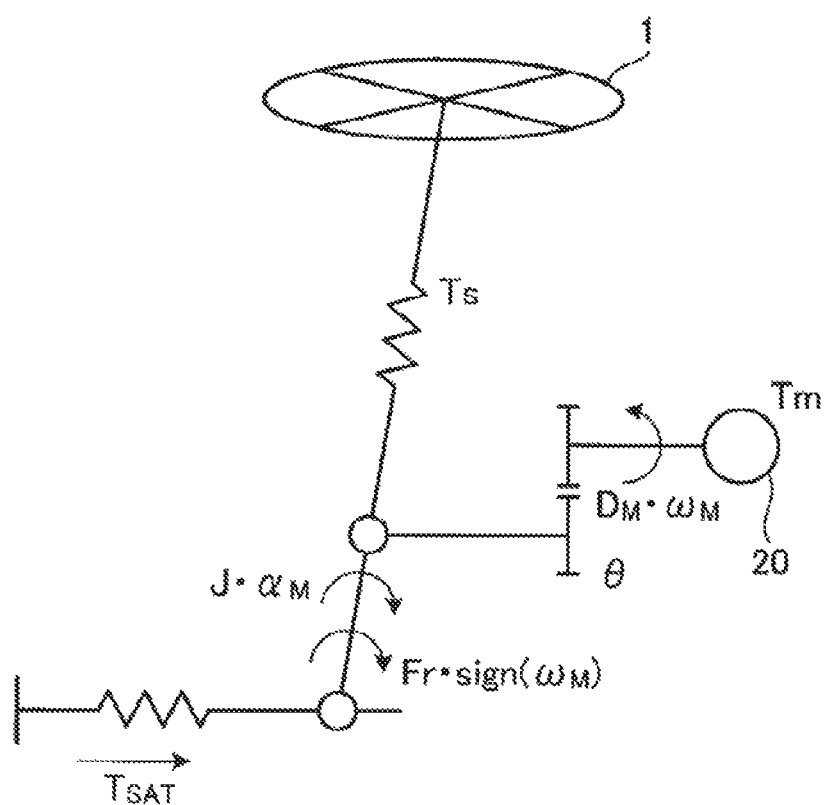
FIG. 28 is a schematic diagram illustrating the status of torque generated between a road surface and steering.

The status of torque generated between a road surface and steering will be described below with reference to FIG. 28. FIG. 28 is a schematic diagram illustrating the status of torque generated between the road surface and steering.

The steering torque Ts is generated as the driver steers the wheel, and the motor 20 generates assist torque (motor torque) Tm in accordance with the steering torque Ts. As a result, the wheel is rotated, self-aligning torque $T_{SAT}$ is generated as reaction force. In this case, torque as resistance against wheel steering is generated by column-shaft conversion inertia (inertia that acts on the column shaft by the motor 20 (rotor thereof), the deceleration mechanism, and the like) J and friction (static friction) Fr. In addition, physical torque (viscosity torque) expressed as a damper term (damper coefficient $D_M$) is generated by the rotational speed of the motor 20. The equation of motion in Expression (12) below is obtained from balancing among these forces.

$$J \times \alpha_M + Fr \times \text{sign}(\omega_M) + D_M \times \omega_M = Tm + Ts + T_{SAT} \quad (12)$$

In Expression (12) above, $\omega_M$ is a motor angular velocity subjected to column-shaft conversion (conversion into a value for the column shaft), and $\alpha_M$ is a motor angular acceleration subjected to column-shaft conversion. When Expression (12) above is solved for $T_{SAT}$, Expression (13) below is obtained.

$$T_{SAT} = -Tm - Ts + J \times \alpha_M + Fr \times \text{sign}(\omega_M) + D_M \times \omega_M \quad (13)$$

As understood from Expression (13) above, when the column-shaft conversion inertia J, the static friction Fr, and the damper coefficient DM are determined as constants in advance, the self-aligning torque $T_{SAT}$ can be calculated from the motor angular velocity $\omega_M$, the motor angular acceleration $\alpha_M$, the assist torque Tm, and the steering torque Ts. Note that, for simplification, the column-shaft conversion inertia J may be a value converted for the column shaft by using a relational expression of motor inertia and a speed reduction ratio.

The steering torque Ts, the motor angle θm, and the motor current command value Imc are input to the SAT calculation unit 251. The SAT calculation unit 251 calculates the self-aligning torque $T_{SAT}$ by using Expression (13) above. The SAT calculation unit 251 includes a conversion unit 251A, an angular velocity calculation unit 251B, an angular acceleration calculation unit 251C, a block 251D, a block 251E, a block 251F, a block 251G, and adders 251H, 251I, and 251J. The motor current command value Imc is input to the conversion unit 251A. The conversion unit 251A calculates the assist torque Tm subjected to column-shaft conversion through multiplication by a predetermined gear ratio and a predetermined torque constant. The motor angle θm is input to the angular velocity calculation unit 251B. The angular velocity calculation unit 251B calculates the motor angular velocity $\omega_M$ subjected to column-shaft conversion through differential processing and gear ratio multiplication. The motor angular velocity $\omega_M$ is input to the angular acceleration calculation unit 251C. The angular acceleration calculation unit 251C calculates the motor angular acceleration $\alpha_M$ subjected to column-shaft conversion by differentiating the motor angular velocity $\omega_M$. Then, the self-aligning torque $T_{SAT}$ is calculated with a configuration as illustrated in FIG. 18 based on Math. 8 by the block 251D, the block 251E, the block 251F, the block 251G, and the adders 251H, 251I, and 251J by using the input steering torque Ts and the assist torque Tm, the motor angular velocity $\omega_M$, and the motor angular acceleration $\alpha_M$ thus calculated.

The motor angular velocity $\omega_M$ output from the angular velocity calculation unit 251B is input to the block 251D. The block 251D functions as a sign function and outputs the sign of the input data. The motor angular velocity $\omega_M$ output from the angular velocity calculation unit 251B is input to the block 251E. The block 251E multiplies the input data by the damper coefficient $D_M$ and outputs a result of the multiplication. The block 251F multiplies the input data from the block 251D by the static friction Fr and outputs a result of the multiplication. The motor angular acceleration $\alpha_M$ output from the angular acceleration calculation unit 251C is input to the block 251G. The block 251G multiplies the input data by the column-shaft conversion inertia J and outputs a result of the multiplication.

The adder 251H adds the steering torque Ts and the assist torque Tm output from the conversion unit 251A. The adder 251I subtracts the output from the block 251G from the output from the adder 251H. The adder 251J adds the output from the block 251E and the output from the block 251F and subtracts the output from the adder 251I. With the above-described configuration, Expression (13) above can be achieved. Specifically, the self-aligning torque $T_{SAT}$ is calculated by the configuration of the SAT calculation unit 251 illustrated in FIG. 27. Note that, when the column angle can be directly detected, the column angle may be used as angle information in place of the motor angle θm. In this case, column-shaft conversion is unnecessary. In addition, a signal obtained by subjected the motor angular velocity ωm from the EPS steering system/vehicle system 100 to column-shaft conversion may be input as the motor angular velocity $\omega_M$ in place of the motor angle θm, and the differential processing on the motor angle θm may be omitted. Moreover, the self-aligning torque $T_{SAT}$ may be calculated by a method other than that described above or may be a measured value, not a calculated value.

To utilize the self-aligning torque $T_{SAT}$ calculated at the SAT calculation unit 251 and appropriately convey the self-aligning torque $T_{SAT}$ to the driver as a steering feeling, information desired to be conveyed is extracted from the self-aligning torque $T_{SAT}$ by the filter unit 252, the amount of conveyance is adjusted by the steering torque sensitive gain unit 253, the vehicle speed sensitive gain unit 254, and the rudder angle sensitive gain unit 255, and the upper and lower limit values thereof are further adjusted by the restriction unit 256. Note that, in the present disclosure, the self-aligning torque $T_{SAT}$ calculated at the SAT calculation unit 251 is also output to the target steering torque generation unit 201.

The self-aligning torque $T_{SAT}$ from the SAT calculation unit 251 is input to the filter unit 252. The filter unit 252 performs filter processing on the self-aligning torque $T_{SAT}$ through, for example, a bandpass filter and outputs SAT information $T_{ST}1$. The SAT information $T_{ST}1$ output from the filter unit 252 and the steering torque Ts are input to the steering torque sensitive gain unit 253. The steering torque sensitive gain unit 253 sets a steering torque sensitive gain.

Figure 29:
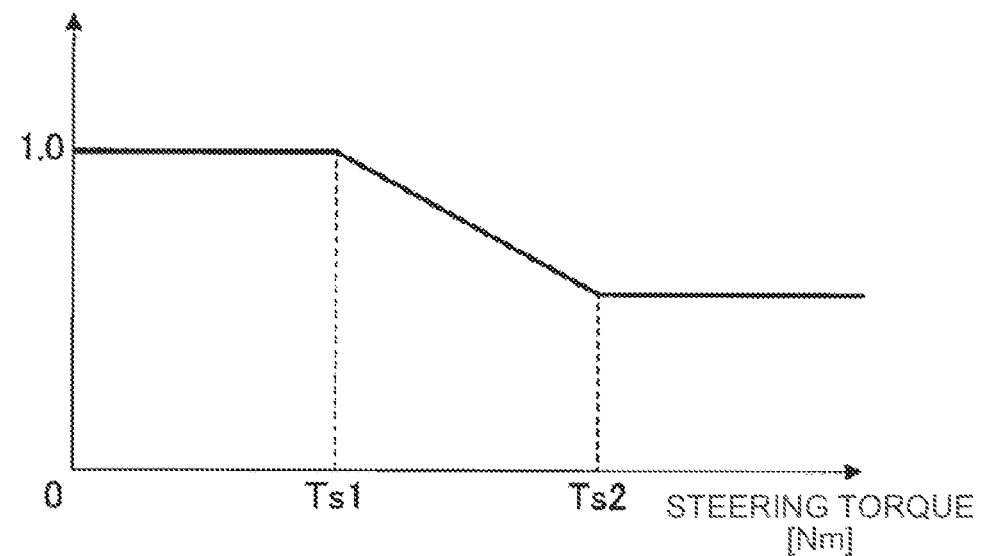
FIG. 29 is a diagram illustrating exemplary characteristics of a steering torque sensitive gain.

FIG. 29 is a diagram illustrating exemplary characteristics of the steering torque sensitive gain. As illustrated in FIG. 29, the steering torque sensitive gain unit 253 sets the steering torque sensitive gain so that sensitivity is high at on-center vicinity corresponding to a straight traveling state. The steering torque sensitive gain unit 253 multiplies the SAT information $T_{ST}1$ by the steering torque sensitive gain set in accordance with the steering torque Ts and outputs SAT information $T_{ST}2$. FIG. 29 illustrates an example in which the steering torque sensitive gain is fixed at 1.0 when the steering torque Ts is equal to or smaller than Ts1 (for example, 2 Nm), fixed at a value smaller than 1.0 when the steering torque Ts is equal to or larger than Ts2 (>Ts1) (for example, 4 Nm), or set to decrease at a constant ratio when the steering torque Ts is between Ts1 and Ts2.

Figure 30:
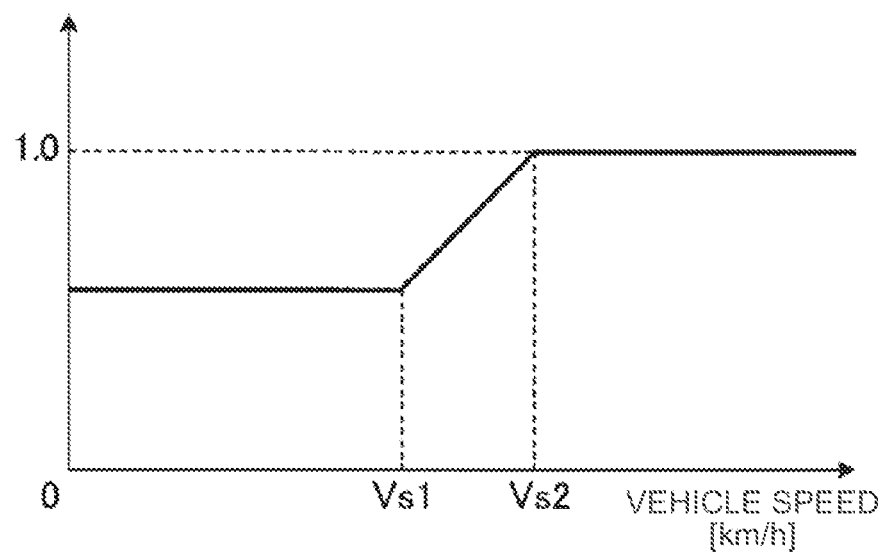
FIG. 30 is a diagram illustrating exemplary characteristics of a vehicle speed sensitive gain.

The SAT information $T_{ST}2$ output from the steering torque sensitive gain unit 253 and the vehicle speed Vs are input to the vehicle speed sensitive gain unit 254. The vehicle speed sensitive gain unit 254 sets a vehicle speed sensitive gain. FIG. 30 is a diagram illustrating exemplary characteristics of the vehicle speed sensitive gain. As illustrated in FIG. 30, the vehicle speed sensitive gain unit 254 sets the vehicle speed sensitive gain so that sensitivity at fast travel is high. The vehicle speed sensitive gain unit 254 multiplies the SAT information $T_{ST}2$ by the vehicle speed sensitive gain set in accordance with the vehicle speed Vs, and outputs SAT information $T_{ST}3$. FIG. 30 illustrates an example in which the vehicle speed sensitive gain is fixed at 1.0 when the vehicle speed Vs is equal to or higher than Vs2 (for example, 70 km/h), fixed at a value smaller than 1.0 when the vehicle speed Vs is equal to or smaller than Vs1 (<Vs2) (for example, 50 km/h), or set to increase at a constant ratio when the vehicle speed Vs is between Vs1 and Vs2.

Figure 31:
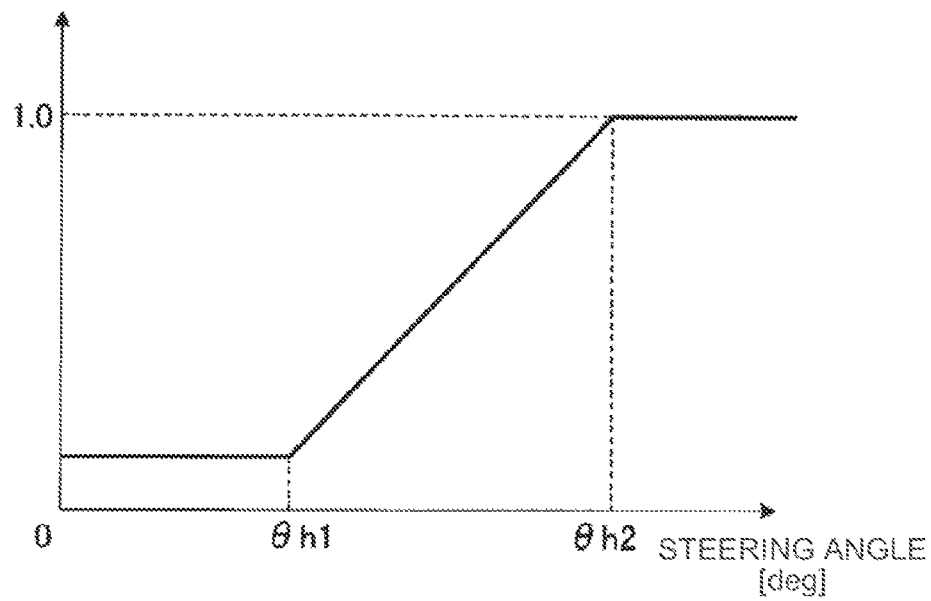
FIG. 31 is a diagram illustrating exemplary characteristics of a rudder angle sensitive gain.

The SAT information $T_{ST}3$ output from the vehicle speed sensitive gain unit 254 and the steering angle θh are input to the rudder angle sensitive gain unit 255. The rudder angle sensitive gain unit 255 sets a rudder angle sensitive gain. FIG. 31 is a diagram illustrating exemplary characteristics of the rudder angle sensitive gain. As illustrated in FIG. 31, the rudder angle sensitive gain unit 255 sets the rudder angle sensitive gain to start acting at a predetermined steering angle and have high sensitivity when the steering angle is large. The rudder angle sensitive gain unit 255 multiplies the SAT information $T_{ST}3$ by the rudder angle sensitive gain set in accordance with the steering angle θh, and outputs a torque signal Tref_d0. FIG. 31 illustrates an example in which the rudder angle sensitive gain is a predetermined gain value Gα when the steering angle θh is equal to or smaller than θh1 (for example, 10 deg), fixed at 1.0 when the steering angle θh is equal to or larger than θh2 (for example, 30 deg), or set to increase at a constant ratio when the steering angle θh is between θh1 and θh2. To have high sensitivity when the steering angle θh is large, Gα may be set to be in the range of 0≤Gα<1. To have high sensitivity when the steering angle θh is small, Gα may be set to be in the range of 1<Gα although not illustrated. To avoid sensitivity change due to the steering angle θh, Gα may be set to be Gα=1.

Figure 32:
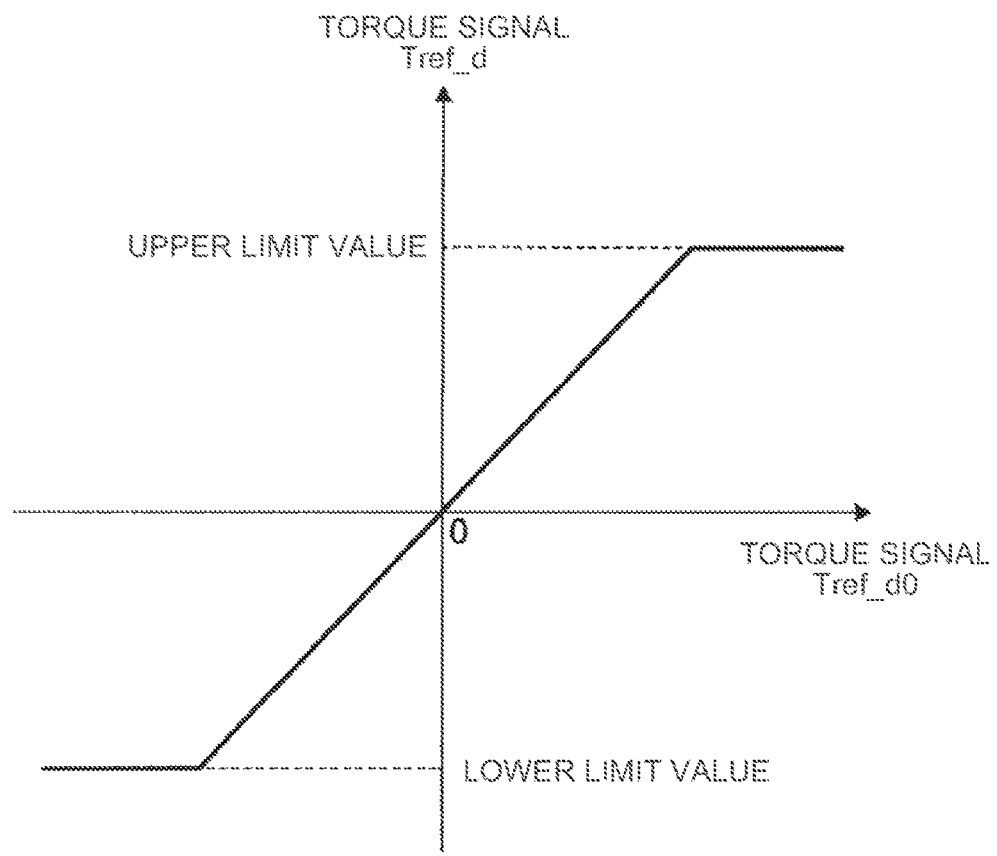
FIG. 32 is a diagram illustrating exemplary setting of the upper and lower limit values of a torque signal at a restriction unit.
Figure 33:
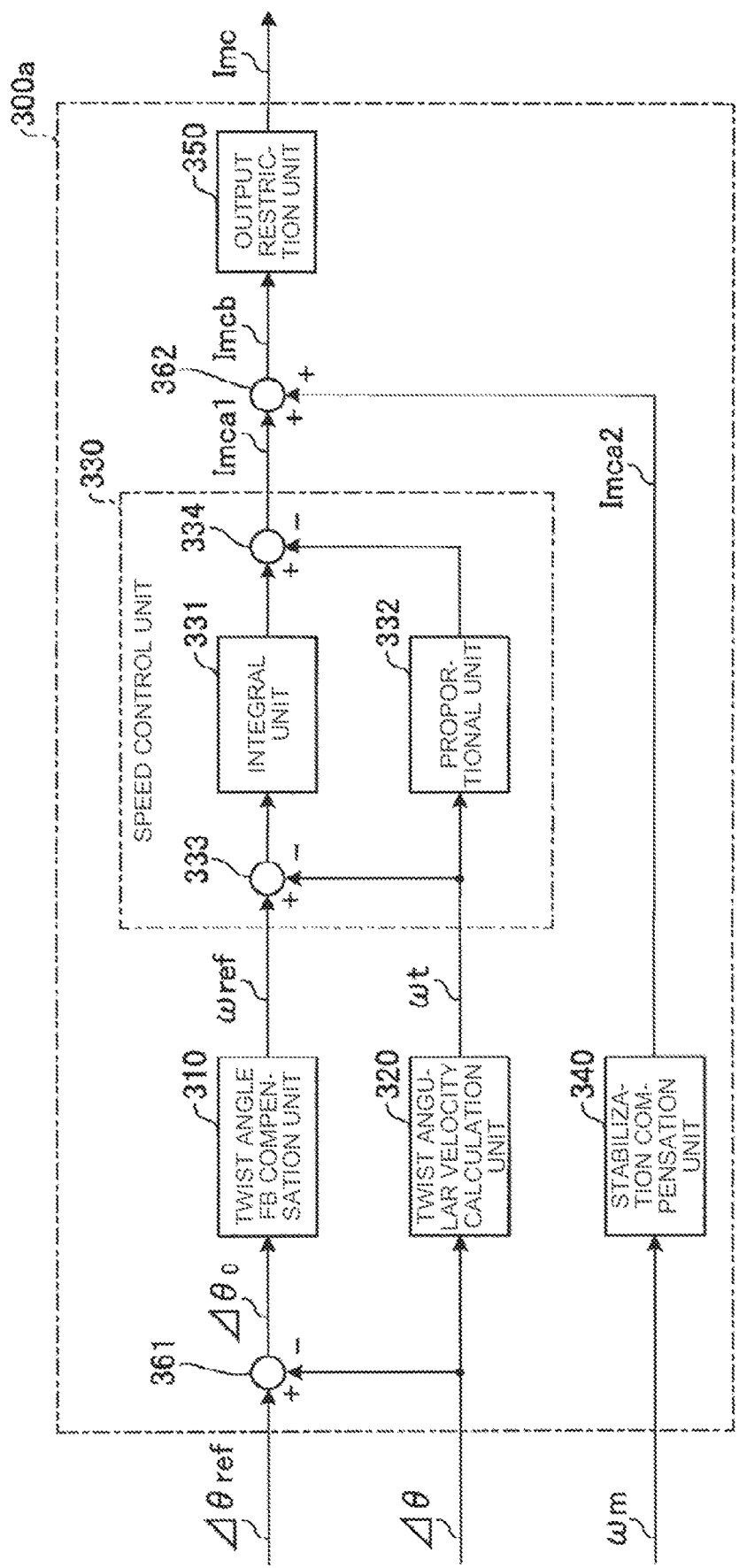
FIG. 33 is a block diagram illustrating an exemplary configuration of a twist angle control unit of the second embodiment.

The torque signal Tref_d0 output from the rudder angle sensitive gain unit 255 is input to the restriction unit 256. The upper and lower limit values of the torque signal Tref_d0 are set to the restriction unit 256. FIG. 32 is a diagram illustrating exemplary setting of the upper and lower limit values of the torque signal at the restriction unit. As illustrated in FIG. 33, the upper and lower limit values of the torque signal Tref_d0 are set to the restriction unit 256 in advance, and the restriction unit 256 outputs, as a torque signal Tref_d, the upper limit value when the torque signal Tref_d0 that is input is equal to or larger than the upper limit value, the lower limit value when the torque signal Tref_d0 that is input is equal to or smaller than the lower limit value, or the torque signal Tref_d0 otherwise.

Note that, the steering torque sensitive gain, the vehicle speed sensitive gain, and the rudder angle sensitive gain may have curved characteristics in place of linear characteristics as illustrated in FIGS. 29, 30, and 31. In addition, settings of the steering torque sensitive gain, the vehicle speed sensitive gain, and the rudder angle sensitive gain may be adjusted as appropriate in accordance with a steering feeling. In addition, the restriction unit 256 may be omitted, for example, when the magnitude of a torque signal is not likely to increase or is prevented by another means. The steering torque sensitive gain unit 253, the vehicle speed sensitive gain unit 254, and the rudder angle sensitive gain unit 255 may also be omitted as appropriate. In addition, installation positions of the steering torque sensitive gain, the vehicle speed sensitive gain, and the rudder angle sensitive gain may be interchanged. In addition, for example, the steering torque sensitive gain, the vehicle speed sensitive gain, and the rudder angle sensitive gain may be determined in parallel and used to multiply the SAT information $T_{ST}1$ at one component. Thus, the configuration of the SAT information correction unit 250 in the present embodiment is exemplary and may be different from the configuration illustrated in FIG. 18.

In the present embodiment as well, effects same as those of the first embodiment can be obtained with a configuration in which the steering reaction force correction unit 280 described above in the first embodiment is included in the target steering torque generation unit 201.

Specifically, the torque signal Tref_a (first torque signal), the torque signal Tref_b, the torque signal Tref_c, and the torque signal Tref_d can be added at the addition units 261, 262, and 263 to obtain the torque signal Tref_e (second torque signal).

In addition, the multiplication unit 264 multiplies the torque signal Tref_e (second torque signal) output from the addition unit 261 by the correction gain G output from the steering reaction force correction unit 280, and outputs a result of the multiplication as the torque signal Tref_f (third torque signal) to the addition unit 265. The addition unit 265 adds the correction torque signal Tref_p (fourth torque signal) output from the steering reaction force correction unit 280 to the torque signal Tref_f (third torque signal) output from the multiplication unit 264, and outputs a result of the addition as the target steering torque Tref.

In the drive mode (first mode), similarly to the first embodiment, the torque signal Tref_e (second torque signal) is subjected to multiplication by the correction gain G=1 and addition with the correction torque signal Tref_p (fourth torque signal)=0. Accordingly, the target steering torque Tref=the torque signal Tref_e (second torque signal) holds, and the target steering torque Tref suitable for the drive mode (first mode) can be obtained.

In the low-speed driving mode (second mode), similarly to the first embodiment, the torque signal Tref_f (third torque signal) is generated by multiplying the torque signal Tref_e (second torque signal) by the positive correction gain G (for example, G=0.3) smaller than one, and in addition, the target steering torque Tref is generated by adding, to the torque signal Tref_f (third torque signal), the correction torque signal Tref_p (fourth torque signal) having a gradient larger than that of the torque signal Tref_a (first torque signal) at the absolute value |θh| of the steering angle θh=0. Accordingly, similarly to the first embodiment, it is possible to decrease the target steering torque Tref as compared to that in the drive mode (first mode), thereby lightening an operation of the wheel 1. In addition, similarly to the first embodiment, change of the steering force can be set to be larger than change of the steering angle θh in a region (region illustrated with a dashed and single-dotted line in FIG. 23) in which the steering angle θh is about zero, which makes it easier to recognize that the rudder angle is zero. Accordingly, it is possible to reduce a load on the driver, thereby improving steering feeling.

The twist angle control unit 300a of the second embodiment will be described below with reference to FIG. 33. FIG. 33 is a block diagram illustrating an exemplary configuration of the twist angle control unit of the second embodiment. The twist angle control unit 300a calculates the motor current command value Imc based on the target twist angle Δθref, the twist angle Δθ, and the motor angular velocity ωm. The twist angle control unit 300a includes the twist angle feedback (FB) compensation unit 310, a twist angular velocity calculation unit 320, the speed control unit 330, the stabilization compensation unit 340, the output restriction unit 350, the subtraction unit 361, and an addition unit 362.

The target twist angle Δθref output from the conversion unit 500 is input to the subtraction unit 361 through addition. The twist angle Δθ is input to the subtraction unit 361 through subtraction and input to the twist angular velocity calculation unit 320. The motor angular velocity ωm is input to the stabilization compensation unit 340. The twist angle FB compensation unit 310 multiplies the deviation Δθ0 between the target twist angle Δθref and the twist angle Δθ, which is calculated at the subtraction unit 361, by the compensation value CFB (transfer function) and outputs a target twist angular velocity ωref with which the twist angle Δθ follows the target twist angle Δθref. The compensation value CFB may be a simple gain Kpp, or a typically used compensation value such as a PI control compensation value. The target twist angular velocity ωref is input to the speed control unit 330. With the twist angle FB compensation unit 310 and the speed control unit 330, it is possible to cause the twist angle Δθ to follow the target twist angle Δθref, thereby achieving desired steering torque.

The twist angular velocity calculation unit 320 calculates the twist angular velocity ωt by performing differential arithmetic processing on the twist angle Δθ. The twist angular velocity ωt is output to the speed control unit 330. The twist angular velocity calculation unit 320 may perform, as differential calculation, pseudo differentiation with a HPF and a gain. Alternatively, the twist angular velocity calculation unit 320 may calculate the twist angular velocity ωt by another means or not from the twist angle Δθ and may output the calculated twist angular velocity ωt to the speed control unit 330. The speed control unit 330 calculates, by I-P control (proportional preceding PI control), a motor current command value Imca1 with which the twist angular velocity ωt follows the target twist angular velocity ωref. The subtraction unit 333 calculates the difference (ωref−ωt) between the target twist angular velocity ωref and the twist angular velocity ωt. The integral unit 331 integrates the difference (ωref−ωt) between the target twist angular velocity ωref and the twist angular velocity ωt, and inputs a result of the integration to the subtraction unit 334 through addition.

The twist angular velocity ωt is also output to the proportional unit 332. The proportional unit 332 performs proportional processing with the gain Kvp on the twist angular velocity ωt and inputs a result of the proportional processing to the subtraction unit 334 through subtraction. A result of the subtraction at the subtraction unit 334 is output as the motor current command value Imca1. Note that, the speed control unit 330 may calculate the motor current command value Imca1 not by I-P control but by typically used control method such as PI control, P (proportional) control, PID (proportional-integral-differential) control, PI-D control (differential preceding PID control), model matching control, or model reference control. The stabilization compensation unit 340 has a compensation value Cs (transfer function) and calculates a motor current command value Imca2 from the motor angular velocity ωm. When gains of the twist angle FB compensation unit 310 and the speed control unit 330 are increased to improve the following capability and the disturbance characteristic, a controlled oscillation phenomenon occurs in a higher range. To avoid this, the transfer function (Cs) necessary for stabilization of the motor angular velocity ωm is set to the stabilization compensation unit 340. Accordingly, stabilization of the entire EPS control system can be achieved.

The addition unit 362 adds the motor current command value Imca1 from the speed control unit 330 and the motor current command value Imca2 from the stabilization compensation unit 340, and outputs a result of the addition as a motor current command value Imcb. The upper and lower limit values of the motor current command value Imcb are set to the output restriction unit 350 in advance. The output restriction unit 350 outputs the motor current command value Imc with restriction on the upper and lower limit values of the motor current command value Imcb. Note that, the configuration of the twist angle control unit 300a in the present embodiment is exemplary and may be different from the configuration illustrated in FIG. 33. For example, the twist angle control unit 300a need not necessarily include the stabilization compensation unit 340.

Third Embodiment

Although the present disclosure is applied to a column-type EPS as one vehicle steering device in the first and second embodiments, the present disclosure is not limited to an upstream-type EPS such as a column-type EPS but is applicable to a downstream-type EPS such as a rack-pinion EPS. Moreover, since feedback control is performed based on a target twist angle, the present disclosure is also applicable to, for example, a steer-by-wire (SBW) reaction force device including at least a torsion bar (with an optional spring constant) and a twist angle detection sensor. The following describes an embodiment (third embodiment) when the present disclosure is applied to a SBW reaction force device including a torsion bar.

Figure 34:
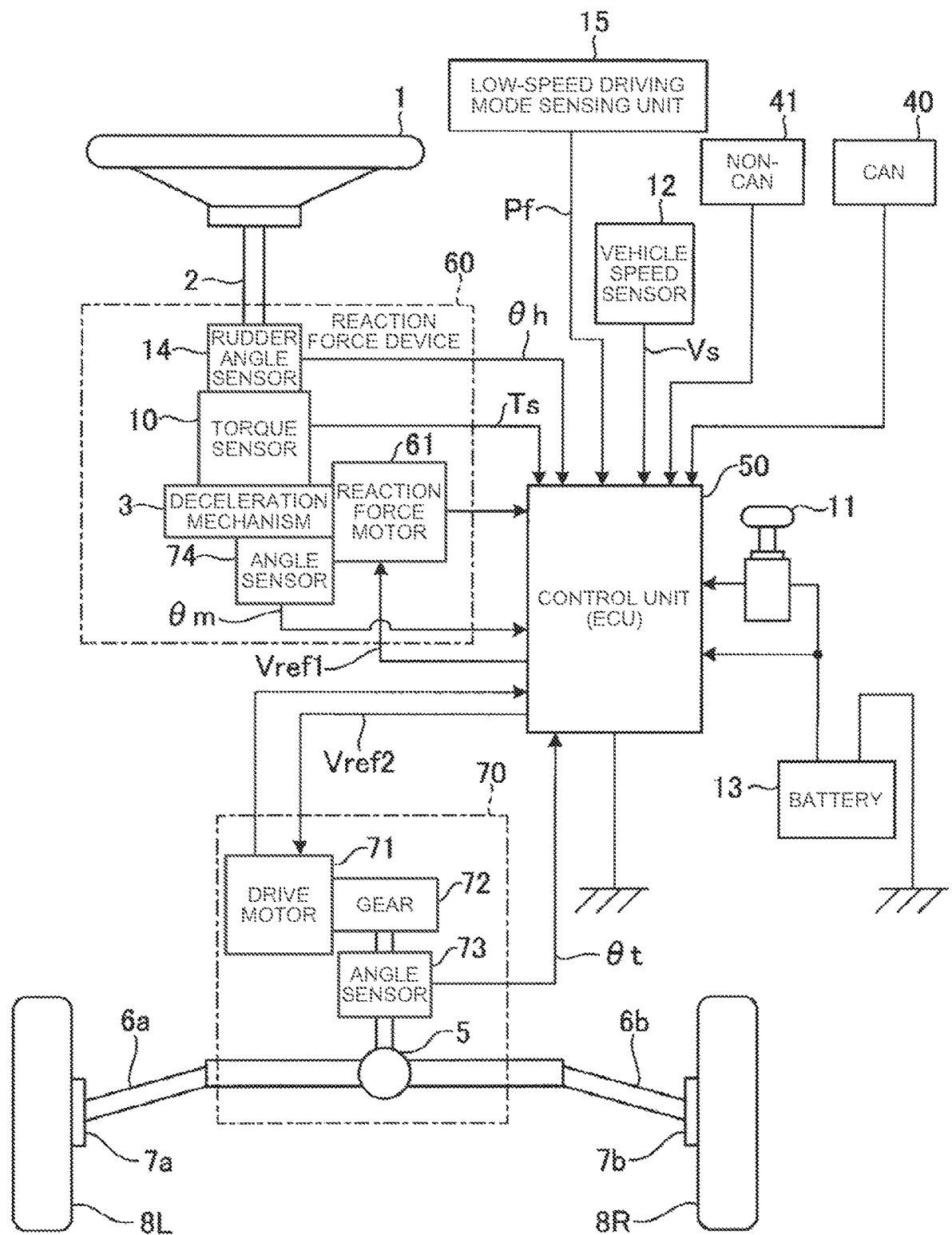
FIG. 34 is a diagram illustrating an exemplary configuration of a SBW system in a manner corresponding to a typical configuration of an electric power steering device illustrated in FIG. 1.

First, the entire SBW system including a SBW reaction force device will be described below. FIG. 34 is a diagram illustrating an exemplary configuration of the SBW system in a manner corresponding to the typical configuration of the electric power steering device illustrated in FIG. 10. Note that, a component same as that in the configuration described above in the first and second embodiments is denoted by the same reference sign and detailed description thereof is omitted.

The SBW system is a system that includes no intermediate shaft mechanically connected with the column shaft 2 at the universal joint 4a in FIG. 10 and conveys an operation of the wheel 1 to a rotation mechanism constituted by the steering wheels 8L and 8R and the like through an electric signal. As illustrated in FIG. 25, the SBW system includes a reaction force device 60 and a drive device 70, and a control unit (ECU) 50 controls the devices. The reaction force device 60 performs detection of the steering angle θh at the rudder angle sensor 14 and simultaneously transfers, to the driver as reaction force torque, a motion state of the vehicle conveyed from the steering wheels 8L and 8R. The reaction force torque is generated by a reaction force motor 61. Note that, although the steering torque Ts is detected at the torque sensor 10 in the present disclosure, the present disclosure is not limited thereto. In addition, an angle sensor 74 detects the motor angle θm of the reaction force motor 61. The drive device 70 drives a drive motor 71 in accordance with steering of the wheel 1 by the driver and provides drive power thereof to the pinion rack mechanism 5 through a gear 72 to rotate the steering wheels 8L and 8R through the tie rods 6a and 6b. An angle sensor 73 is disposed near the pinion rack mechanism 5 and detects a turning angle θt of the steering wheels 8L and 8R. For cooperative control of the reaction force device 60 and the drive device 70, the ECU 50 generates a voltage control command value Vref1 with which the reaction force motor 61 is driven and controlled and a voltage control command value Vref2 with which the drive motor 71 is driven and controlled, based on, for example, the vehicle speed Vs from the vehicle speed sensor 12 in addition to information such as the steering angle θh and the turning angle θt output from the devices.

Figure 35:
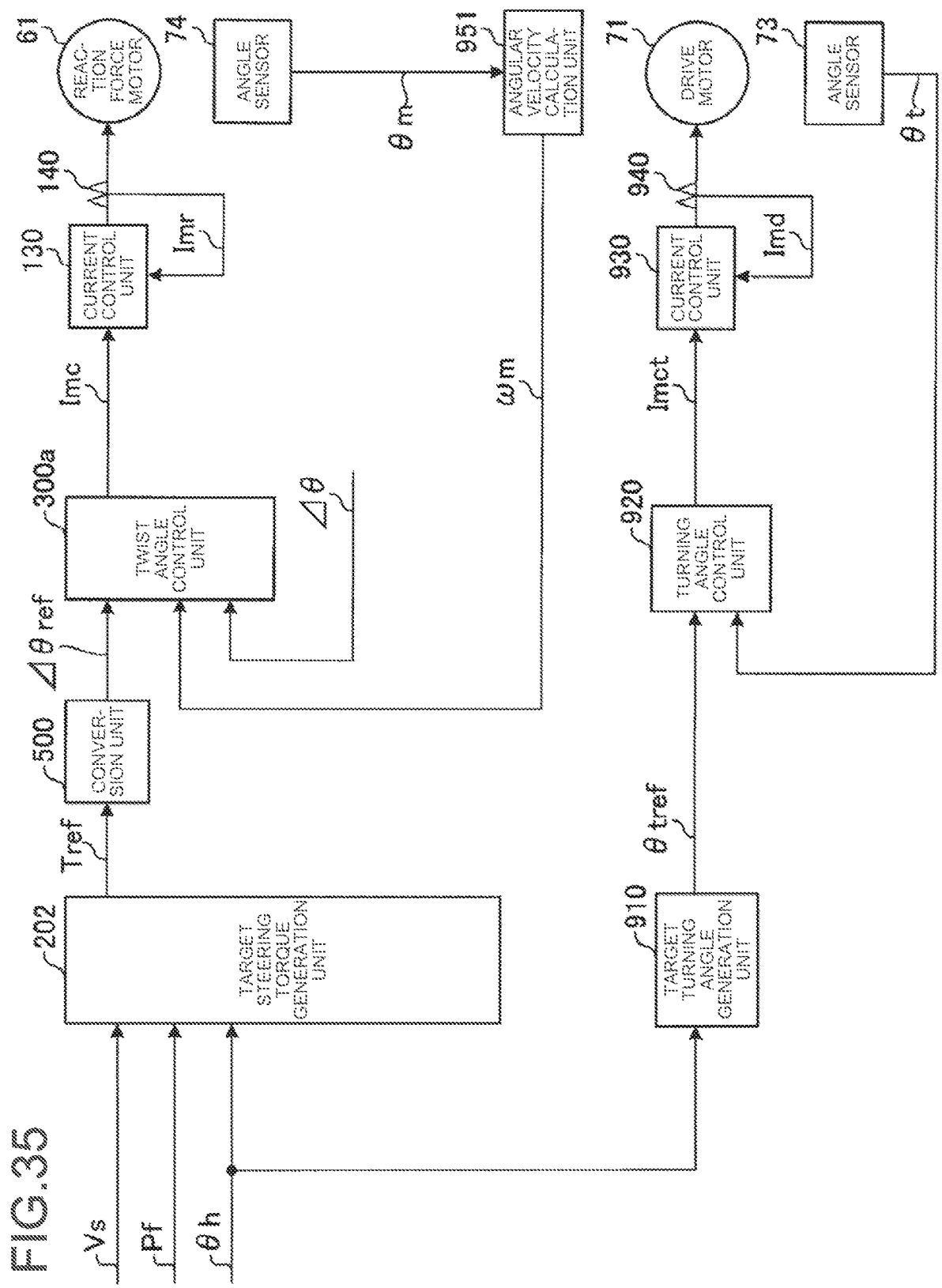
FIG. 35 is a block diagram illustrating an internal block configuration of a control unit according to a third embodiment.

The following describes the configuration of the third embodiment in which the present disclosure is applied to such a SBW system. FIG. 35 is a block diagram illustrating the configuration of the third embodiment. In the third embodiment, control (hereinafter referred to as "twist angle control") on the twist angle Δθ and control (hereinafter referred to as "turning angle control") on the turning angle θt are performed to control the reaction force device by the twist angle control and to control the drive device by the turning angle control. Note that, the drive device may be controlled by another control method.

In the twist angle control, such control that the twist angle Δθ follows the target twist angle Δθref calculated through the target steering torque generation unit 202 and the conversion unit 500 by using the steering angle θh and the like is performed with configurations and operations same as those of the second embodiment. The motor angle θm is detected at the angle sensor 74, and the motor angular velocity ωm is calculated by differentiating the motor angle θm at an angular velocity calculation unit 951. The turning angle θt is detected at the angle sensor 73. In addition, although detailed description is not performed as processing in the EPS steering system/vehicle system 100 in the first embodiment, a current control unit 130 performs current control by driving the reaction force motor 61 based on the motor current command value Imc output from the twist angle control unit 300a and a current value Imr of the reaction force motor 61 detected at a motor current detector 140 with configurations and operations same as those of the subtraction unit 32B, the PI control unit 35, the PWM control unit 36, and the inverter circuit 37 illustrated in FIG. 21.

In the turning angle control, a target turning angle θtref is generated based on the steering angle θh at a target turning angle generation unit 910, the target turning angle θtref together with the turning angle θt is input to a turning angle control unit 920, and a motor current command value Imct with which the turning angle θt is equal to the target turning angle θtref is calculated at the turning angle control unit 920. Then, a current control unit 930 performs current control by driving the drive motor 71 based on the motor current command value Imct and a current value Imd of the drive motor 71 detected at a motor current detector 940 with configurations and operations same as those of the current control unit 130. Note that, in the present disclosure, the motor current command value Imct calculated at the turning angle control unit 920 is also output to the target steering torque generation unit 202.

Figure 36:
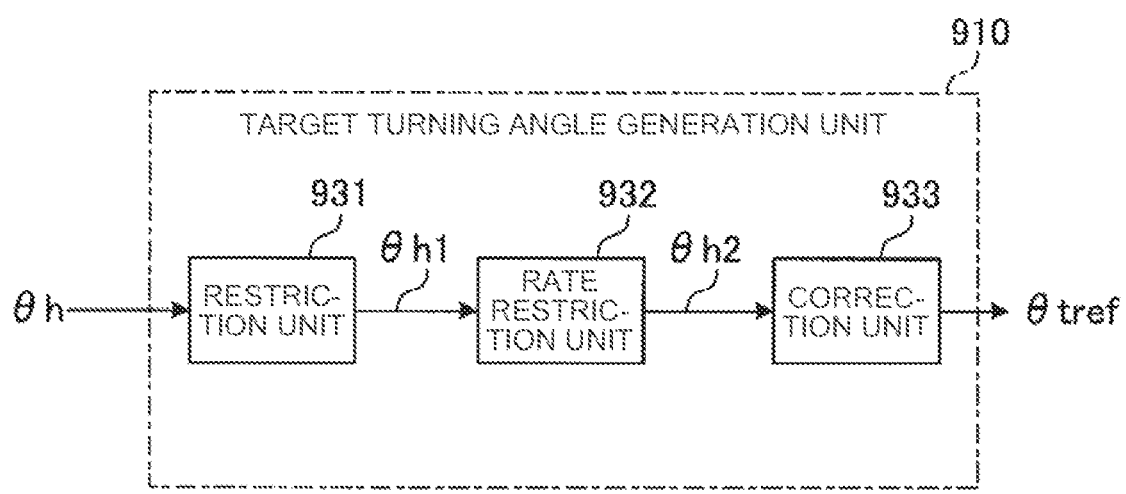
FIG. 36 is a diagram illustrating an exemplary configuration of a target turning angle generation unit.

FIG. 36 is a diagram illustrating an exemplary configuration of the target turning angle generation unit. The target turning angle generation unit 910 includes a restriction unit 931, a rate restriction unit 932, and a correction unit 933. The restriction unit 931 outputs a steering angle θh1 with restriction on the upper and lower limit values of the steering angle θh. Similarly to the output restriction unit 350 in the twist angle control unit 300a illustrated in FIG. 33, the upper and lower limit values of the steering angle θh are set in advance and restricted. To avoid abrupt change of the steering angle, the rate restriction unit 932 provides restriction by setting a restriction value for the change amount of the steering angle θh1, and outputs the steering angle θh2. For example, the change amount is set to be the difference from the steering angle θh1 at the previous sample. When the absolute value of the change amount is larger than a predetermined value (restriction value), the steering angle θh1 is increased or decreased so that the absolute value of the change amount becomes equal to the restriction value, and the increased or decreased steering angle θh1 is outputs as the steering angle θh2. When the absolute value of the change amount is equal to or smaller than the restriction value, the steering angle θh1 is directly output as the steering angle θh2. Note that, restriction may be provided by setting the upper and lower limit values of the change amount instead of setting the restriction value for the absolute value of the change amount, or restriction may be provided on a change rate or a difference rate in place of the change amount. The correction unit 933 corrects the steering angle θh2 and outputs the target turning angle θtref. For example, the target turning angle θtref is calculated from the steering angle θh2 by using a map that defines a characteristic of the target turning angle θtref for the magnitude |θh2| of the steering angle θh2. Alternatively, the target turning angle θtref may be calculated by simply multiplying the steering angle θh2 by a predetermined gain.

Figure 37:
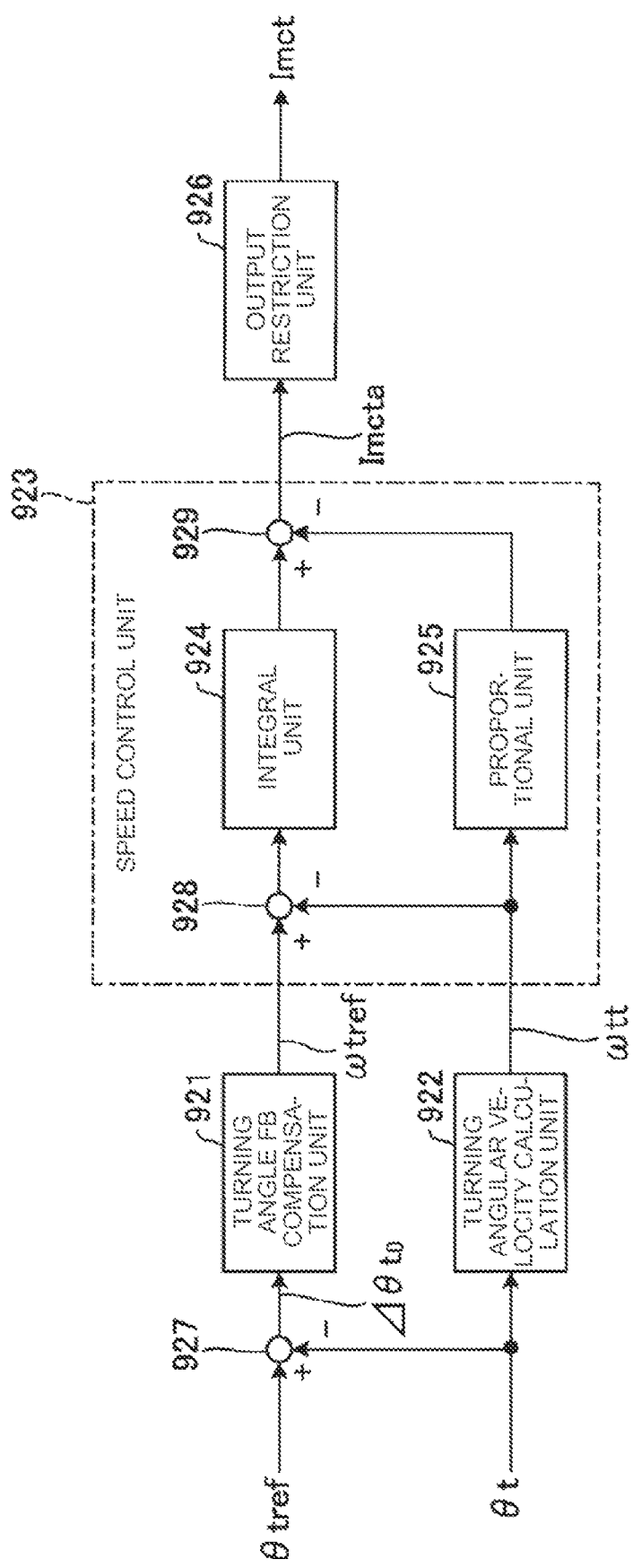
FIG. 37 is a diagram illustrating an exemplary configuration of a turning angle control unit.
Figure 38:
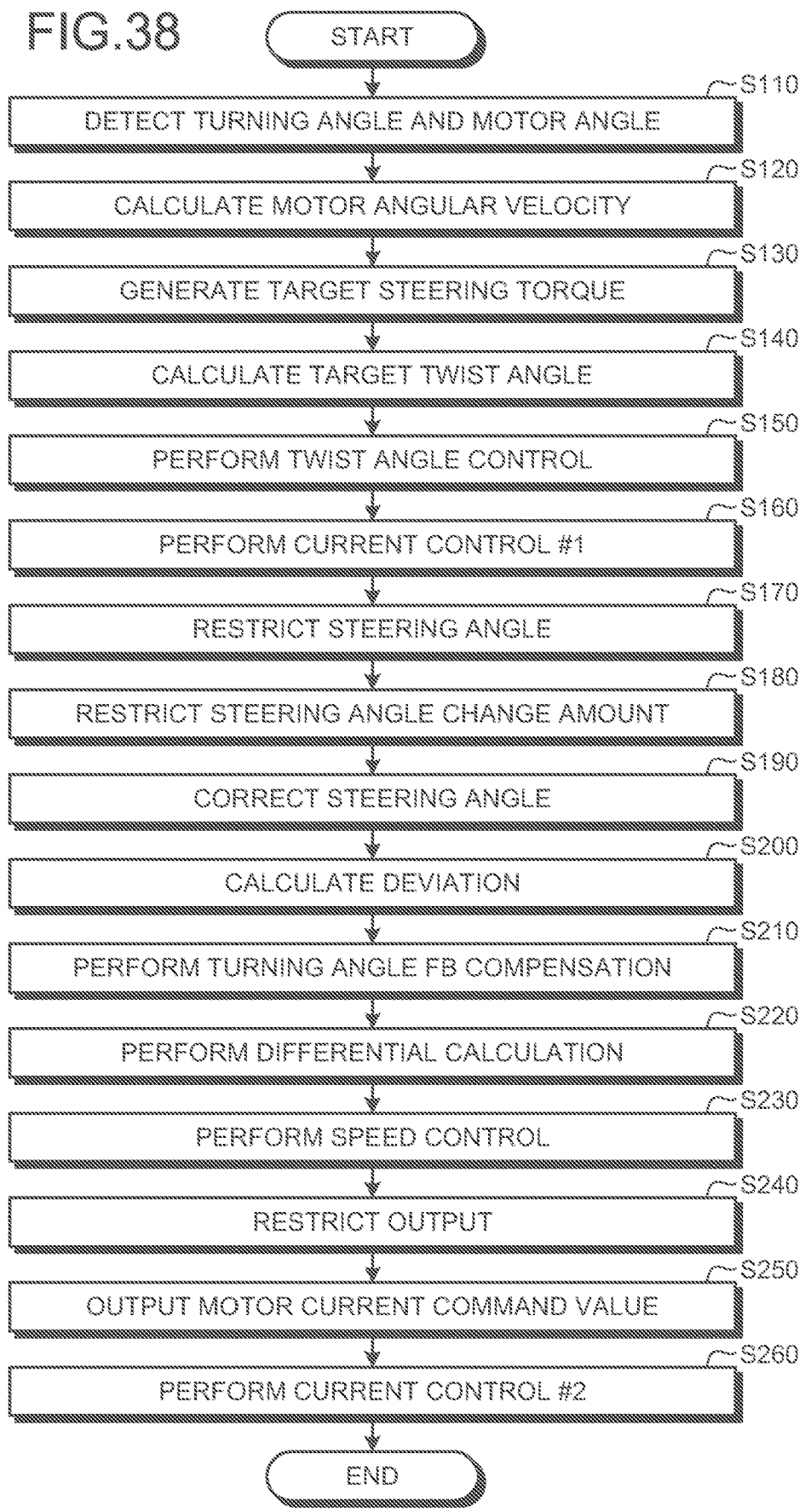
FIG. 38 is a flowchart illustrating exemplary operation of the third embodiment.

FIG. 37 is a diagram illustrating an exemplary configuration of the turning angle control unit. The configuration of the turning angle control unit 920 is same as the exemplary configuration of the twist angle control unit 300a illustrated in FIG. 33 from which the stabilization compensation unit 340 and the addition unit 362 are removed, the target turning angle θtref and the turning angle θt are input in place of the target twist angle Δθref and the twist angle Δθ, and the configurations and operations of a turning angle feedback (FB) compensation unit 921, a turning angular velocity calculation unit 922, a speed control unit 923, an output restriction unit 926, and a subtraction unit 927 are same as those of the twist angle FB compensation unit 310, the twist angular velocity calculation unit 320, the speed control unit 330, the output restriction unit 350, and the subtraction unit 361, respectively. Exemplary operation of the third embodiment in such a configuration will be described below with reference to a flowchart in FIG. 38. FIG. 38 is a flowchart illustrating the exemplary operation of the third embodiment.

Once operation is started, the angle sensor 73 detects the turning angle θt and the angle sensor 74 detects the motor angle θm (step S110), and the turning angle θt and the motor angle θm are input to the turning angle control unit 920 and the angular velocity calculation unit 951, respectively. The angular velocity calculation unit 951 calculates the motor angular velocity ωm by differentiating the motor angle θm and outputs the calculated motor angular velocity ωm to the twist angle control unit 300a (step S120). Thereafter, the target steering torque generation unit 202 executes operation same as that at steps S10 to S40 illustrated in FIG. 7 to perform current control by driving the reaction force motor (steps S130 to S160).

Meanwhile, in the turning angle control, the target turning angle generation unit 910 receives the steering angle θh, and the steering angle θh is input to the restriction unit 931. The restriction unit 931 restricts the upper and lower limit values of the steering angle θh to upper and lower limit values set in advance (step S170) and outputs the steering angle θh as the steering angle θh1 to the rate restriction unit 932. The rate restriction unit 932 restricts the change amount of the steering angle θh1 based on a restriction value set in advance (step S180) and outputs the steering angle θh1 as the steering angle θh2 to the correction unit 933. The correction unit 933 obtains the target turning angle θtref by correcting the steering angle θh2 (step S190) and outputs the target turning angle θtref to the turning angle control unit 920.

Having received the turning angle θt and the target turning angle θtref, the turning angle control unit 920 calculates a deviation Δθt0 by subtracting the turning angle θt from the target turning angle θtref at the subtraction unit 927 (step S200). The deviation Δθt0 is input to the turning angle FB compensation unit 921, and the turning angle FB compensation unit 921 compensates the deviation Δθt0 by multiplying the deviation Δθt0 by a compensation value (step S210) and outputs a target turning angular velocity ωtref to the speed control unit 923. The turning angular velocity calculation unit 922 receives the turning angle θt, calculates a turning angular velocity ωtt through differential calculation on the turning angle θt (step S220) and outputs the turning angular velocity ωtt to the speed control unit 923. Similarly to the speed control unit 330, the speed control unit 923 calculates a motor current command value Imcta by I-P control (step S230) and outputs the motor current command value Imcta to the output restriction unit 926. The output restriction unit 926 restricts the upper and lower limit values of the motor current command value Imcta to upper and lower limit values set in advance (step S240) and outputs the motor current command value Imcta as the motor current command value Imct (step S250). The motor current command value Imct is input to the current control unit 930, and the current control unit 930 performs current control by driving the drive motor 71 based on the motor current command value Imct and the current value Imd of the drive motor 71 detected by the motor current detector 940 (step S260).

Note that, the order of data input, calculation, and the like in FIG. 38 may be changed as appropriate. Similarly to the speed control unit 330 in the twist angle control unit 300a, the speed control unit 923 in the turning angle control unit 920 may perform PI control, P control, PID control, PI-D control, or the like in place of I-P control and only needs to perform any of P control, I control, and D control, and following control at the turning angle control unit 920 and the twist angle control unit 300a may be performed in a typically used control structure. The turning angle control unit 920 is not limited to a control configuration used for a vehicle device but may have any control configuration with which a real angle (in this example, the turning angle θt) follows a target angle (in this example, the target turning angle θtref), and for example, may have a control configuration used for an industrial positioning device, an industrial robot, or the like.

In the third embodiment, one ECU 50 controls the reaction force device 60 and the drive device 70 as illustrated in FIG. 34, but an ECU for the reaction force device 60 and an ECU for the drive device 70 may be provided. In this case, the ECUs perform data transmission and reception through communication. In addition, although the SBW system illustrated in FIG. 34 has no mechanical connection between the reaction force device 60 and the drive device 70, the present disclosure is also applicable to a SBW system including a mechanical torque transmission mechanism configured to mechanically connect the column shaft 2 and the rotation mechanism through a clutch or the like when anomaly has occurred to the system. In such a SBW system, when the system is normal, the clutch is turned off to set mechanical torque transfer to an open state, or when the system is anomalous, the clutch is turned on to set mechanical torque transfer to an enabled state.

The twist angle control units 300 and 300a in the above-described first to third embodiments directly calculate the motor current command value Imc and an assist current command value Iac, but before this calculation, motor torque (target torque) to be first output may be calculated, and then, the motor current command value and the assist current command value may be calculated. In this case, a typically used relation between motor current and motor torque is used to calculate the motor current command value and the assist current command value from the motor torque. In the present embodiment as well, effects same as those of the first embodiment can be obtained with a configuration including the steering reaction force correction unit 280 in the target steering torque generation unit 202 as described above in the first embodiment.

Note that, the drawings used in the above description are conceptual diagrams for performing qualitative description of the present disclosure, and the present disclosure is not limited to these drawings. The above-described embodiments are preferable examples of the present disclosure, but not limited thereto, and may be modified in various manners without departing from the scope of the present disclosure. The present disclosure is not limited to a torsion bar but may have a mechanism having an optional spring constant between the wheel and the motor or the reaction force motor.

Technological ideas that solve the problem related to the second background art will be described below.

(1) A vehicle steering device configured to assist and control a steering system of a vehicle by driving and controlling a motor configured to assist steering force, in which: the vehicle steering device has, as driving modes of the vehicle, a first mode and a second mode different from the first mode; the change rate of target steering torque of the motor in the second mode is equal to or larger than that in the first mode in a predetermined region in which the absolute value of the steering angle of a wheel is equal to or larger than zero; and the change rate of the target steering torque in the second mode is smaller than that in the first mode in a region other than the predetermined region.

(2) The vehicle steering device described in (1), further including: a determination unit configured to determine the second mode when having sensed a predetermined operation; and a target steering torque generation unit configured to generate a first torque signal that increases along a curve having a change rate gradually decreasing as the absolute value of the steering angle of the wheel increases, multiply a second torque signal generated based on the first torque signal by a correction gain to generate a third torque signal, and add a fourth torque signal to the third torque signal to generate the target steering torque, in which: in the second mode, the target steering torque generation unit generates the positive correction gain smaller than one and also generates the fourth torque signal having a gradient larger than that of the first torque signal where the absolute value of the steering angle is zero.

(3) The vehicle steering device described in (2), in which the fourth torque signal in the second mode has a constant value in a region in which the steering angle is equal to or larger than a predetermined value.

(4) The vehicle steering device described in (2) or (3), in which the target steering torque generation unit sets the correction gain to be one and the fourth torque signal to be zero in the first mode.

(5) The vehicle steering device described in any one of (1) to (4), in which the target steering torque in the second mode is smaller than the target steering torque in the first mode.

<Disclosure of Aspect for Solving Problem Related to Third Background Art>

The aspect for solving the problem related to the second background art will be described below based on FIGS. 39 to 64.

Figure 39:
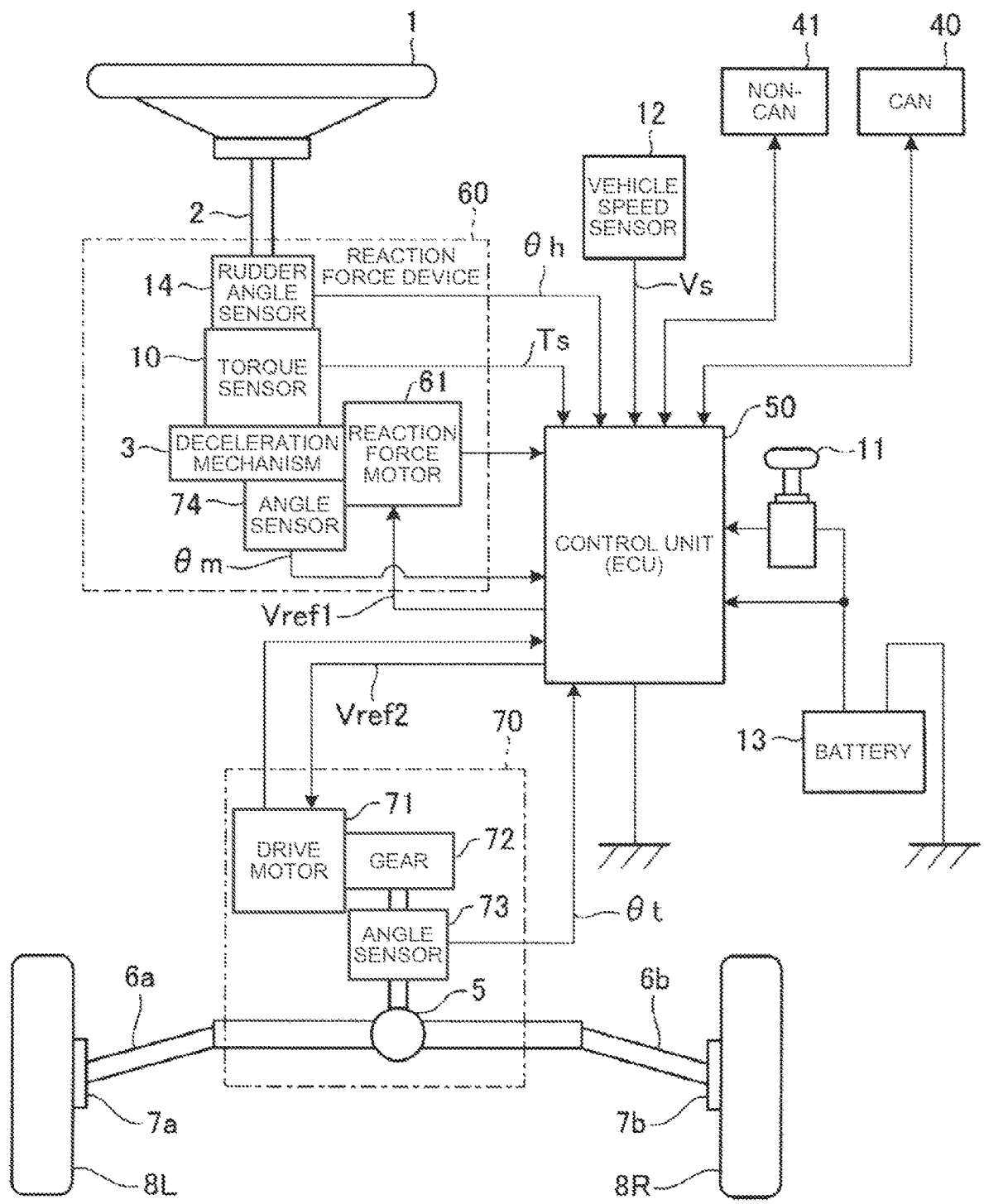
FIG. 39 is a diagram illustrating the entire configuration of a steer-by-wire vehicle steering device according to a first embodiment.

(First embodiment) FIG. 39 is a diagram illustrating the entire configuration of a steer-by-wire vehicle steering device according to a first embodiment. The steer-by-wire (SBW) vehicle steering device (hereinafter also referred to as an "SBW system") illustrated in FIG. 39 is a system configured to transfer, by an electric signal, an operation of a wheel 1 to a turning mechanism including steering wheels 8L and 8R. As illustrated in FIG. 39, the SBW system includes a reaction force device 60 and a drive device 70, and a control unit (ECU) 50 controls the devices.

The reaction force device 60 includes a torque sensor 10 configured to detect steering torque Ts of the wheel 1, a rudder angle sensor 14 configured to detect a steering angle θh, a deceleration mechanism 3, an angle sensor 74, and a reaction force motor 61. These components are provided to a column shaft 2 of the wheel 1. The reaction force device 60 performs detection of the steering angle θh at the rudder angle sensor 14 and simultaneously transfers, to the driver as reaction force torque, the motion state of a vehicle conveyed from the steering wheels 8L and 8R. The reaction force torque is generated by the reaction force motor 61. The torque sensor 10 detects the steering torque Ts. In addition, the angle sensor 74 detects a motor angle θm of the reaction force motor 61.

The drive device 70 includes a drive motor 71, a gear 72, and an angle sensor 73. Drive power generated by the drive motor 71 is coupled to the steering wheels 8L and 8R through the gear 72, a pinion rack mechanism 5, and tie rods 6a and 6b and further through hub units 7a and 7b. The drive device 70 drives the drive motor 71 in accordance with steering of the wheel 1 by the driver, applies the drive power to the pinion rack mechanism 5 through the gear 72, and turns the steering wheels 8L and 8R through the tie rods 6a and 6b. The angle sensor 73 is disposed near the pinion rack mechanism 5 and detects a turning angle θt of the steering wheels 8L and 8R. To cooperatively control the reaction force device 60 and the drive device 70, the ECU 50 generates, based on a vehicle speed Vs from a vehicle speed sensor 12 and other information in addition to information such as the steering angle θh and the turning angle θt output from the devices, a voltage control command value Vref1 for driving and controlling the reaction force motor 61 and a voltage control command value Vref2 for driving and controlling the drive motor 71.

Figure 40:
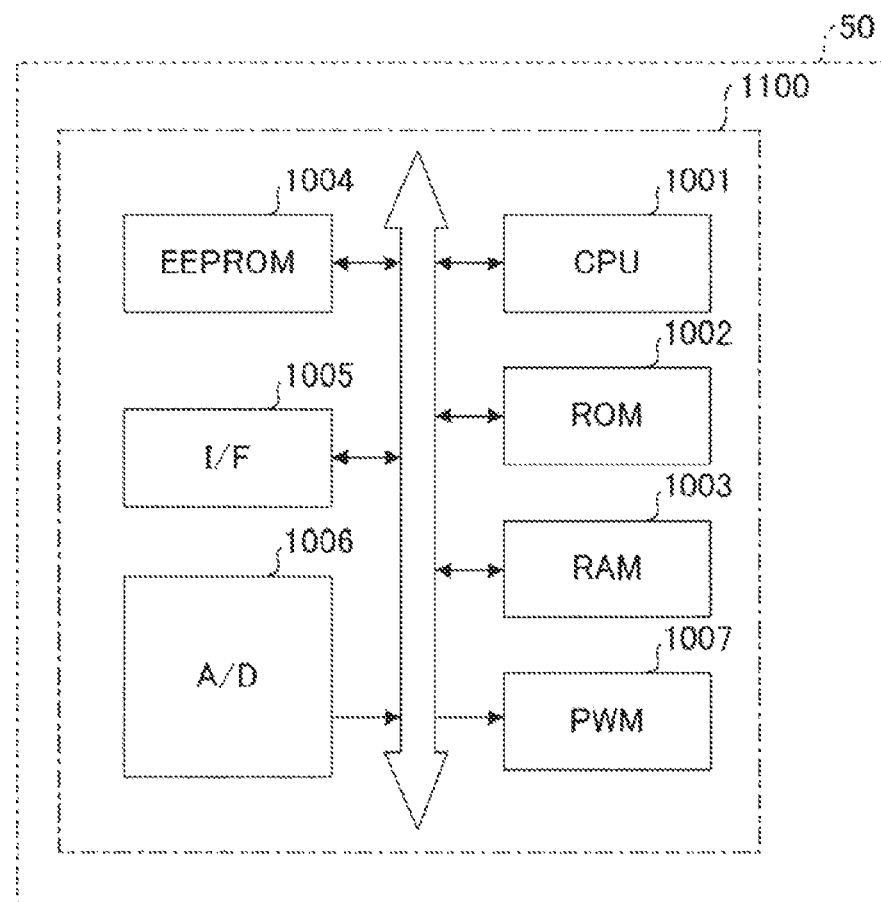
FIG. 40 is a schematic diagram illustrating a hardware configuration of a control unit configured to control the SBW system.

Electric power is supplied from a battery 13 to the control unit (ECU) 50, and an ignition key signal is input to the control unit 50 through an ignition key 11. The control unit 50 performs calculation of a current command value based on the steering torque Ts detected by the torque sensor 10 and the vehicle speed Vs detected by the vehicle speed sensor 12 and controls current supplied to the reaction force motor 61 and the drive motor 71. The control unit 50 is connected to an on-board network such as a controller area network (CAN) 40 through which various kinds of information of the vehicle are transmitted and received. In addition, a control unit 30 is connectable to a non-CAN 41 configured to transmit and receive communication other than the CAN 40, analog and digital signals, radio wave, and the like. The control unit 50 is mainly configured as a CPU (including an MCU and an MPU). FIG. 40 is a schematic diagram illustrating a hardware configuration of the control unit configured to control the SBW system.

A control computer 1100 configured as the control unit 50 includes a central processing unit (CPU) 1001, a read only memory (ROM) 1002, a random access memory (RAM) 1003, an electrically erasable programmable ROM (EEPROM) 1004, an interface (I/F) 1005, an analog/digital (A/D) converter 1006, and a pulse width modulation (PWM) controller 1007, and these components are connected to a bus. The CPU 1001 is a processing device configured to execute a computer program for control (hereinafter referred to as a control program) of the SBW system and control the SBW system. The ROM 1002 stores a control program for controlling the SBW system. In addition, the RAM 1003 is used as a work memory for operating the control program. The EEPROM 1004 stores, for example, control data input to and output from the control program. The control data is used on the control program loaded onto the RAM 1003 after the control unit 30 is powered on, and is overwritten to the EEPROM 1004 at a predetermined timing. The ROM 1002, the RAM 1003, the EEPROM 1004, and the like are storage devices configured to store information and are storage devices (primary storage devices) directly accessible from the CPU 1001.

The A/D converter 1006 receives, for example, signals of the steering torque Ts and the steering angle θh and converts the signals into digital signals. The interface 1005 is connected to the CAN 40. The interface 1005 receives a signal (vehicle speed pulse) of a vehicle speed V from the vehicle speed sensor 12. The PWM controller 1007 outputs a PWM control signal of each UVW phase based on a current command value to the reaction force motor 61 and the drive motor 71.

Figure 41:
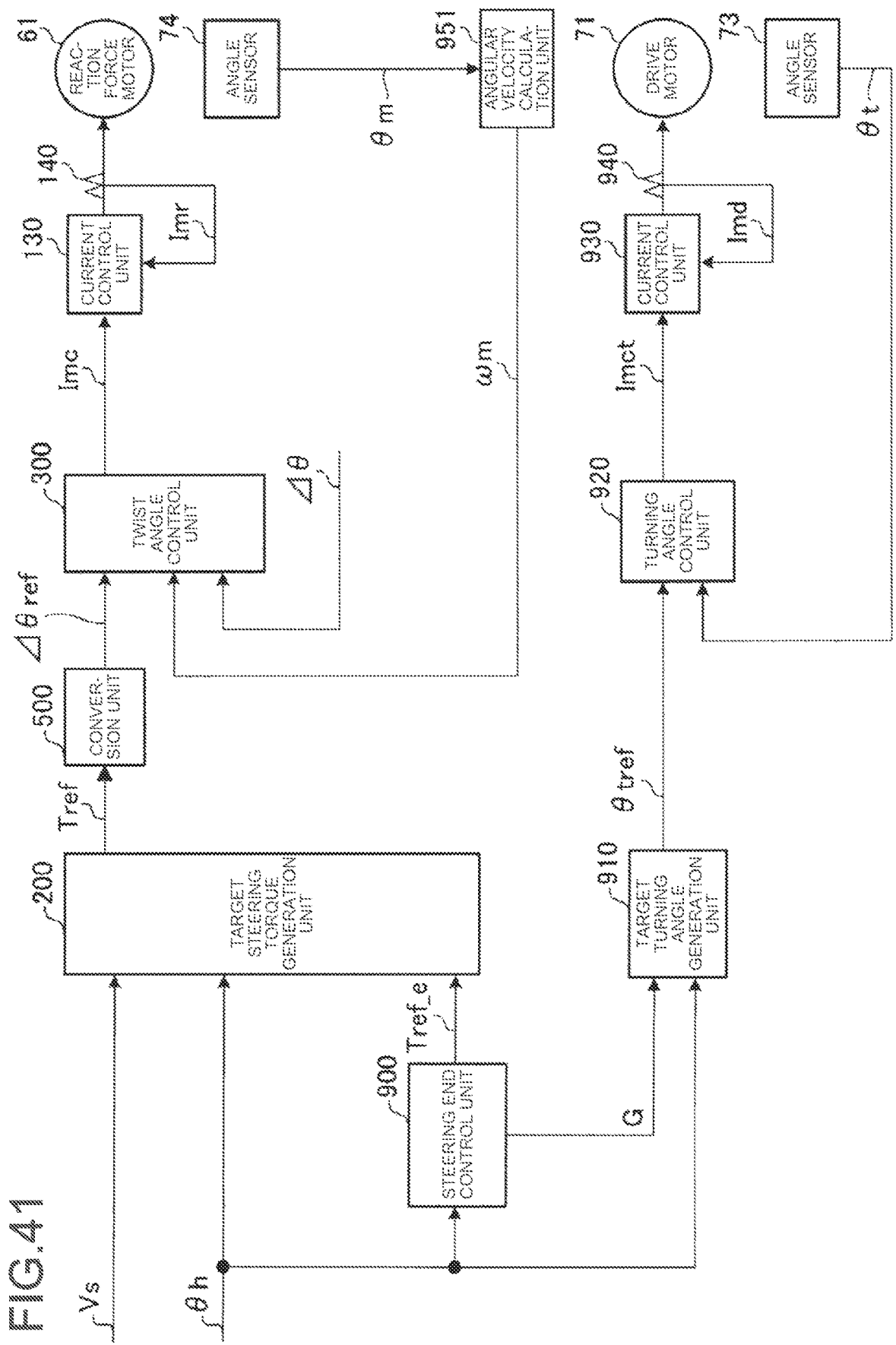
FIG. 41 is a diagram illustrating an exemplary internal block configuration of a control unit according to the first embodiment.

The configuration of the first embodiment in which the present disclosure is applied to such a SBW system will be described below. FIG. 41 is a diagram illustrating an exemplary internal block configuration of the control unit according to the first embodiment. In the present embodiment, control (hereinafter referred to as "twist angle control") of a twist angle Δθ and control (hereinafter referred to as "turning angle control") of the turning angle θt are performed, the reaction force device is controlled by the twist angle control, and the drive device is controlled by the turning angle control. Note that, the drive device may be controlled by another control method. The control unit 50 includes, as an internal block configuration, a target steering torque generation unit 200, a twist angle control unit 300, a conversion unit 500, a steering end control unit 900, a target turning angle generation unit 910, and a turning angle control unit 920. The target steering torque generation unit 200 generates a target steering torque Tref as a target value of steering torque when a steering system of the vehicle is assisted and controlled in the present disclosure. The conversion unit 500 converts the target steering torque Tref into a target twist angle Δθref. The twist angle control unit 300 generates a motor current command value Imc as a control target value of current supplied to the reaction force motor 61.

Figure 42:
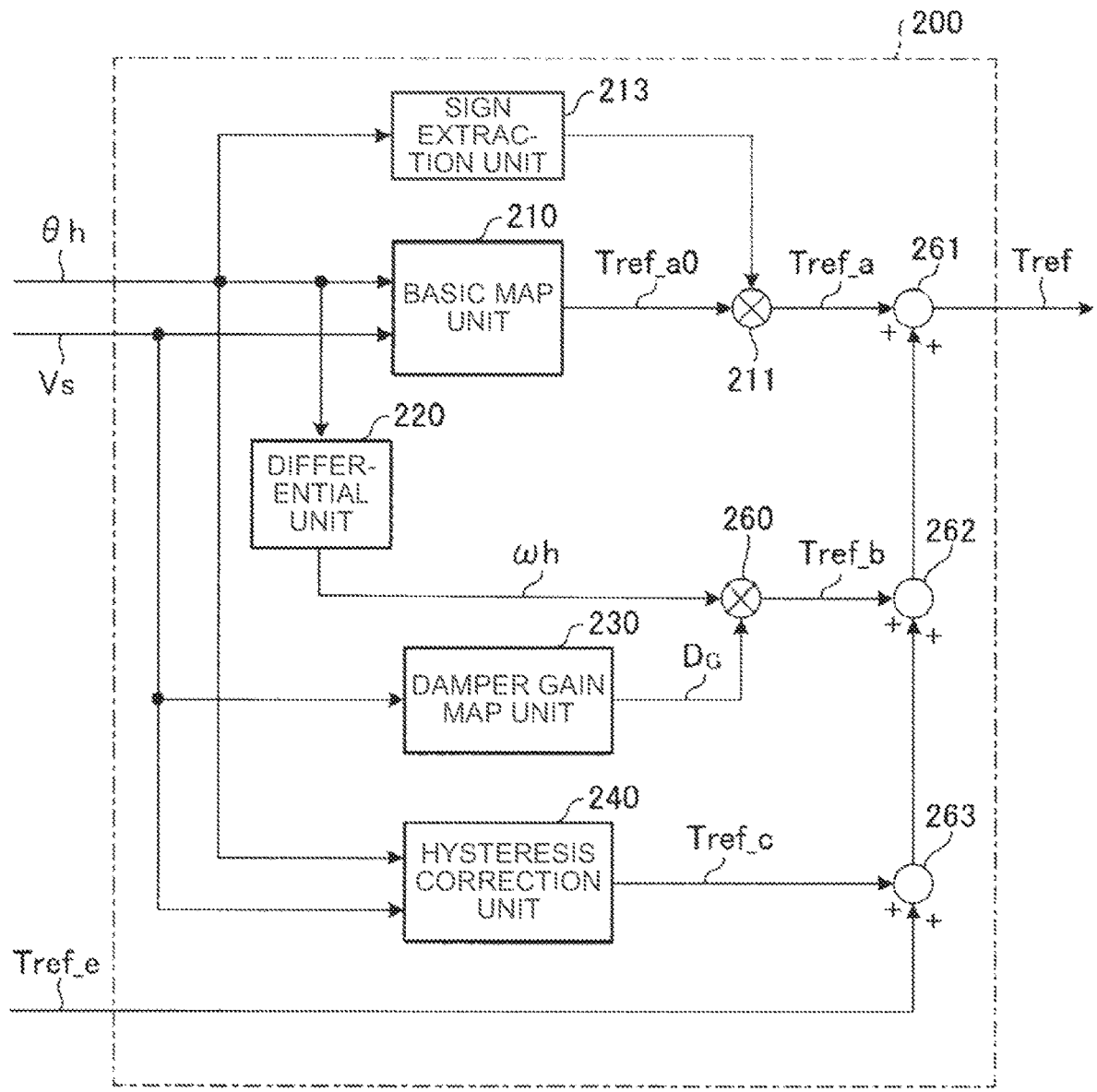
FIG. 42 is a block diagram illustrating an exemplary configuration of a target steering torque generation unit.
Figure 43:
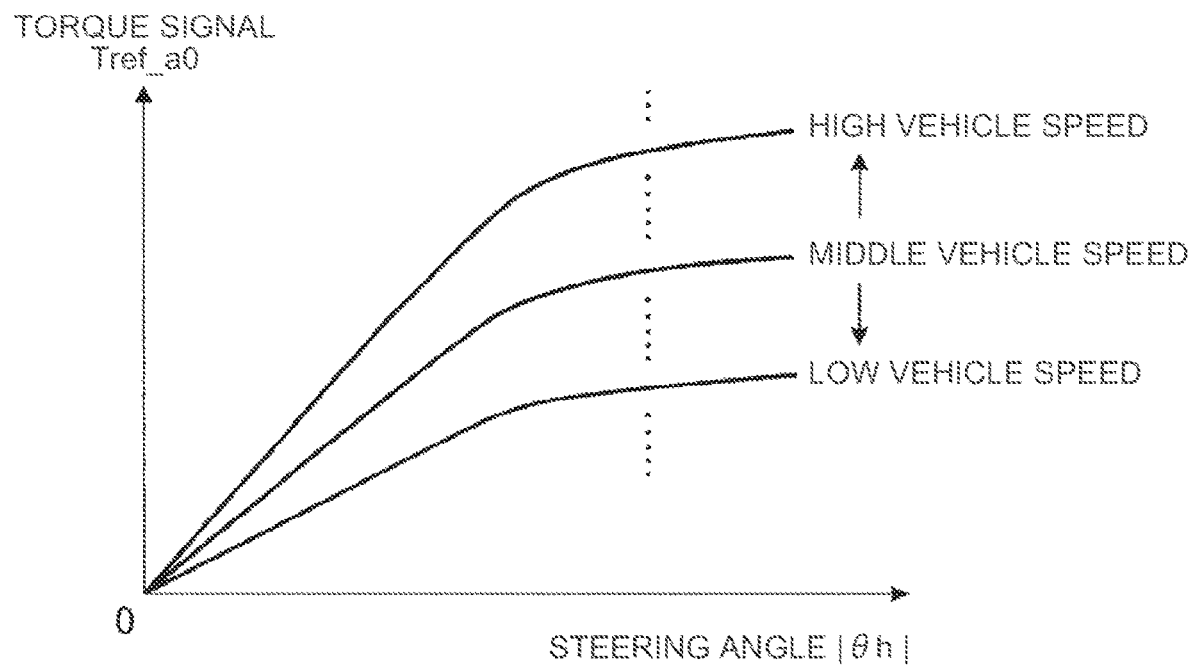
FIG. 43 is a diagram illustrating exemplary characteristics of a basic map held by a basic map unit.
Figure 44:
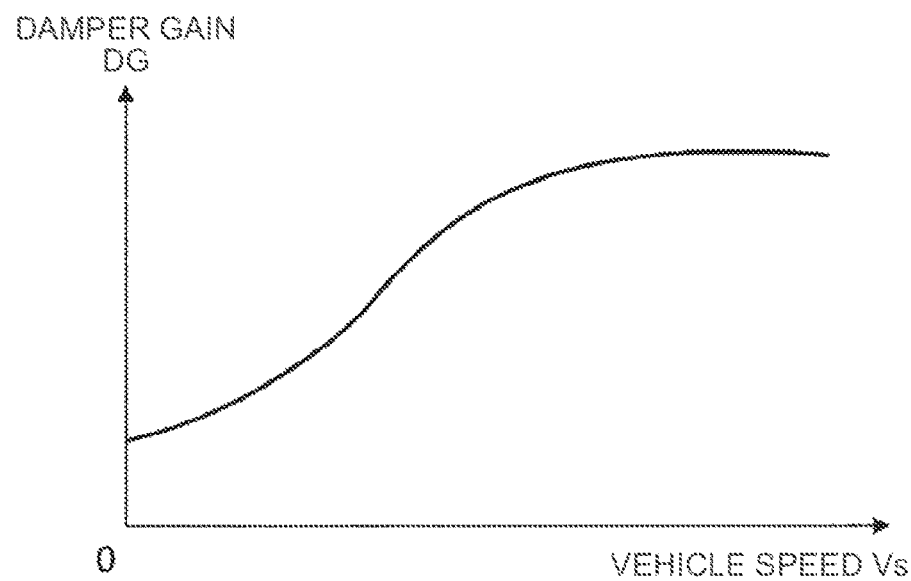
FIG. 44 is a diagram illustrating exemplary characteristics of a damper gain map held by a damper gain map unit.

In the following, the target steering torque generation unit 200 will be first described below with reference to FIG. 42. FIG. 42 is a block diagram illustrating an exemplary configuration of the target steering torque generation unit. As illustrated in FIG. 42, the target steering torque generation unit 200 includes a basic map unit 210, a multiplication unit 211, a differential unit 220, a damper gain map unit 230, a hysteresis correction unit 240, a SAT information correction unit 250, a multiplication unit 260, and addition units 261, 262, and 263. FIG. 43 is a diagram illustrating exemplary characteristics of a basic map held by the basic map unit. FIG. 44 is a diagram illustrating exemplary characteristics of a damper gain map held by the damper gain map unit. The steering angle θh and the vehicle speed Vs are input to the basic map unit 210. The basic map unit 210 outputs a torque signal Tref_a0 having the vehicle speed Vs as a parameter by using the basic map illustrated in FIG. 43. Specifically, the basic map unit 210 outputs the torque signal Tref_a0 in accordance with the vehicle speed Vs.

As illustrated in FIG. 38, the torque signal Tref_a0 has such a characteristic that the torque signal Tref_a0 increases along a curve having a change rate gradually decreasing as the magnitude (absolute value) |θh| of the steering angle θh increases. In addition, the torque signal Tref_a0 has such a characteristic that the torque signal Tref_a0 increases as the vehicle speed Vs increases. Note that, although a map in accordance with the magnitude |θh| of the steering angle θh is configured in FIG. 5, a map in accordance with the positive or negative steering angle θh may be configured. In this case, the value of the torque signal Tref_a0 can be positive and negative values, and sign calculation to be described later is unnecessary. The following description will be made on an aspect of outputting the torque signal Tref_a0 that is a positive value in accordance with the magnitude |θh| of the steering angle θh illustrated in FIG. 5.

A sign extraction unit 213 extracts the sign of the steering angle θh. Specifically, for example, the value of the steering angle θh is divided by the absolute value of the steering angle θh. Accordingly, the sign extraction unit 213 outputs "1" when the sign of the steering angle θh is "+", or outputs "−1" when the sign of the steering angle θh is "−". The steering angle θh is input to the differential unit 220. The differential unit 220 calculates a rudder angular velocity ωh that is angular velocity information by differentiating the steering angle θh. The differential unit 220 outputs the calculated rudder angular velocity ωh to the multiplication unit 260. The vehicle speed Vs is input to the damper gain map unit 230. The damper gain map unit 230 outputs a damper gain $D_G$ in accordance with the vehicle speed Vs by using a vehicle speed sensitive damper gain map illustrated in FIG. 44.

As illustrated in FIG. 44, the damper gain $D_G$ has such a characteristic that the damper gain $D_G$ gradually increases as the vehicle speed Vs increases. The damper gain $D_G$ may be variable in accordance with the steering angle θh. The multiplication unit 260 multiplies the rudder angular velocity ωh output from the differential unit 220 by the damper gain $D_G$ output from the damper gain map unit 230, and outputs a result of the multiplication as a torque signal Tref_b to the addition unit 262. The hysteresis correction unit 240 calculates a torque signal Tref_c by using Expressions (1) and (2) below based on the steering angle θh and a steering state signal STs. Although not described herein, the steering state signal STs is a state signal indicating a result of determination of whether the steering direction is right or left based on the sign of a motor angular velocity ωm. Note that, in Expressions (1) and (2) below, x represents the steering angle θh, and $y_R$=Tref_c and $y_L$=Tref_c represent the torque signal (fourth torque signal) Tref_c. In addition, a coefficient "a" is a value larger than one, and a coefficient "c" is a value larger than zero. A coefficient Ahys indicates the output width of a hysteresis characteristic, and the coefficient "c" indicates the roundness of the hysteresis characteristic.

$$y_R = Ahys\{1 - a^{-c(x-b)}\} \tag{1}$$

$$y_L = -Ahys\{1 - a^{c(x-b')}\} \tag{2}$$

In a case of right steering, the torque signal (fourth torque signal) Tref_c ($y_R$) is calculated by using Expression (1) above. In a case of left steering, the torque signal (fourth torque signal) Tref_c ($y_L$) is calculated by using Expression (2) above. Note that, when switching is made from right steering to left steering or when switching is made from left steering to right steering, a coefficient "b" or "b'" indicated in Expression (3) or (4) below is substituted into Expressions (1) and (2) above after steering switching based on the values of final coordinates ($x_1$, $y_1$) that are the previous values of the steering angle θh and the torque signal Tref_c. Accordingly, continuity through steering switching is maintained.

$$b = x_1 + (1/c)\log_a\{1 - (y_1/Ahys)\} \tag{3}$$

$$b' = x_1 - (1/c)\log_a\{1 - (y_1/Ahys)\} \tag{4}$$

Expressions (3) and (4) above can be derived by substituting $x_1$ into x and substituting $y_1$ into $y_R$ and $y_L$ in Expressions (1) and (2) above.

For example, when Napierian logarithm e is used as the coefficient "a", Expressions (1), (2), (3), and (4) above can be expressed as Expressions (5), (6), (7), and (8) below, respectively.

$$y_R = Ahys[1-\exp\{-c(x-b)\}] \quad (5)$$

$$y_L = -Ahys[\{1-\exp\{-c(x-b')\}\}] \quad (6)$$

$$b = x_1 + (1/c)\log_e\{1-(y_1/Ahys)\} \quad (7)$$

$$b' = x_1 - (1/c)\log_e\{1-(y_1/Ahys)\} \quad (8)$$

Figure 45:
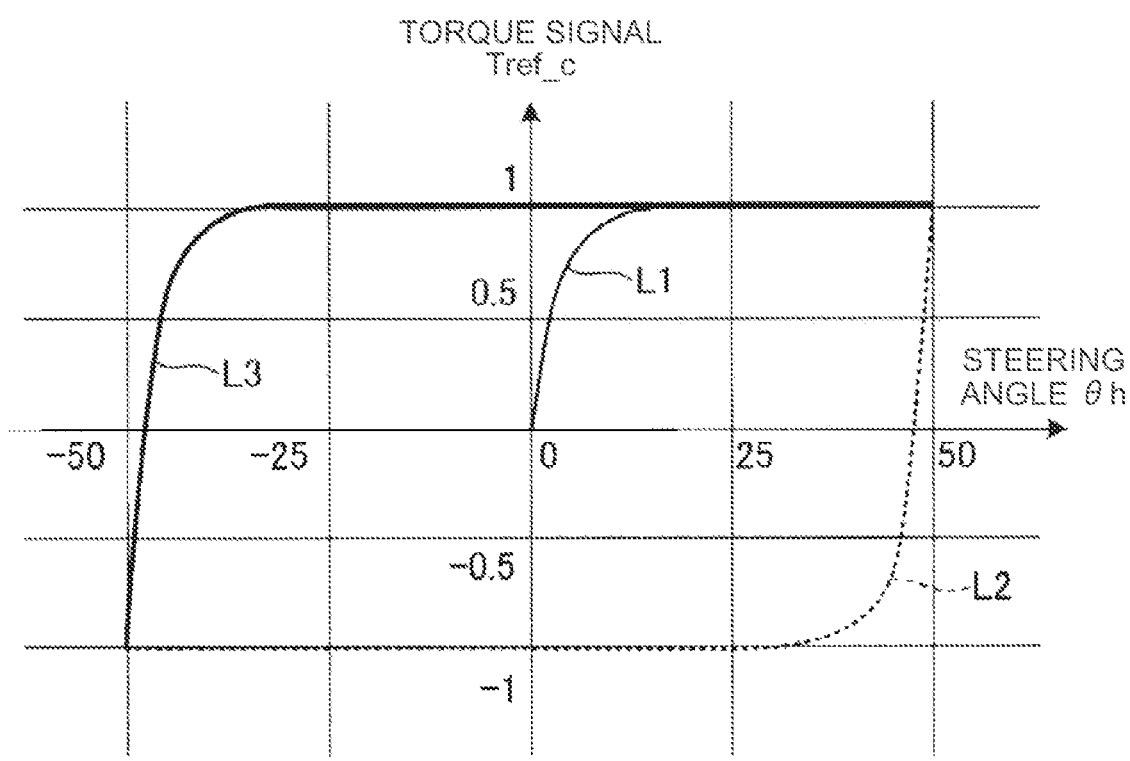
FIG. 45 is a diagram illustrating exemplary characteristics of a hysteresis correction unit.

FIG. 45 is a diagram illustrating exemplary characteristics of the hysteresis correction unit. The example illustrated in FIG. 45 indicates an exemplary characteristic of the torque signal Tref_c subjected to hysteresis correction when Ahys=1 [Nm] and c=0.3 are set in Expressions (7) and (8) above and steering is performed from 0 [deg] to +50 [deg] or −50 [deg]. As illustrated in FIG. 7, the torque signal Tref_c output from the hysteresis correction unit 240 has a hysteresis characteristic such as the origin at zero→L1 (thin line)→L2 (dashed line)→L3 (bold line). Note that, the coefficient Ahys, which indicates the output width of the hysteresis characteristic, and the coefficient "c", which indicates the roundness thereof may be variable in accordance with one or both of the vehicle speed Vs and the steering angle θh. In addition, the rudder angular velocity ωh is obtained through the differential calculation on the steering angle θh but is provided with low-pass filter (LPF) processing as appropriate to reduce influence of noise in a higher range. In addition, the differential calculation and the LPF processing may be performed with a high-pass filter (HPF) and a gain. Moreover, the rudder angular velocity ωh may be calculated by performing the differential calculation and the LPF processing not on the steering angle θh but on a wheel angle θ1 detected by the upper angle sensor or a column angle θ2 detected by the lower angle sensor. The motor angular velocity ωm may be used as the angular velocity information in place of the rudder angular velocity ωh, and in this case, the differential unit 220 is not needed.

The multiplication unit 211 multiplies the torque signal Tref_a0 output from the basic map unit 210 by "1" or "−1" output from the sign extraction unit 213, and outputs a result of the multiplication as a torque signal Tref_a to the addition unit 261. The torque signal Tref_a in the present embodiment corresponds to a "second torque signal" of the present disclosure. The torque signals Tref_a, Tref_b, and Tref_c obtained as described above and a torque signal Tref_e output from the steering end control unit 900 to be described later are added at the addition units 261, 262, and 263 and a result of the addition is output as the target steering torque Tref.

In the twist angle control, such control that the twist angle Δθ follows the target twist angle Δθref calculated through the target steering torque generation unit 200 and the conversion unit 500 by using the steering angle θh and the like is performed. The motor angle θm of the reaction force motor 61 is detected by the angle sensor 74, and the motor angular velocity ωm is calculated by differentiating the motor angle θm at an angular velocity calculation unit 951. In addition, a current control unit 130 performs current control by driving the reaction force motor 61 based on the motor current command value Imc output from the twist angle control unit 300 and a current value Imr of the reaction force motor 61 detected by a motor current detector 140.

Figure 46:
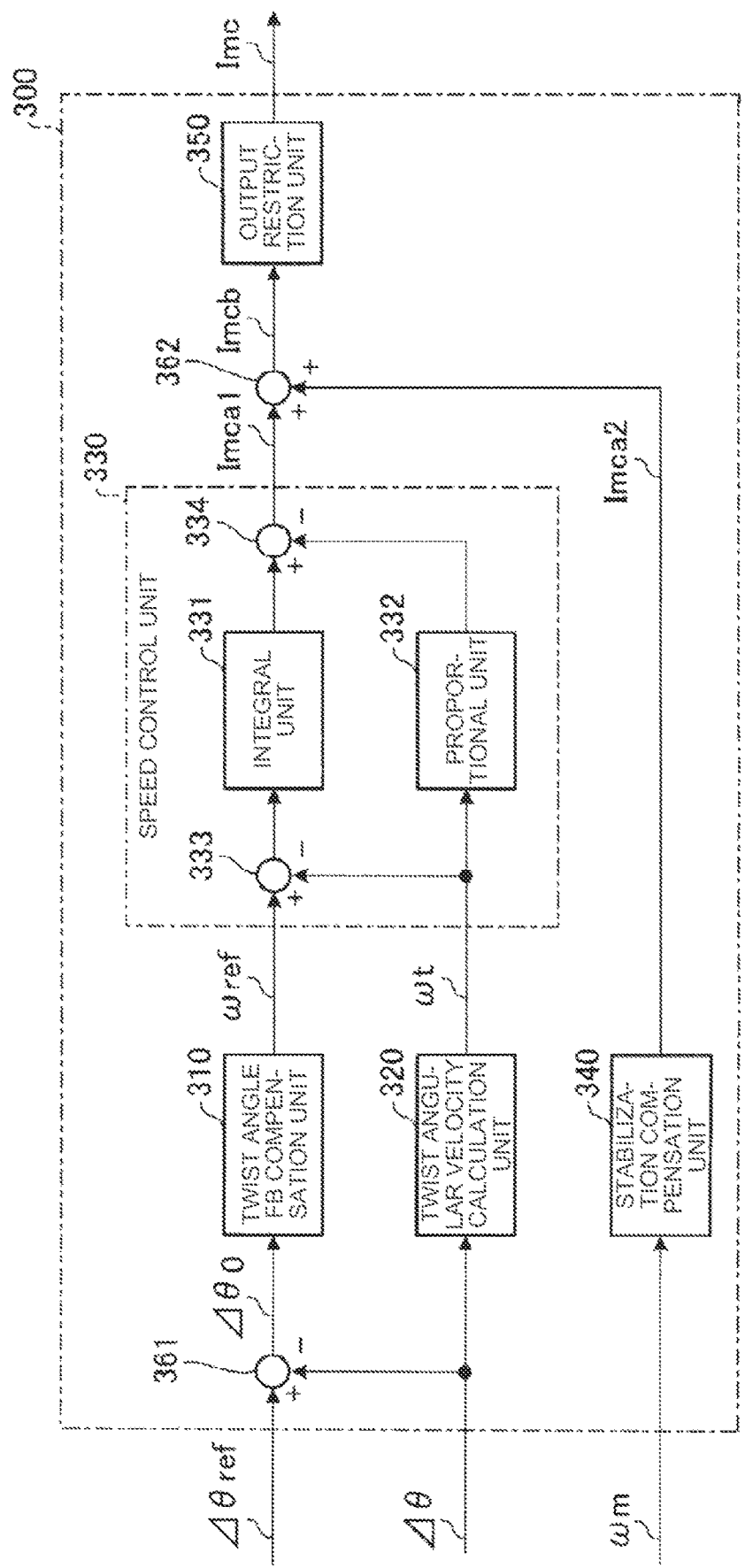
FIG. 46 is a block diagram illustrating an exemplary configuration of a twist angle control unit.

The twist angle control unit 300 will be described below with reference to FIG. 46. FIG. 46 is a block diagram illustrating an exemplary configuration of the twist angle control unit. The twist angle control unit 300 calculates the motor current command value Imc based on the target twist angle Δθref, the twist angle Δθ, and the motor angular velocity ωm. The twist angle control unit 300 includes a twist angle feedback (FB) compensation unit 310, a twist angular velocity calculation unit 320, a speed control unit 330, a stabilization compensation unit 340, an output restriction unit 350, a subtraction unit 361, and an addition unit 362.

The target twist angle Δθref output from the conversion unit 500 is input to the subtraction unit 361 through addition. The twist angle Δθ is input to the subtraction unit 361 through subtraction and also input to the twist angular velocity calculation unit 320. The motor angular velocity ωm is input to the stabilization compensation unit 340. The twist angle FB compensation unit 310 multiplies a deviation Δθ0 between the target twist angle Δθref and the twist angle Δθ, which is calculated at the subtraction unit 361, by a compensation value CFB (transfer function) and outputs a target twist angular velocity ωref with which the twist angle Δθ follows the target twist angle Δθref. The compensation value CFB may be a simple gain Kpp, or a typically used compensation value such as a PI control compensation value. The target twist angular velocity ωref is input to the speed control unit 330. With the twist angle FB compensation unit 310 and the speed control unit 330, it is possible to cause the twist angle Δθ to follow the target twist angle Δθref, thereby achieving desired steering torque. The twist angular velocity calculation unit 320 calculates a twist angular velocity ωt by performing differential arithmetic processing on the twist angle Δθ. The twist angular velocity ωt is output to the speed control unit 330. The twist angular velocity calculation unit 320 may perform, as differential calculation, pseudo differentiation with a HPF and a gain. In addition, the twist angular velocity calculation unit 320 may calculate the twist angular velocity ωt by another means or not from the twist angle Δθ and may output the calculated twist angular velocity ωt to the speed control unit 330.

The speed control unit 330 calculates, by I-P control (proportional processing PI control), a motor current command value Imca1 with which the twist angular velocity ωt follows the target twist angular velocity ωref. A subtraction unit 333 calculates a difference (ωref−ωt) between the target twist angular velocity ωref and the twist angular velocity ωt. An integral unit 331 integrates the difference (ωref−ωt) between the target twist angular velocity ωref and the twist angular velocity ωt, and inputs a result of the integration to a subtraction unit 334 through addition. The twist angular velocity ωt is also output to a proportional unit 332. The proportional unit 332 performs proportional processing with a gain Kvp on the twist angular velocity ωt and inputs a result of the proportional processing to the subtraction unit 334 through subtraction. A result of the subtraction at the subtraction unit 334 is output as the motor current command value Imca1. Note that, the speed control unit 330 may calculate the motor current command value Imca1 not by I-P control but by a typically used control method such as PI control, P (proportional) control, PID (proportional-integral-differential) control, PI-D control (differential processing PID control), model matching control, or model reference control.

The stabilization compensation unit 340 has a compensation value Cs (transfer function) and calculates a motor current command value Imca2 from the motor angular velocity ωm. When gains of the twist angle FB compensation unit 310 and the speed control unit 330 are increased to improve the following capability and the disturbance characteristic, a controlled oscillation phenomenon occurs in a higher range. To avoid this, the transfer function (Cs) necessary for stabilization of the motor angular velocity ωm is set to the stabilization compensation unit 340. Accordingly, stabilization of the entire EPS control system can be achieved.

The addition unit 362 adds the motor current command value Imca1 from the speed control unit 330 and the motor current command value Imca2 from the stabilization compensation unit 340, and outputs a result of the addition as a motor current command value Imcb. The upper and lower limit values of the motor current command value Imcb are set to the output restriction unit 350 in advance. The output restriction unit 350 outputs the motor current command value Imc with restriction on the upper and lower limit values of the motor current command value Imcb.

Note that, the configuration of the twist angle control unit 300 in the present embodiment is exemplary and may be different from the configuration illustrated in FIG. 46. For example, the twist angle control unit 300 need not necessarily include the stabilization compensation unit 340.

In the turning angle control, a target turning angle θtref is generated at the target turning angle generation unit 910 based on the steering angle θh and a turning ratio gain G output from the steering end control unit 900 to be described later. The target turning angle θtref together with the turning angle θt is input to a turning angle control unit 920, and a motor current command value Imct with which the turning angle θt is equal to the target turning angle θtref is calculated at the turning angle control unit 920. Then, with configurations and operations same as those of the current control unit 130, a current control unit 930 performs current control by driving the drive motor 71 based on the motor current command value Imct and a current value Imd of the drive motor 71 detected by a motor current detector 940.

Figure 47:
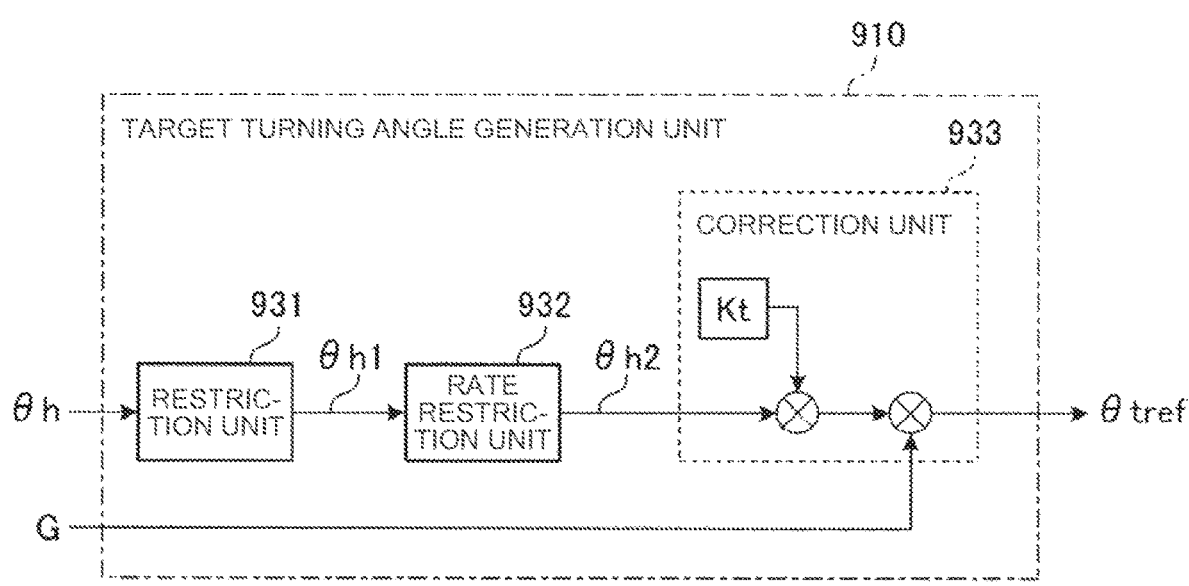
FIG. 47 is a block diagram illustrating an exemplary configuration of a target turning angle generation unit.

The target turning angle generation unit 910 will be described below with reference to FIG. 47. FIG. 9 is block diagram illustrating an exemplary configuration of the target turning angle generation unit. The target turning angle generation unit 910 includes a restriction unit 931, a rate restriction unit 932, and a correction unit 933. The restriction unit 931 outputs a steering angle θh1 with restriction on the upper and lower limit values of the steering angle θh. Similarly to the output restriction unit 350 in the twist angle control unit 300 illustrated in FIG. 8, the upper and lower limit values of the steering angle θh are set in advance and restricted. To avoid abrupt change of the steering angle, the rate restriction unit 932 provides restriction by setting a restriction value for the change amount of the steering angle θh1 and outputs the steering angle θh2. For example, the change amount is set to be the difference from the steering angle θh1 at the previous sample. When the absolute value of the change amount is larger than a predetermined value (restriction value), the steering angle θh1 is increased or decreased so that the absolute value of the change amount becomes equal to the restriction value, and the increased or decreased steering angle θh1 is output as the steering angle θh2. When the absolute value of the change amount is equal to or smaller than the restriction value, the steering angle θh1 is directly output as the steering angle θh2. Note that restriction may be provided by setting the upper and lower limit values of the change amount instead of setting the restriction value for the absolute value of the change amount, or restriction may be provided on a change rate or a difference rate in place of the change amount. The correction unit 933 corrects the steering angle θh2 and outputs the target turning angle θtref. In the present embodiment, the target turning angle θtref is calculated by multiplying the steering angle θh2 by a coefficient Kt to be described later and the turning ratio gain G output from the steering end control unit 900.

Figure 48:
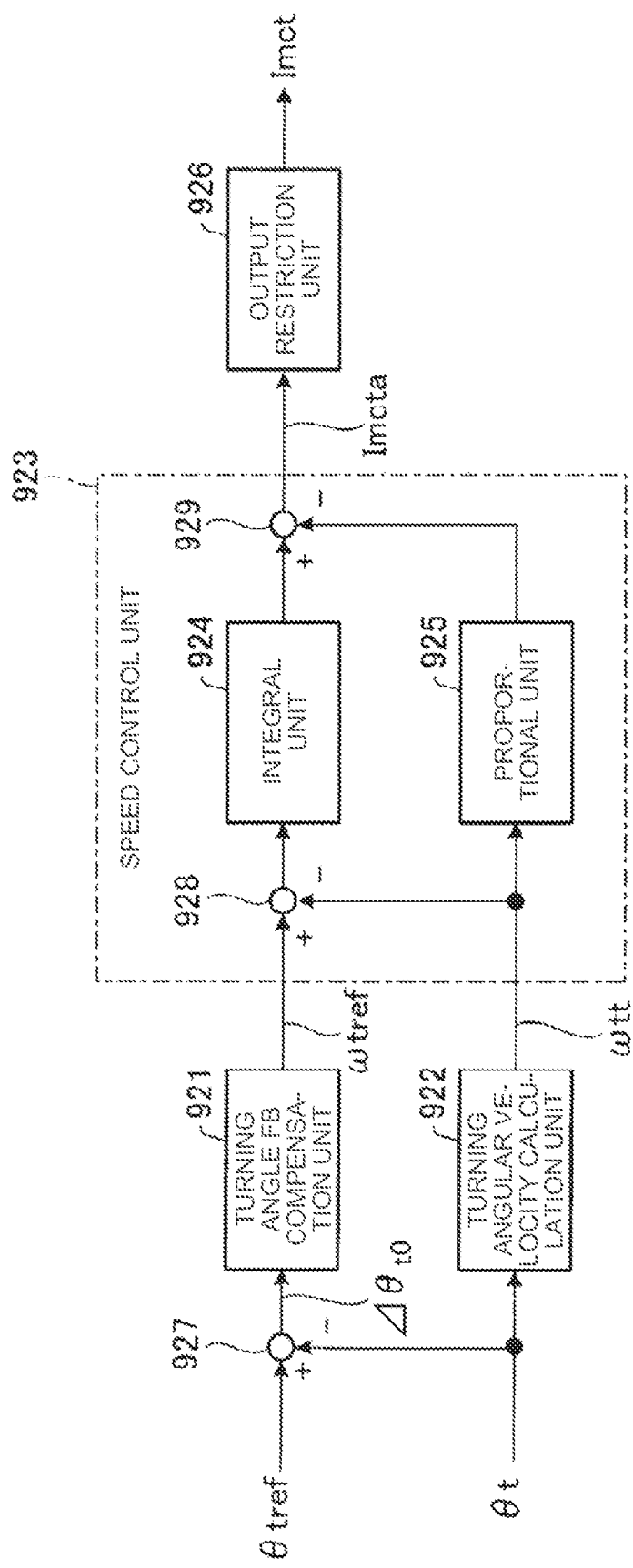
FIG. 48 is a block diagram illustrating an exemplary configuration of a turning angle control unit.

The turning angle control unit 920 will be described below with reference to FIG. 48. FIG. 48 is a block diagram illustrating an exemplary configuration of the turning angle control unit. The turning angle control unit 920 calculates the motor current command value Imct based on the target turning angle θtref and the turning angle θt of the steering wheels 8L and 8R. The turning angle control unit 920 includes a turning angle feedback (FB) compensation unit 921, a turning angular velocity calculation unit 922, a speed control unit 923, an output restriction unit 926, and a subtraction unit 927.

The target turning angle θtref output from the target turning angle generation unit 910 is input to the subtraction unit 927 through addition. The turning angle θt is input to the subtraction unit 927 through subtraction and also input to the turning angular velocity calculation unit 922. The turning angle FB compensation unit 921 multiplies a deviation Δθt0 between a target turning angular velocity ωtref and the turning angle θt, which is calculated at the subtraction unit 927, by the compensation value CFB (transfer function) and outputs the target turning angular velocity ωtref with which the turning angle θt follows the target turning angle θtref. The compensation value CFB may be a simple gain Kpp, or a typically used compensation value such as a PI control compensation value. The target turning angular velocity ωtref is input to the speed control unit 923. With the turning angle FB compensation unit 921 and the speed control unit 923, it is possible to cause the target turning angle θtref to follow the turning angle θt, thereby achieving desired torque.

The turning angular velocity calculation unit 922 calculates a turning angular velocity ωtt by performing differential arithmetic processing on the turning angle θt. The turning angular velocity ωtt is output to the speed control unit 923. The speed control unit 923 may perform, as differential calculation, pseudo differentiation with a HPF and a gain. In addition, the speed control unit 923 may calculate the turning angular velocity ωtt by another means or not from the turning angle θt and may output the calculated turning angular velocity ωtt to the speed control unit 923. The speed control unit 923 calculates, by I-P control (proportional processing PI control), a motor current command value Imcta with which the turning angular velocity ωtt follows the target turning angular velocity ωtref. Note that, the speed control unit 923 may calculate the motor current command value Imcta not by I-P control but by a typically used control method such as PI control, P (proportional) control, PID (proportional-integral-differential) control, PI-D control (differential processing PID control), model matching control, or model reference control. A subtraction unit 928 calculates a difference (ωtref−ωtt) between the target turning angular velocity ωtref and the turning angular velocity ωtt. An integral unit 924 integrates the difference (ωtref−ωtt) between the target turning angular velocity ωtref and the turning angular velocity ωtt and inputs a result of the integration to a subtraction unit 929 through addition. The turning angular velocity ωtt is also output to a proportional unit 925. The proportional unit 925 performs proportional processing on the turning angular velocity ωtt and outputs a result of the proportional processing to the output restriction unit 926 as the motor current command value Imcta. The upper and lower limit values of the motor current command value Imcta are set to the output restriction unit 926 in advance. The output restriction unit 926 outputs the motor current command value Imct with restriction on the upper and lower limit values of the motor current command value Imcta.

Figure 49:
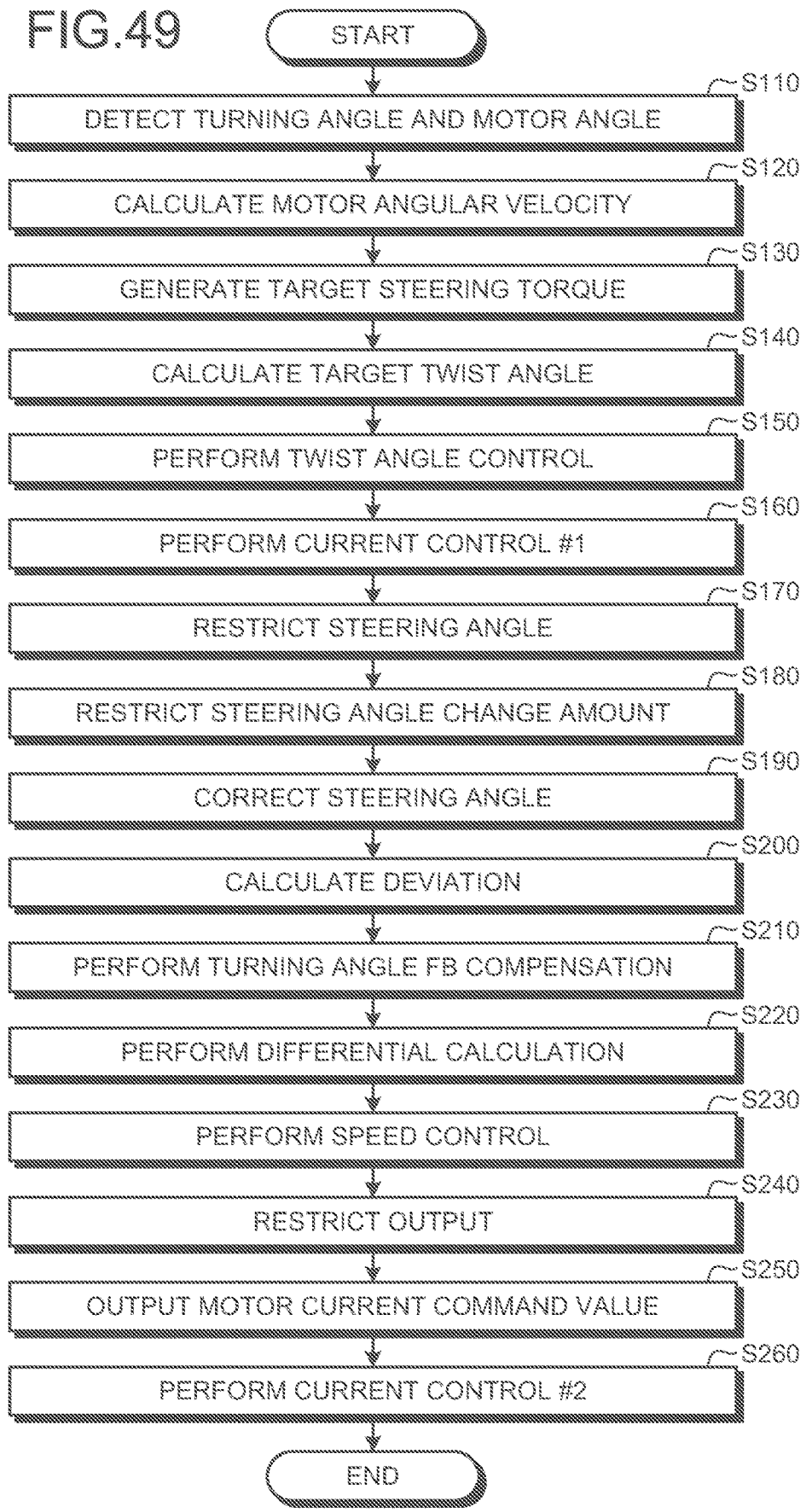
FIG. 49 is a flowchart illustrating exemplary operation of the first embodiment.

Note that, the configuration of the turning angle control unit 920 in the present embodiment is exemplary and may be different from the configuration illustrated in FIG. 10. Exemplary operation of the first embodiment in such a configuration will be described below with reference to a flowchart in FIG. 49. FIG. 49 is a flowchart illustrating the exemplary operation of the first embodiment.

Once the operation is started, the angle sensor 73 detects the turning angle θt and the angle sensor 74 detects the motor angle θm (step S110), and the turning angle θt and the motor angle θm are input to the turning angle control unit 920 and the angular velocity calculation unit 951, respectively. The angular velocity calculation unit 951 calculates the motor angular velocity ωm by differentiating the motor angle θm and outputs the calculated motor angular velocity ωm to the twist angle control unit 300 (step S120). Thereafter, the target steering torque generation unit 200 generates the target steering torque Tref (step S130), the conversion unit 500 converts the target steering torque Tref generated at the target steering torque generation unit 200 into the target twist angle Δθref (step S140), and the twist angle control unit 300 calculates the motor current command value Imc based on the target twist angle Δθref, the twist angle Δθ, and the motor angular velocity ωm (step S150). Then, the current control unit 130 performs current control based on the motor current command value Imc output from the twist angle control unit 300 to drive a motor 20 (step S160).

Meanwhile, in the turning angle control, the target turning angle generation unit 910 receives the steering angle θh, and the steering angle θh is input to the restriction unit 931. The restriction unit 931 restricts the upper and lower limit values of the steering angle θh to upper and lower limit values set in advance (step S170) and outputs the steering angle θh as the steering angle θh1 to the rate restriction unit 932. The rate restriction unit 932 restricts the change amount of the steering angle θh1 based on a restriction value set in advance (step S180) and outputs the steering angle θh1 as the steering angle θh2 to the correction unit 933. The correction unit 933 obtains the target turning angle θtref by correcting the steering angle θh2 (step S190) and outputs the target turning angle θtref to the turning angle control unit 920. Having received the turning angle θt and the target turning angle θtref, the turning angle control unit 920 calculates the deviation Δθt0 by subtracting the turning angle θt from the target turning angle θtref at the subtraction unit 927 (step S200). The deviation Δθt0 is input to the turning angle FB compensation unit 921, and the turning angle FB compensation unit 921 compensates the deviation Δθt0 by multiplying the deviation Δθt0 by a compensation value (step S210) and outputs the target turning angular velocity ωtref to the speed control unit 923. The turning angular velocity calculation unit 922 receives the turning angle θt, calculates the turning angular velocity ωtt through differential calculation on the turning angle θt (step S220), and outputs the turning angular velocity ωtt to the speed control unit 923. Similarly to the speed control unit 330, the speed control unit 923 calculates the motor current command value Imcta by I-P control (step S230) and outputs the motor current command value Imcta to the output restriction unit 926. The output restriction unit 926 restricts the upper and lower limit values of the motor current command value Imcta to upper and lower limit values set in advance (step S240) and outputs the motor current command value Imcta as the motor current command value Imct (step S250). The motor current command value Imct is input to the current control unit 930, and the current control unit 930 performs current control by driving the drive motor 71 based on the motor current command value Imct and the current value Imd of the drive motor 71 detected by the motor current detector 940 (step S260).

Note that, the order of data input, calculation, and the like in FIG. 49 may be changed as appropriate. In addition, following control at the turning angle control unit 920 may be performed in a typically used control structure. The turning angle control unit 920 is not limited to a control configuration used for a vehicle device but may have any control configuration with which a real angle (in this example, the turning angle θt) follows a target angle (in this example, the target turning angle θtref), and for example, may have a control configuration used for an industrial positioning device, an industrial robot, or the like. In addition, in the present embodiment, one ECU 50 controls the reaction force device 60 and the drive device 70 as illustrated in FIG. 1, but an ECU for the reaction force device 60 and an ECU for the drive device 70 may be provided, individually. In this case, the ECUs perform data transmission and reception through communication.

Figure 50:
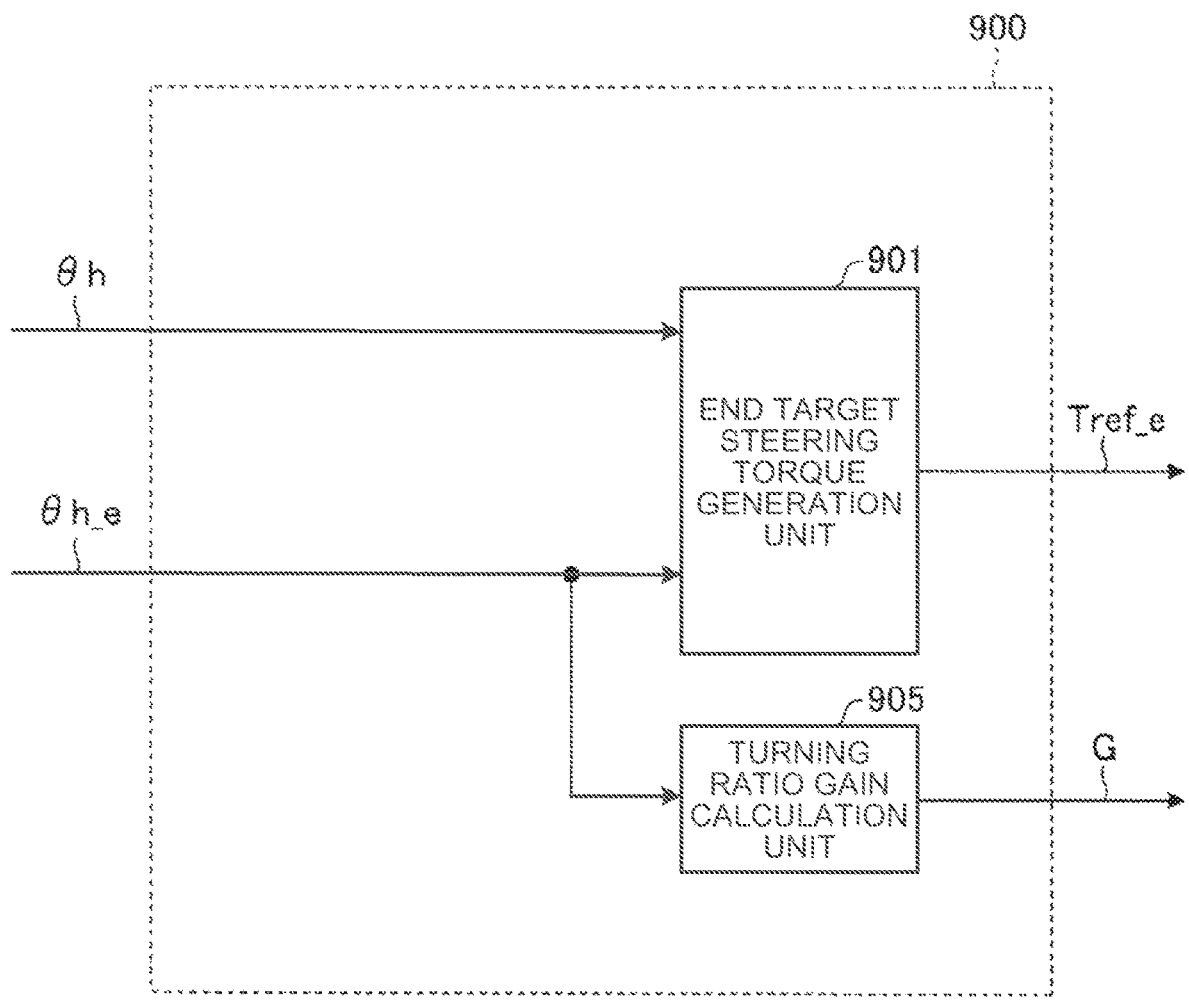
FIG. 50 is a block diagram illustrating an exemplary configuration of a steering end control unit according to the first embodiment.

FIG. 50 is a block diagram illustrating an exemplary configuration of the steering end control unit according to the first embodiment. As illustrated in FIG. 50, the steering end control unit 900 includes an end target steering torque generation unit 901 and a turning ratio gain calculation unit 905.

The steering angle θh and an end steering angle θh_e is input to the steering end control unit 900 according to the first embodiment. In the present embodiment, a steering angle corresponding to a maximum turning angle θt_max is set as the end steering angle θh_e. The maximum turning angle θt_max indicates a structurally determined maximum operation angle of a mechanical tire angle in the turning mechanism including the drive device 70, or a value set to be slightly smaller than the maximum operation angle with control error taken into account. For example, the end steering angle θh_e may be stored in the EEPROM 1004 or the like of the control computer 1100 configured as the control unit 50, or may be held by the steering end control unit 900.

The end target steering torque generation unit 901 generates, based on the steering angle θh and the end steering angle θh_e, the torque signal Tref_e for restricting an operation of the wheel 1 by the driver, and outputs the generated torque signal Tref_e. The torque signal Tref_e in the present embodiment corresponds to a "first torque signal" of the present disclosure. The turning ratio gain calculation unit 905 calculates, based on the end steering angle θh_e, the turning ratio gain G applied to the target turning angle generation unit 910 described above, and outputs the calculated turning ratio gain G.

Figure 51:
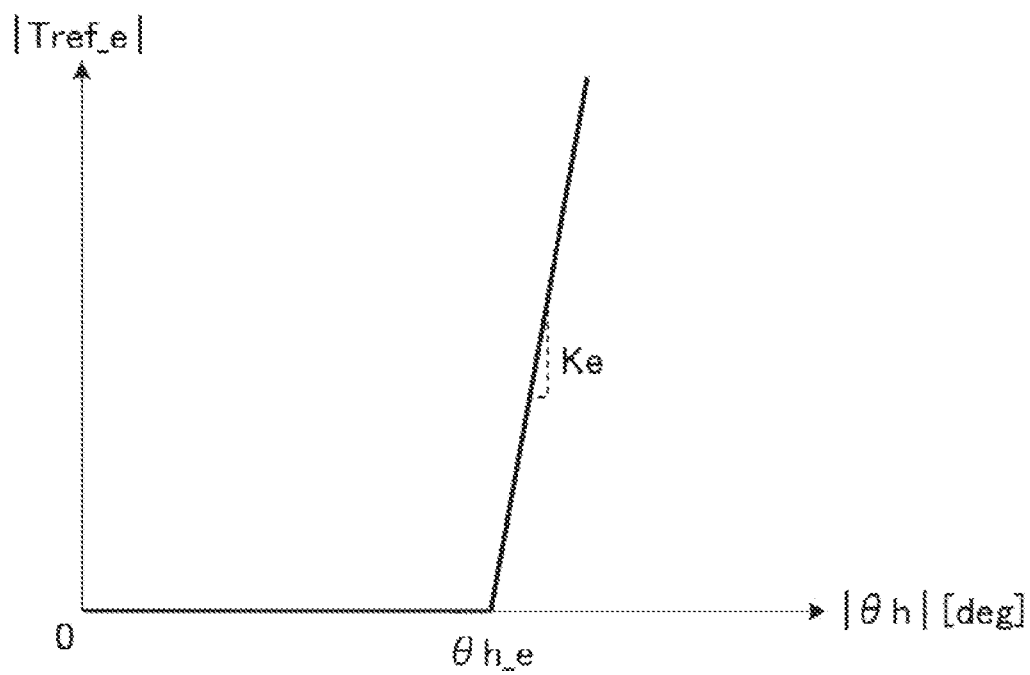
FIG. 51 is a diagram illustrating an exemplary torque signal Tref_e output from an end target steering torque generation unit according to the first embodiment.
Figure 52:
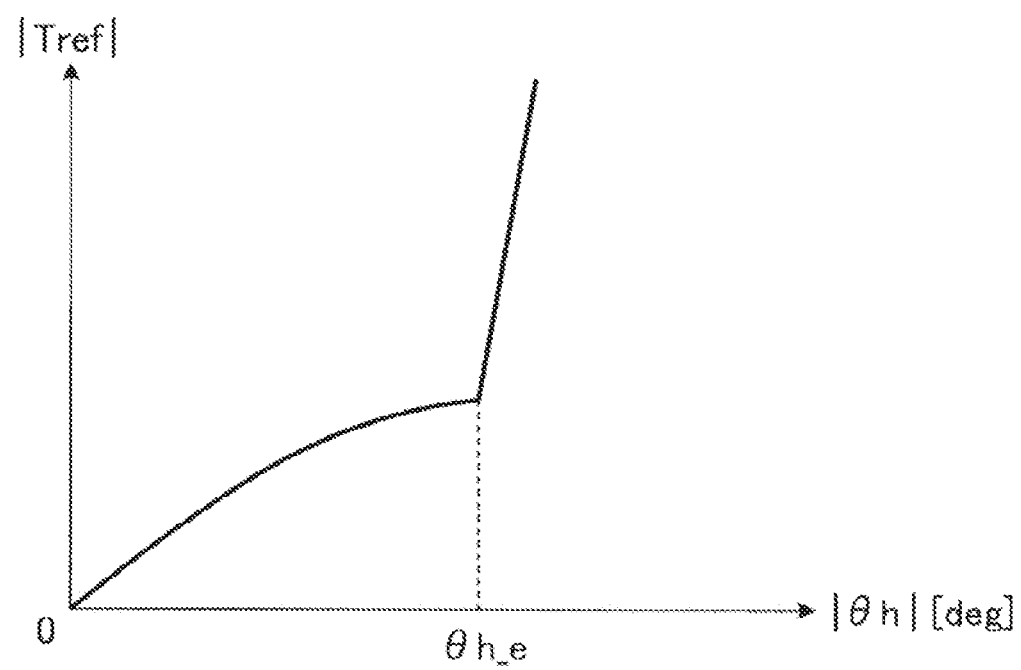
FIG. 52 is a diagram illustrating an exemplary target steering torque Tref output from the target steering torque generation unit in the first embodiment.

Specific operation of the steering end control unit 900 according to the first embodiment will be described below with reference to FIGS. 50 to 52. FIG. 51 is a diagram illustrating an exemplary torque signal Tref_e output from the end target steering torque generation unit according to the first embodiment. FIG. 52 is a diagram illustrating an exemplary target steering torque Tref output from the target steering torque generation unit in the first embodiment. In FIG. 51, the horizontal axis represents the absolute value |θh| of the steering angle θh, and the vertical axis represents the absolute value |Tref_e| of the torque signal Tref_e. In FIG. 14, the horizontal axis represents the absolute value

|θh| of the steering angle θh, and the vertical axis represents the absolute value |Tref| of the target steering torque Tref.

As illustrated in FIG. 51, the torque signal Tref_e (first torque signal) has such a characteristic that the torque signal Tref_e increases from zero at a predetermined change rate in a region in which the absolute value |θh| of the steering angle θh is equal to or larger than the end steering angle θh_e. In addition, the change rate of the torque signal Tref_e (first torque signal) in a region in which the absolute value |θh| of the steering angle θh is equal to or larger than the end steering angle θh_e is larger than the maximum change rate of the torque signal Tref_a (second torque signal). In the present embodiment, the end target steering torque generation unit 901 calculates the torque signal Tref_e by using Expression (9) below.

$$Tref\_e = Ke \times \max(0, (|\theta h| - \theta h\_e)) \times \text{sign}(\theta h) \qquad (9)$$

In Expression (9) above, a coefficient Ke is a coefficient value that determines the gradient of the torque signal Tref_e in the region (refer to FIG. 51) in which the absolute value |θh| of the steering angle θh is equal to or larger than the end steering angle θh_e. As illustrated in FIG. 51, the absolute value |Tref_e| of the torque signal Tref_e is zero in a region in which the absolute value |θh| of the steering angle θh is smaller than the end steering angle θh_e. In addition, as illustrated in FIG. 51, the absolute value |Tref_e| of the torque signal Tref_e follows a straight line having the coefficient Ke as the gradient in the region in which the absolute value |θh| of the steering angle θh is equal to or larger than the end steering angle θh_e. As the value of the coefficient Ke is larger, the torque signal Tref_e more steeply rises in the region in which the absolute value |θh| of the steering angle θh is equal to or larger than the end steering angle θh_e.

The target steering torque generation unit 200 generates the target steering torque Tref by adding the torque signal Tref_b, the torque signal Tref_c, and the above-described torque signal Tref_e to the above-described torque signal Tref_a (second torque signal) (refer to FIG. 42). Accordingly, as illustrated in FIG. 52, the target steering torque Tref is generated that steeply rises in the region in which the absolute value |θh| of the steering angle θh is equal to or larger than the end steering angle θh_e. The vehicle steering device (SBW system) according to the present embodiment controls the reaction force motor 61 by applying the target steering torque Tref, and accordingly, reaction force that the driver receives from the wheel 1 in the region in which the absolute value |θh| of the steering angle θh is equal to or larger than the end steering angle θh_e becomes large, thereby restricting an operation of the wheel 1 by the driver. In addition, in the present embodiment, the turning ratio gain calculation unit 905 calculates the turning ratio gain G by using Expression (10) below.

$$G = (\theta t\_\max / Kt) / \theta h\_e \qquad (10)$$

In Expression (10) above, the coefficient Kt is a reference value (tire-angle/steering-angle basic converted gain; hereinafter also simply referred to as a "basic converted gain") of the turning ratio gain G. The basic converted gain Kt represents a basic ratio of the change amount of the turning angle θt of the tires relative to the steering angle θh that is an operation amount of the wheel. For example, when the steering angle is 360 [deg], in the case that the turning angle θt of the tires is 30 [deg], Kt=30/360=1/12. Specifically, for example, when the turning ratio gain G is constant at G=1 in a region in which the vehicle speed Vs of the vehicle is equal to or higher than 30 [km/h], the change amount of the turning angle θt relative to the operation amount of the steering angle θh changes at the basic converted gain Kt. In addition, for example, when the turning ratio gain G>1 holds in a region in which the vehicle speed Vs of the vehicle is lower than 30 [km/h], the change amount of the turning angle θt relative to the operation amount of the steering angle θh changes at a ratio higher than the basic converted gain Kt.

As described above, the vehicle steering device (SBW system) according to the first embodiment includes the target steering torque generation unit 200 configured to generate the target steering torque Tref as a target value of torque, and the end target steering torque generation unit 901 configured to generate, based on the steering angle θh of the wheel 1 and the end steering angle θh_e corresponding to the maximum turning angle θt_max, the torque signal Tref_e (first torque signal) that is zero in a region in which the absolute value |θh| of the steering angle θh is smaller than the end steering angle θh_e and that linearly increases from zero at a predetermined gradient in the region in which the absolute value |θh| of the steering angle θh is equal to or larger than the end steering angle θh_e. The target steering torque generation unit 200 generates the target steering torque Tref by adding the torque signal Tref_e (first torque signal) to the torque signal Tref_a (second torque signal) that increases along a curve having a change rate gradually decreasing as at least the absolute value |θh| of the steering angle θh increases. Accordingly, in the region in which the absolute value |θh| of the steering angle θh is equal to or larger than the end steering angle θh_e, reaction force that the driver receives from the wheel 1 is large, which restricts an operation of the wheel 1 by the driver. In this manner, according to the present embodiment, it is possible to restrict an operation of the wheel 1 in accordance with the maximum turning angle θt_max.

Figure 53:
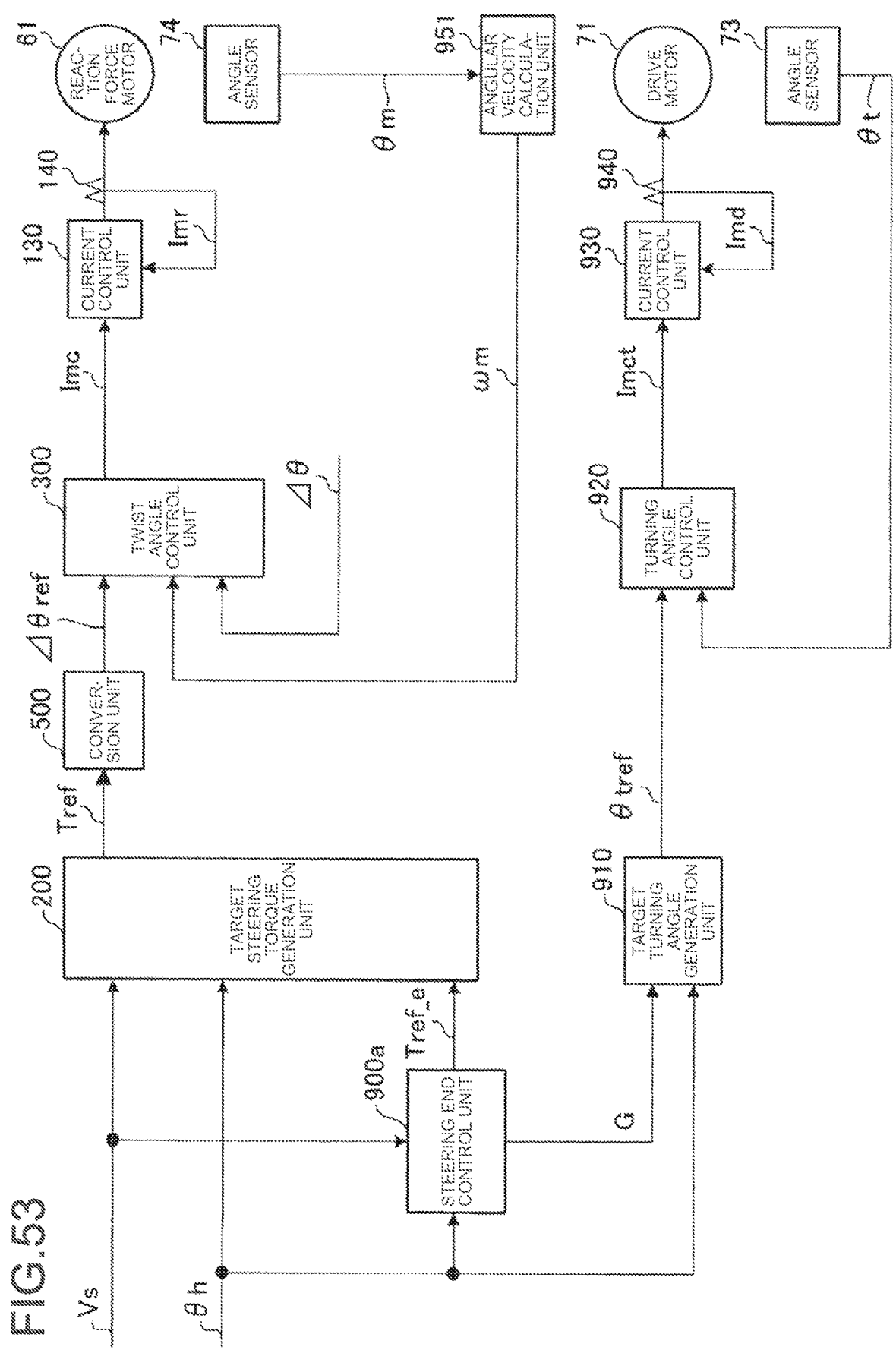
FIG. 53 is a diagram illustrating an exemplary internal block configuration of a control unit according to the second embodiment.
Figure 54:
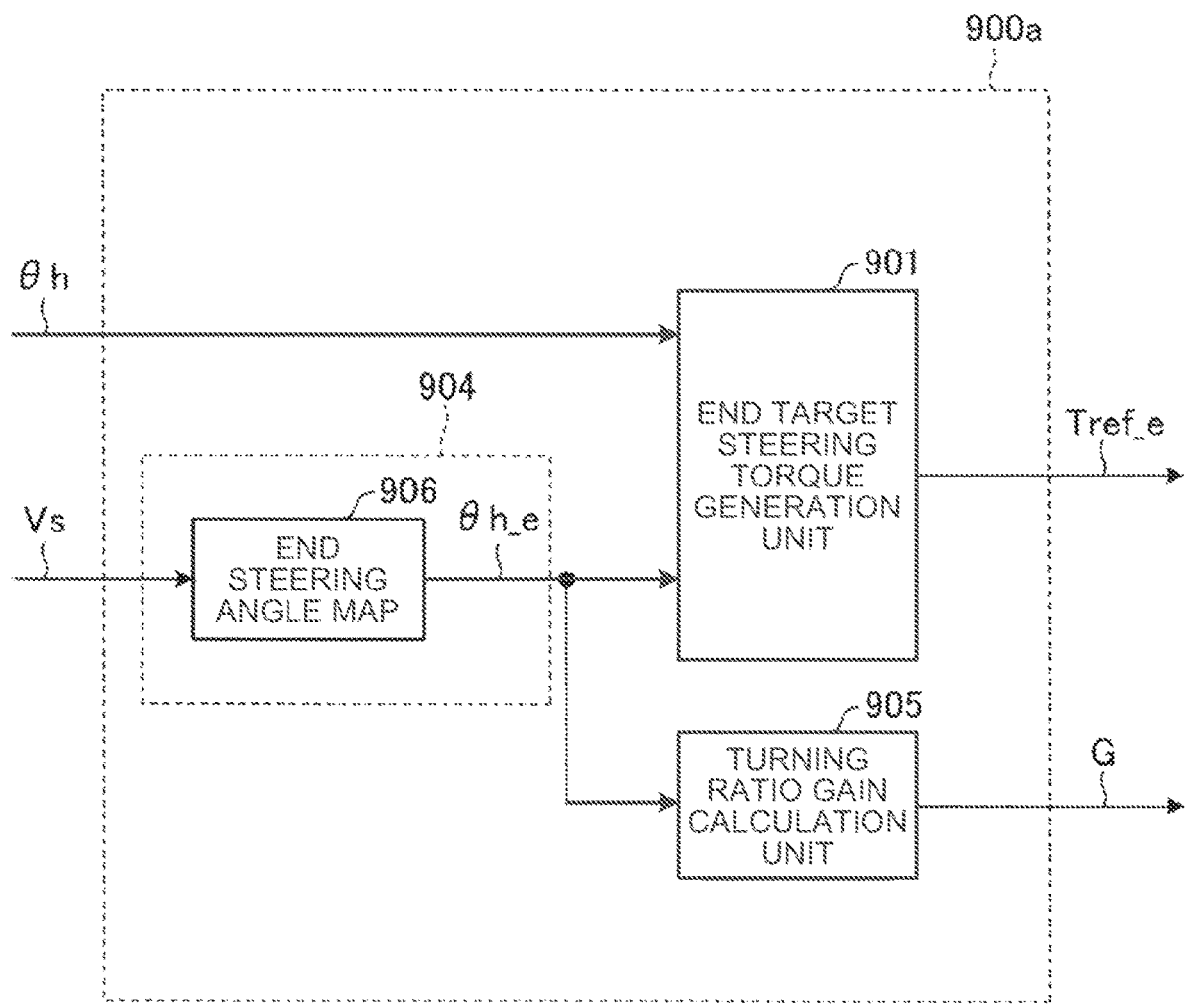
FIG. 54 is a block diagram illustrating an exemplary configuration of a steering end control unit according to the second embodiment.

(Second embodiment) FIG. 53 is a diagram illustrating an exemplary internal block configuration of a control unit according to a second embodiment. FIG. 54 is a block diagram illustrating an exemplary configuration of a steering end control unit according to the second embodiment. Note that, any component same as that of the configuration described above in the first embodiment is denoted by the same reference sign and duplicate description thereof is omitted.

As illustrated in FIG. 53, the vehicle speed Vs of the vehicle in addition to the steering angle θh is input to a steering end control unit 900a according to the second embodiment. In addition, as illustrated in FIG. 54, the steering end control unit 900a includes an end steering angle setting unit 904 in addition to the configuration of the first embodiment. The end steering angle setting unit 904 includes an end steering angle map 906. The end steering angle θh_e in accordance with the vehicle speed Vs of the vehicle is set to the end steering angle map 906. For example, the end steering angle map 906 may be stored in the EEPROM 1004 or the like of the control computer 1100 configured as the control unit 50 or may be held by the steering end control unit 900a. The vehicle speed Vs of the vehicle is input to the end steering angle setting unit 904 of the steering end control unit 900a according to the second embodiment. The end steering angle setting unit 904 outputs the end steering angle θh_e in accordance with the vehicle speed Vs based on the end steering angle map 906.

Figure 55:
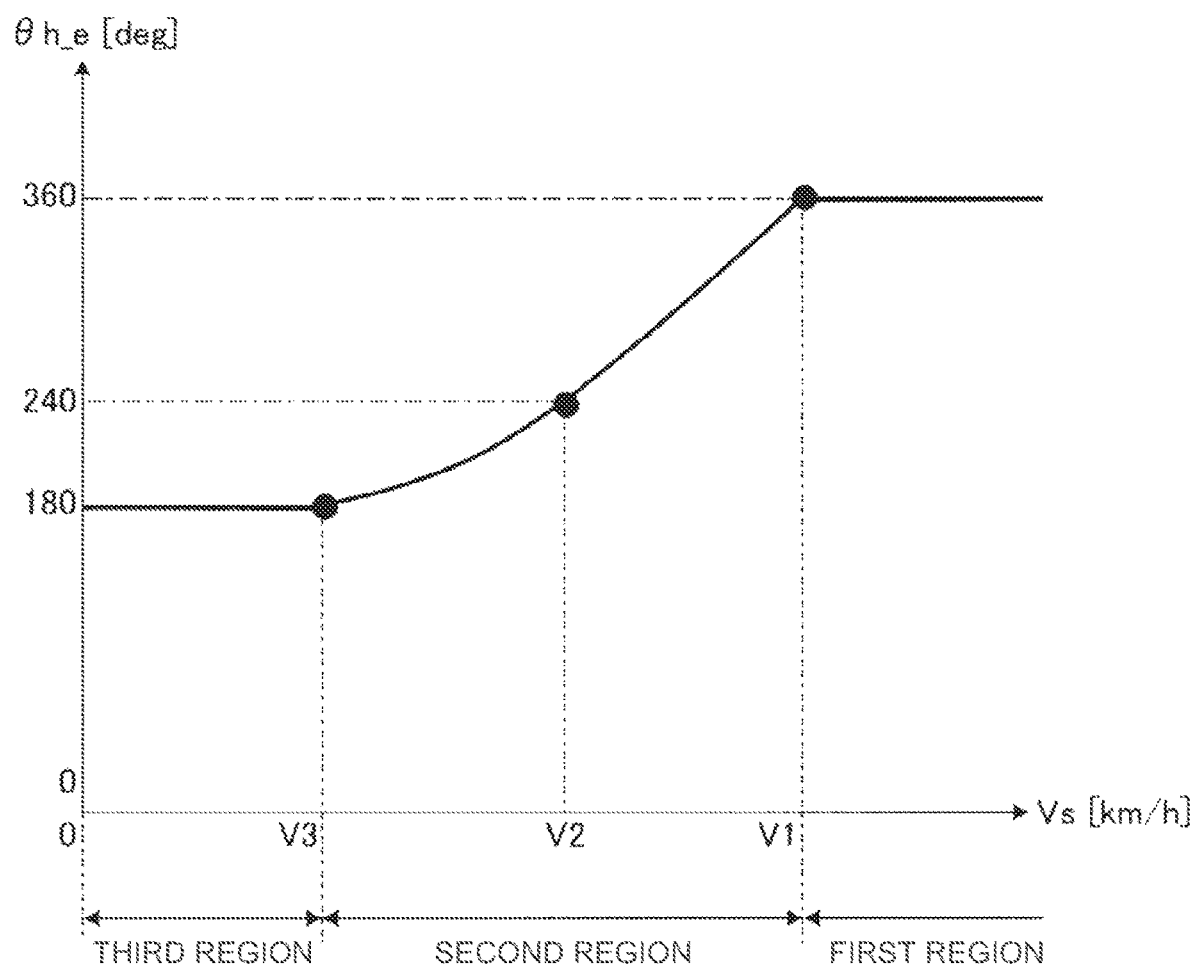
FIG. 55 is a diagram illustrating an exemplary end steering angle map according to the second embodiment.
Figure 56:
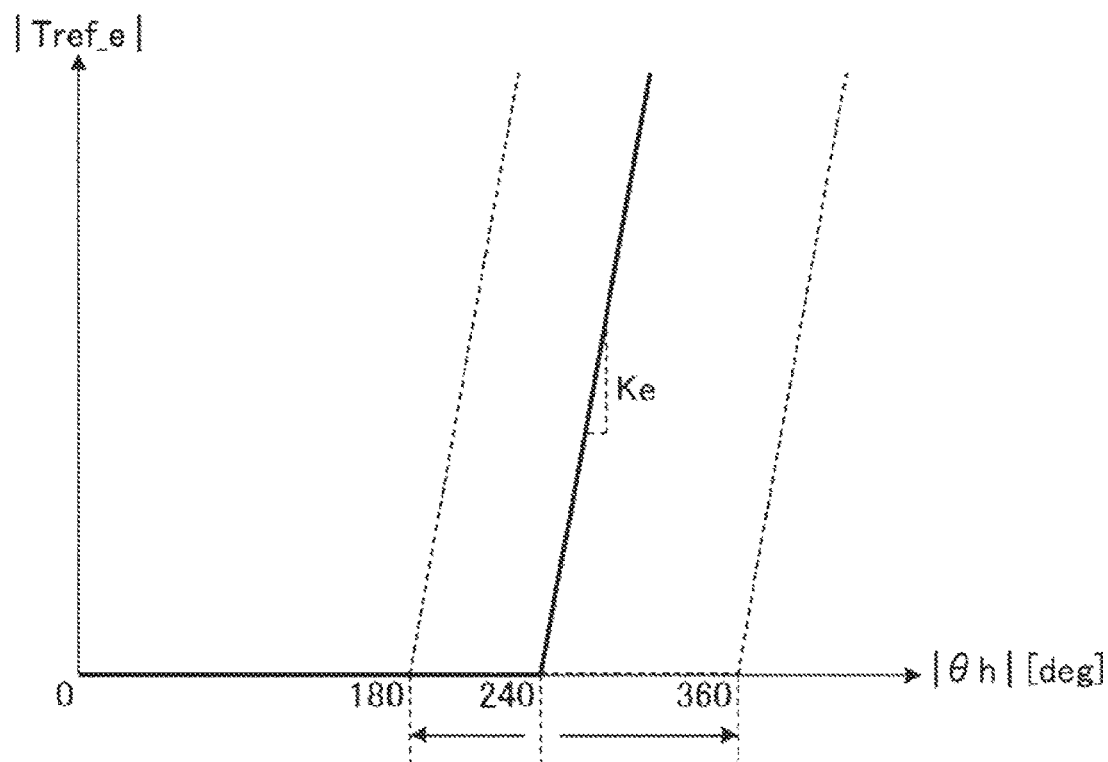
FIG. 56 is a diagram illustrating an exemplary torque signal Tref_e output from the end target steering torque generation unit according to the second embodiment.
Figure 57:
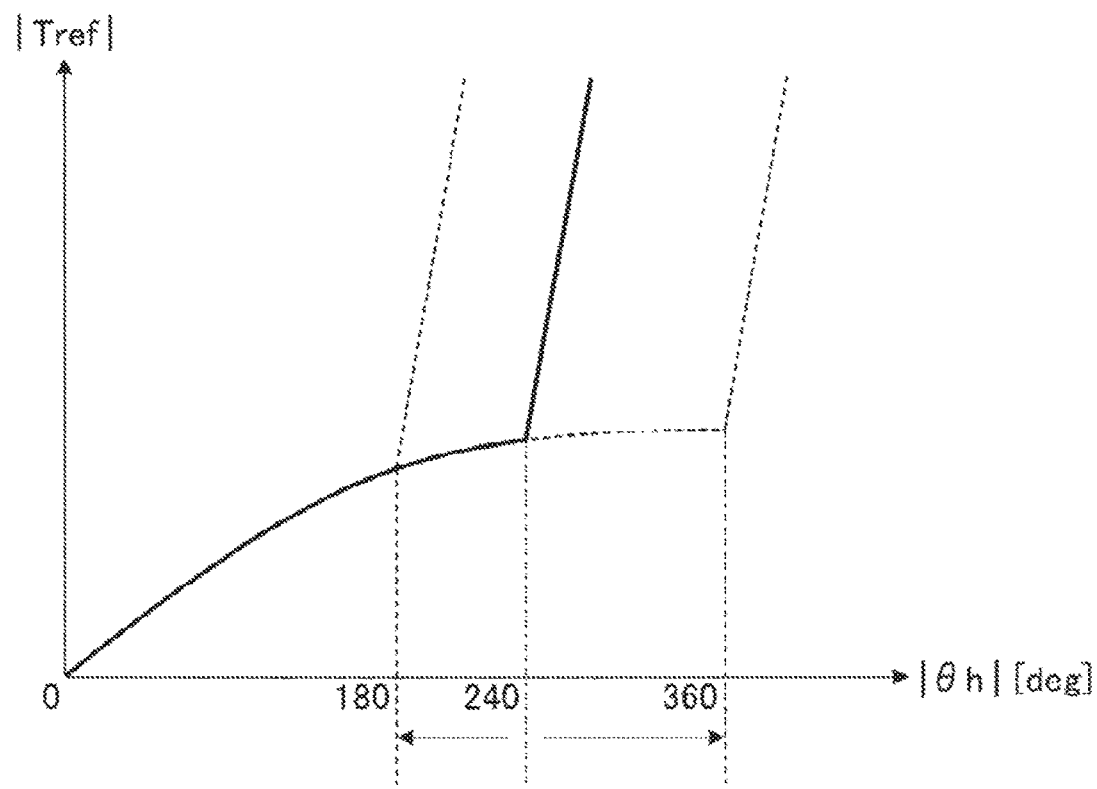
FIG. 57 is a diagram illustrating an exemplary target steering torque Tref output from the target steering torque generation unit in the second embodiment.

An example in which the basic converted gain Kt is set so that θt_max/Kt is 360 [deg] will be described below. FIG. 55 is a diagram illustrating an exemplary end steering angle map according to the second embodiment. In FIG. 55, the horizontal axis represents the vehicle speed Vs, and the vertical axis represents the end steering angle θh_e. FIG. 56 is a diagram illustrating an exemplary torque signal Tref_e output from the end target steering torque generation unit according to the second embodiment. FIG. 57 is a diagram illustrating an exemplary target steering torque Tref output from the target steering torque generation unit in the second embodiment. In FIG. 56, the horizontal axis represents the absolute value |θh| of the steering angle θh, and the vertical axis represents the absolute value |Tref_e| of the torque signal Tref_e. In FIG. 57, the horizontal axis represents the absolute value |θh| of the steering angle θh, and the vertical axis represents the absolute value |Tref| of the target steering torque Tref.

In the example illustrated in FIG. 55, a first region is defined to be a region in which the magnitude of the vehicle speed Vs is equal to or larger than a first vehicle speed V1, and the end steering angle θh_e in the first region is set to be the constant value of 360 [deg]. In addition, a second region is defined to be a region in which the magnitude of the vehicle speed Vs is equal to or larger than a third vehicle speed V3 lower than the first vehicle speed V1 and is smaller than the first vehicle speed V1, the end steering angle θh_e in the second region is set to be equal to or larger than 180 [deg] and smaller than 360 [deg] so that the end steering angle θh_e gradually decreases in a range from 360 [deg] to 180 [deg] as the magnitude of the vehicle speed Vs decreases. In addition, a third region is defined to be a region in which the magnitude of the vehicle speed Vs is equal to or larger than 0 [km/h] and smaller than the third vehicle speed V3, and the end steering angle θh_e in the third region is set to be the constant value of 180 [deg].

Note that, in the example illustrated in FIG. 55, the end steering angle θh_e when the magnitude of the vehicle speed Vs is a second vehicle speed V2 higher than the third vehicle speed V3 and lower than the first vehicle speed V1 is set to be 240 [deg]. In the example illustrated in FIG. 55, the third vehicle speed V3 may be set to be, for example, 10 [km/h], the second vehicle speed V2 may be set to be, for example, 20 [km/h], and the first vehicle speed V1 may be set to be, for example, 30 [km/h].

Figure 58:
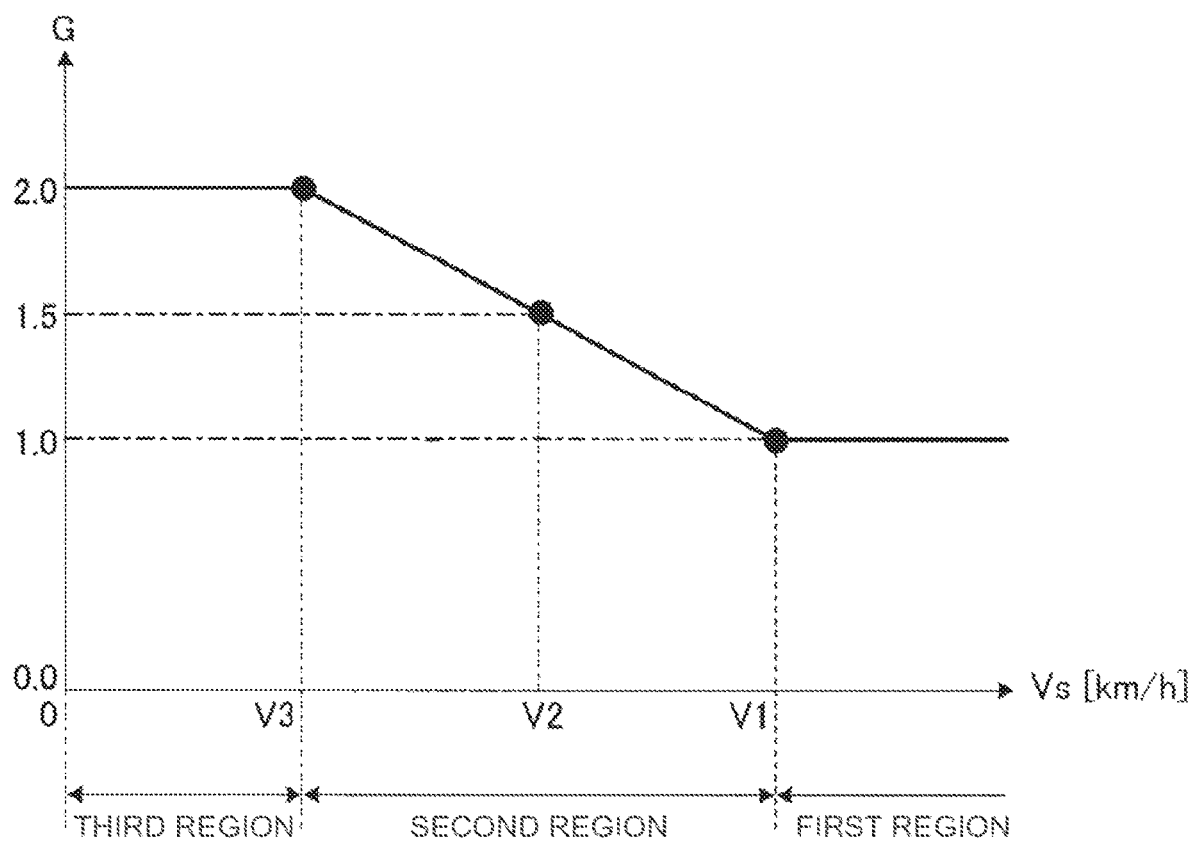
FIG. 58 is a diagram illustrating an exemplary turning ratio gain output from a turning ratio gain calculation unit in the example illustrated in FIG. 17.

Specific operation of the steering end control unit 900*a* according to the second embodiment will be described below with reference to FIGS. 54 to 58. FIG. 58 is a diagram illustrating an exemplary turning ratio gain output from the turning ratio gain calculation unit in the example illustrated in FIG. 55. In FIG. 58, the horizontal axis represents the vehicle speed Vs, and the vertical axis represents the turning ratio gain G.

In the present embodiment, specific operation of the end target steering torque generation unit 901 and the turning ratio gain calculation unit 905 is same as that in the first embodiment, but as illustrated in FIGS. 55 to 57, the value of the end steering angle θh_e is changed in accordance with the vehicle speed Vs, which is a difference. In addition, a change curve of the end steering angle θh_e has an aspect illustrated in FIG. 17, and thus as illustrated in FIG. 58, the turning ratio gain G in the first region has a constant value of "1.0", the turning ratio gain G in the third region has a constant value of "2.0", and the turning ratio gain G in the second region gradually decreases in a range from "2.0" to "1.0" as the magnitude of the vehicle speed Vs increases from the third vehicle speed V3. Note that, the examples illustrated in FIGS. 55 to 58 are exemplary, and that specific numerical values of the third vehicle speed V3, the second vehicle speed V2, and the first vehicle speed V1, a specific numerical value of the end steering angle θh_e, and a specific numerical value of the turning ratio gain G are not limited thereto.

As described above, in a high-speed range, in which the magnitude of the vehicle speed Vs is equal to or larger than the first vehicle speed V1, in other words, in the first region, the turning ratio gain G can be set to be the constant value of "1.0" by setting the end steering angle θh_e to be the constant value of 360 [deg]. Accordingly, it is possible to stabilize behavior of the vehicle in the high-speed range. In addition, in a low-speed range, in which the magnitude of the vehicle speed Vs is equal to or larger than zero and smaller than the third vehicle speed V3, in other words, in the third region, the turning ratio gain G can be set to be the constant value of "2.0" by setting the end steering angle θh_e to be the constant value of 180 [deg]. Accordingly, it is possible to stabilize behavior of the vehicle in the low-speed range and stably travel on a cross road, a crank-shaped road, or any other road. In addition, in an intermediate-speed range, in which the magnitude of the vehicle speed Vs is equal to or larger than the third vehicle speed V3 and smaller than the first vehicle speed V1, in other words, in the second region, the turning ratio gain G can be set to gradually decrease in a range from "2.0" to "1.0" as the magnitude of the vehicle speed Vs increases from the third vehicle speed V3 by setting the end steering angle θh_e to gradually decrease in a range from 360 [deg] to 180 [deg] as the magnitude of the vehicle speed Vs decreases. Accordingly, it is possible to prevent abrupt change of the turning angle of the tires along with change of the vehicle speed Vs, thereby providing stable steering feeling.

As described above, in the present embodiment, the end steering angle setting unit 904 configured to set the end steering angle θh_e in accordance with at least the vehicle speed Vs of the vehicle, and the turning ratio gain calculation unit 905 configured to calculate, based on the end steering angle θh_e, the turning ratio gain G by which the steering angle θh is multiplied to generate the target turning angle of the tires are provided.

Specifically, when the first region is defined to be a region in which the vehicle speed Vs of the vehicle is equal to or higher than the first vehicle speed V1, the second region is defined to be a region in which the vehicle speed Vs of the vehicle is equal to or higher than the third vehicle speed V3 lower than the first vehicle speed V1 and lower than the first vehicle speed V1, and the third region is defined to be a region in which the vehicle speed Vs of the vehicle is equal to or higher than zero and lower than the third vehicle speed V3, the end steering angle setting unit 904 sets the end steering angle θh_e in the third region to be a value smaller than the end steering angle θh_e in the first region. In addition, the end steering angle θh_e in the first region is set to be a constant value (for example, 360 [deg]), the end steering angle in the third region is set to be a constant value (for example, 180 [deg]) different from the end steering angle θh_e in the first region, and the end steering angle θh_e in the second region is set to gradually decrease in a range from the end steering angle θh_e (for example, 360 [deg]) in the first region to the end steering angle θh_e (for example, 180 [deg]) in the third region. Accordingly, it is possible to change the turning ratio gain G in cooperation with the end steering angle θh_e in accordance with the vehicle speed Vs.

Specifically, in the high-speed range, in which the magnitude of the vehicle speed Vs is equal to or larger than the first vehicle speed V1, in other words, in the first region, the turning ratio gain G can be set to be the constant value of "1.0" by setting the end steering angle θh_e to be the constant value of 360 [deg]. In addition, in the low-speed range, in which the magnitude of the vehicle speed Vs is equal to or larger than zero and smaller than the third vehicle speed V3, in other words, in the third region, the turning ratio gain G can be set to be the constant value of "2.0" by setting the end steering angle θh_e to be the constant value of 180 [deg]. In addition, in the intermediate-speed range in which the magnitude of the vehicle speed Vs is equal to or larger than the third vehicle speed V3 and smaller than the first vehicle speed V1, in other words, in the second region, the turning ratio gain G can be set to gradually decrease in a range from "2.0" to "1.0" as the magnitude of the vehicle speed Vs increases from the third vehicle speed V3 by setting the end steering angle θh_e to gradually decrease in a range from 360 [deg] to 180 [deg] as the magnitude of the vehicle speed Vs decreases.

In this manner, according to the present embodiment, it is possible to restrict an operation of the wheel 1 to the steering angle in accordance with the vehicle speed Vs by changing the end steering angle θh_e corresponding to the maximum turning angle θt_max in accordance with the vehicle speed Vs, and it is possible to change the turning ratio gain G in cooperation with the end steering angle θh_e in accordance with the vehicle speed Vs, thereby contributing to improvement of traveling stability.

Figure 59:
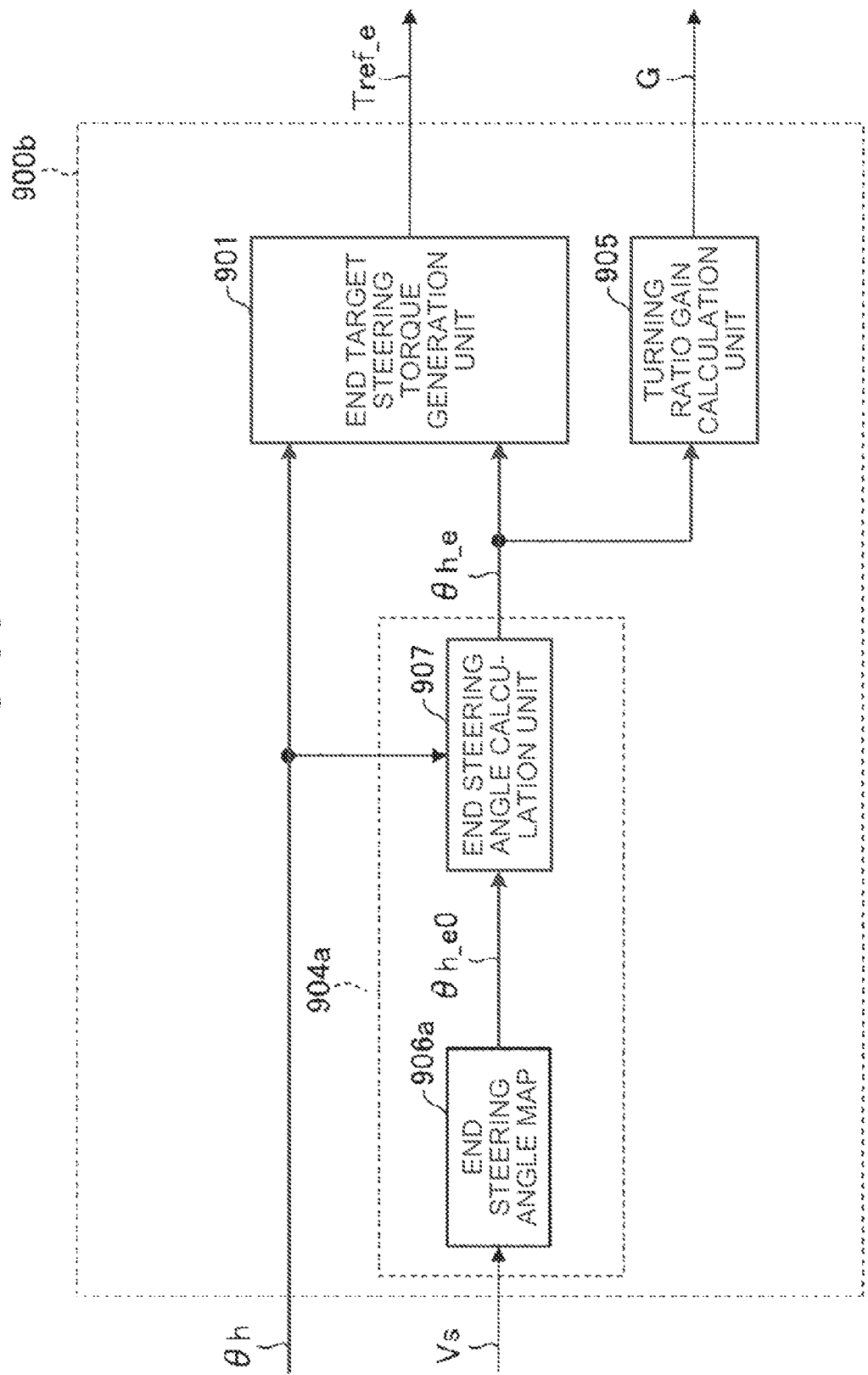
FIG. 59 is a block diagram illustrating an exemplary configuration of a steering end control unit according to the third embodiment.

(Third embodiment) FIG. 59 is a block diagram illustrating an exemplary configuration of a steering end control unit according to a third embodiment. Note that, any component same as that of the configurations described above in the first and second embodiments is denoted by the same reference sign and duplicate description thereof is omitted.

The configuration of a steering end control unit 900b according to the third embodiment is different from that in the second embodiment in that an end steering angle setting unit 904a includes an end steering angle calculation unit 907. An end steering angle map 906a is same as the end steering angle map 906 of the second embodiment in effect. A basic end steering angle θh_e0 in accordance with the vehicle speed Vs of the vehicle is set to the end steering angle map 906a. For example, the end steering angle map 906a may be stored in the EEPROM 1004 or the like of the control computer 1100 configured as the control unit 50 or may be held by the steering end control unit 900b. The end steering angle calculation unit 907 calculates the end steering angle θh_e based on the steering angle θh and the basic end steering angle θh_e0 and outputs the calculated end steering angle θh_e to the end target steering torque generation unit 901 and the turning ratio gain calculation unit 905.

Figure 60:
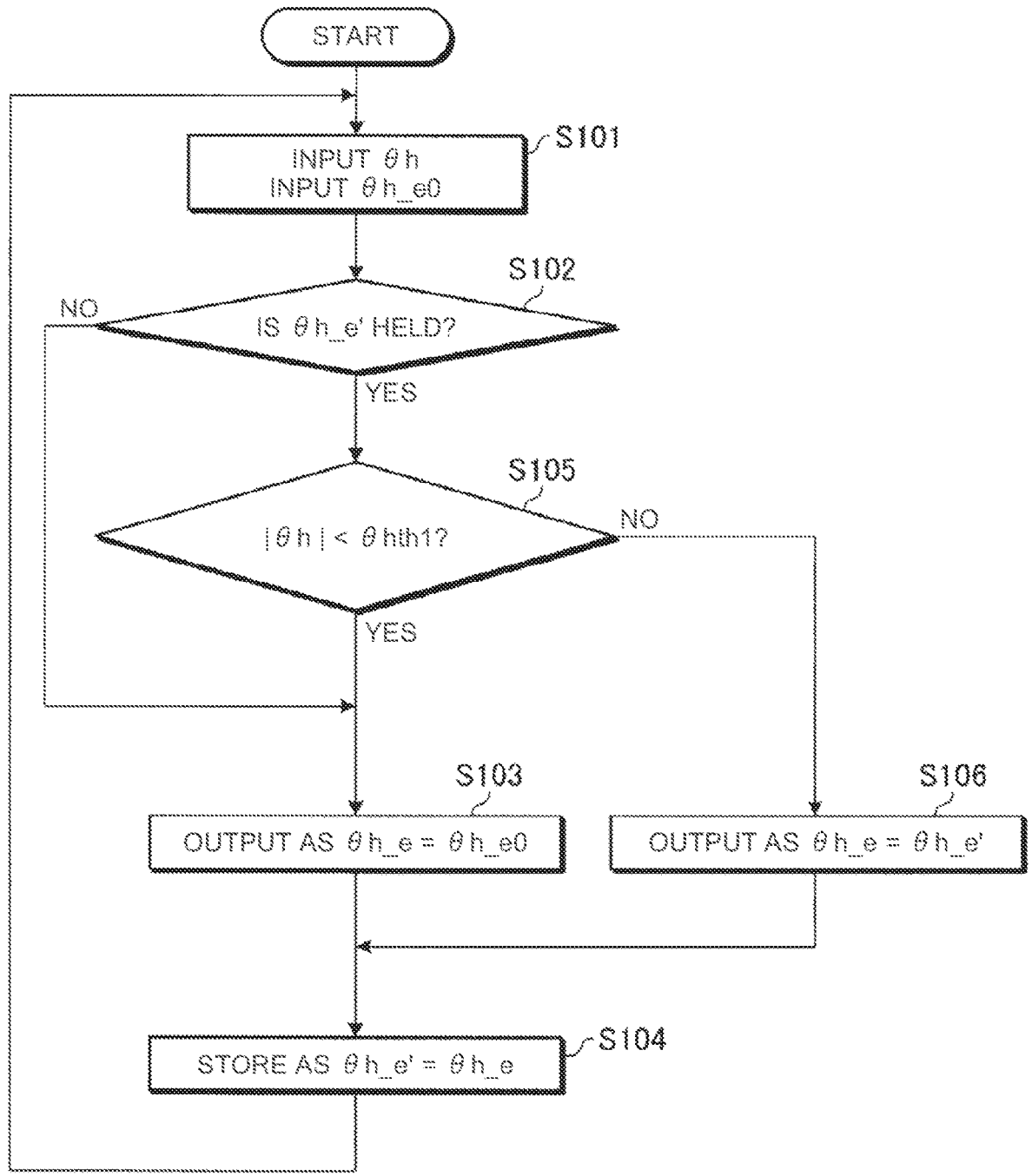
FIG. 60 is a flowchart illustrating first exemplary processing at an end steering angle calculation unit according to the third embodiment.

Processing at the end steering angle calculation unit 907 will be described below. FIG. 60 is a flowchart illustrating a first example of the processing at the end steering angle calculation unit according to the third embodiment. In the first example of the processing at the end steering angle calculation unit 907 according to the third embodiment, θh_e' represents the previous value of the end steering angle θh_e output from the end steering angle calculation unit 907.

When the steering angle θh and the basic end steering angle θh_e0 are input (step S101), the end steering angle calculation unit 907 determines whether the end steering angle calculation unit 907 holds the previous value θh_e' of the end steering angle θh_e (step S102). Note that, the previous value θh_e' of the end steering angle θh_e may be held by the end steering angle calculation unit 907 or may be held at, for example, the RAM 1003 or the EEPROM 1004 of the control computer 1100 configured as the control unit 50 and read at step S102. When the end steering angle calculation unit 907 does not hold the previous value θh_e' of the end steering angle θh_e (No at step S102), the end steering angle calculation unit 907 outputs the basic end steering angle θh_e0 as the end steering angle θh_e (step S103) and stores the end steering angle θh_e as the previous value θh_e' of the end steering angle θh_e (step S104). Thereafter, the process returns to the processing at step S101 and repeatedly performs the same processing. When the end steering angle calculation unit 907 holds the previous value θh_e' of the end steering angle θh_e (Yes at step S102), the end steering angle calculation unit 907 determines whether the absolute value |θh| of the steering angle θh is smaller than a predetermined first threshold value θhth1 (|θh|<θhth1) (step S105). The first threshold value θhth1 used for the determination at step S105 may be, for example, 180 [deg]. Note that, the first threshold value θhth1 used for the determination at step S105 is exemplary, and the present embodiment is not limited thereto.

When the absolute value |θh| of the steering angle θh is smaller than the first threshold value θhth1 (|θh|<θhth1) (Yes at step S105), the end steering angle calculation unit 907 outputs the basic end steering angle θh_e0 as the end steering angle θh_e (step S103) and stores the end steering angle θh_e as the previous value θh_e' of the end steering angle θh_e (step S104). Thereafter, the process returns to the processing at step S101 and repeatedly performs the same processing. When the absolute value |θh| of the steering angle θh is equal to or larger than the first threshold value θhth1 (|θh|≥θhth1) (No at step S105), the end steering angle calculation unit 907 outputs the previous value θh_e' of the end steering angle θh_e as the end steering angle θh_e (step S106) and stores the end steering angle θh_e as the previous value θh_e' of the end steering angle θh_e (step S104). Thereafter, the process returns to the processing at step S101 and repeatedly performs the same processing.

With processing in the first example of the processing at the end steering angle calculation unit 907 according to the third embodiment described above, change of the end steering angle θh_e is restricted when the absolute value |θh| of the steering angle θh is equal to or larger than the predetermined first threshold value θhth1 (|θh|≥θhth1). Accordingly, it is possible to prevent change of the turning angle of the tires due to change of the vehicle speed in a large rudder angle region in which the change ratio is relatively large, thereby reducing discomfort on steering feeling of the driver.

Figure 61:
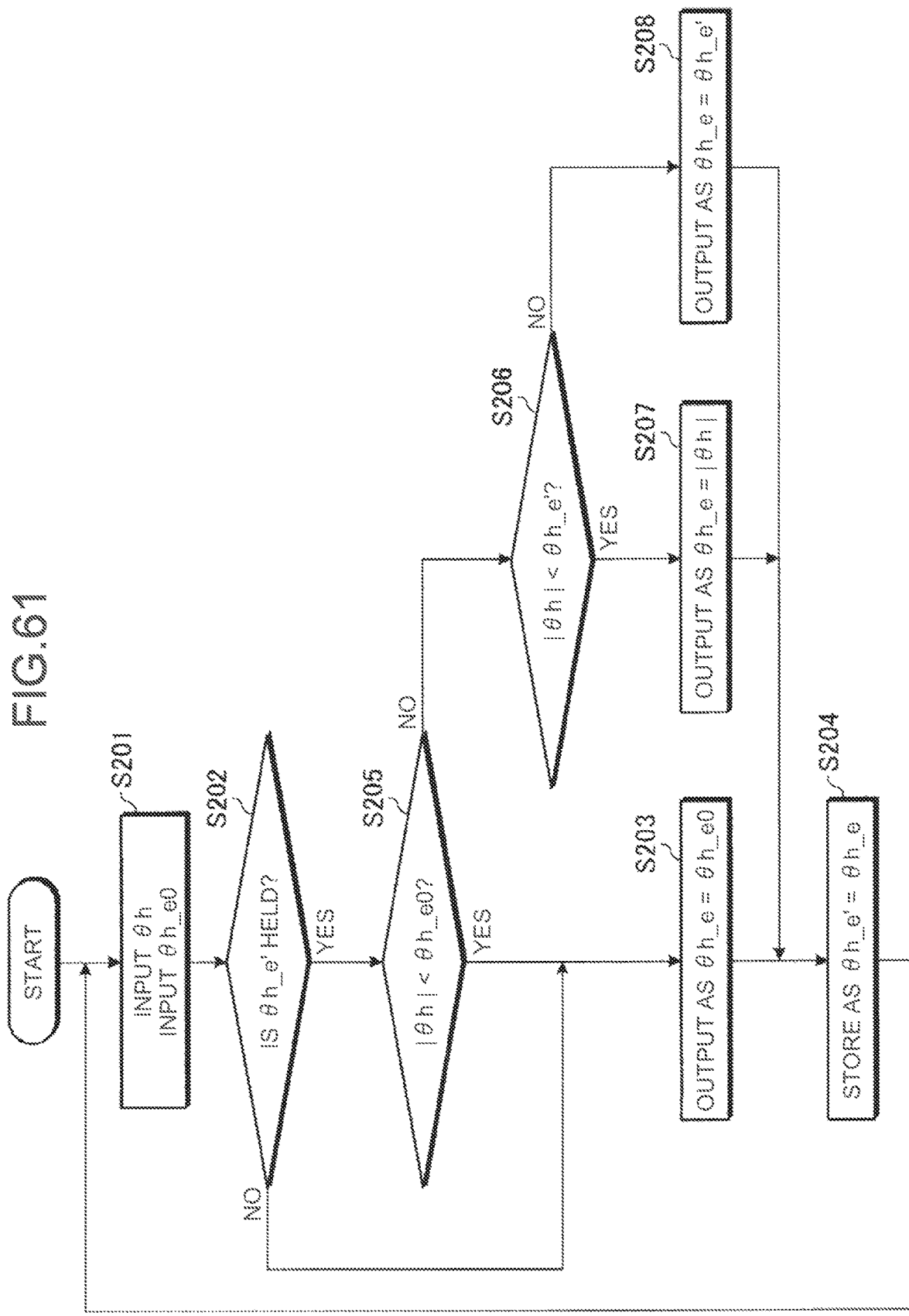
FIG. 61 is a flowchart illustrating second exemplary processing at the end steering angle calculation unit according to the third embodiment.

FIG. 61 is a flowchart illustrating a second example of the processing at the end steering angle calculation unit according to the third embodiment. In the second example of the processing at the end steering angle calculation unit 907 according to the third embodiment as well, similarly to the first example of the processing at the end steering angle calculation unit 907 according to the third embodiment, θh_e' represents the previous value of the end steering angle θh_e output from the end steering angle calculation unit 907. In the second example of the processing at the end steering angle calculation unit 907 according to the third embodiment illustrated in FIG. 61, processing at steps S201 to S204 is same as the processing at steps S101 to S104 in the first example of the processing at the end steering angle calculation unit 907 according to the third embodiment described above.

When the end steering angle calculation unit 907 holds the previous value θh_e' of the end steering angle θh_e (Yes at step S202), the end steering angle calculation unit 907 determines whether the absolute value |θh| of the steering angle θh is smaller than the basic end steering angle θh_e0 (|θh|<θh_e0) (step S205). When the absolute value |θh| of the steering angle θh is smaller than the basic end steering angle θh_e0 (|θh|<θh_e0) (Yes at step S205), the end steering angle calculation unit 907 outputs the basic end steering angle θh_e0 as the end steering angle θh_e (step S203) and stores the end steering angle θh_e as the previous value θh_e' of the end steering angle θh_e (step S204). Thereafter, the process returns to the processing at step S201 and repeatedly performs the same processing. When the absolute value |θh| of the steering angle θh is equal to or larger than the basic end steering angle θh_e0 (|θh|θh_e0) (No at step S205), the end steering angle calculation unit 907 determines whether the absolute value |θh| of the steering angle θh is smaller than the previous value θh_e' of the end steering angle θh_e (|θh|<θh_e') (step S206).

When the absolute value |θh| of the steering angle θh is smaller than the previous value θh_e' of the end steering angle θh_e (|θh|<θh_e') (Yes at step S206), the end steering angle calculation unit 907 outputs the absolute value |θh| of the steering angle θh as the end steering angle θh_e (step S207) and stores the end steering angle θh_e as the previous value θh_e' of the end steering angle θh_e (step S204). Thereafter, the process returns to the processing at step S201 and repeatedly performs the same processing. When the absolute value |θh| of the steering angle θh is equal to or larger than the previous value θh_e' of the end steering angle θh_e (|θh|θh_e') (No at step S206), the end steering angle calculation unit 907 outputs the previous value θh_e' of the end steering angle θh_e as the end steering angle θh_e (step S208) and stores the end steering angle θh_e as the previous value θh_e' of the end steering angle θh_e (step S204). Thereafter, the process returns to the processing at step S201 and repeatedly performs the same processing.

In the second embodiment described above, when the driver decelerates the vehicle speed Vs from 30 [km/h] to 10 [km/h] while keeping steering of the wheel 1 at the steering angle θh of 360 [deg] during operation with, for example, the end rudder angle map illustrated in FIG. 17 described in the second embodiment, the wheel 1 is pressed back to the steering angle θh of 180 [deg], which potentially provides discomfort to steering feeling of the driver. With processing in the second example of the processing at the end steering angle calculation unit 907 according to the third embodiment described above, change of the end steering angle θh_e is restricted in a region in which the absolute value |θh| of the steering angle θh is equal to or larger than the basic end steering angle θh_e0. Accordingly, it is possible to prevent change of the end steering angle along with change of the vehicle speed Vs, thereby reducing discomfort on steering feeling of the driver.

As described above, the vehicle steering device (SBW system) according to the third embodiment includes the end steering angle map 906 in which the basic end steering angle θh_e0 in accordance with the vehicle speed Vs of the vehicle is set, and the end steering angle calculation unit 907 configured to calculate the end steering angle θh_e based on the steering angle θh and the basic end steering angle θh_e0. Accordingly, it is possible to reduce discomfort on steering feeling of the driver due to variation of the vehicle speed Vs of the vehicle and the steering angle θh.

Figure 62:
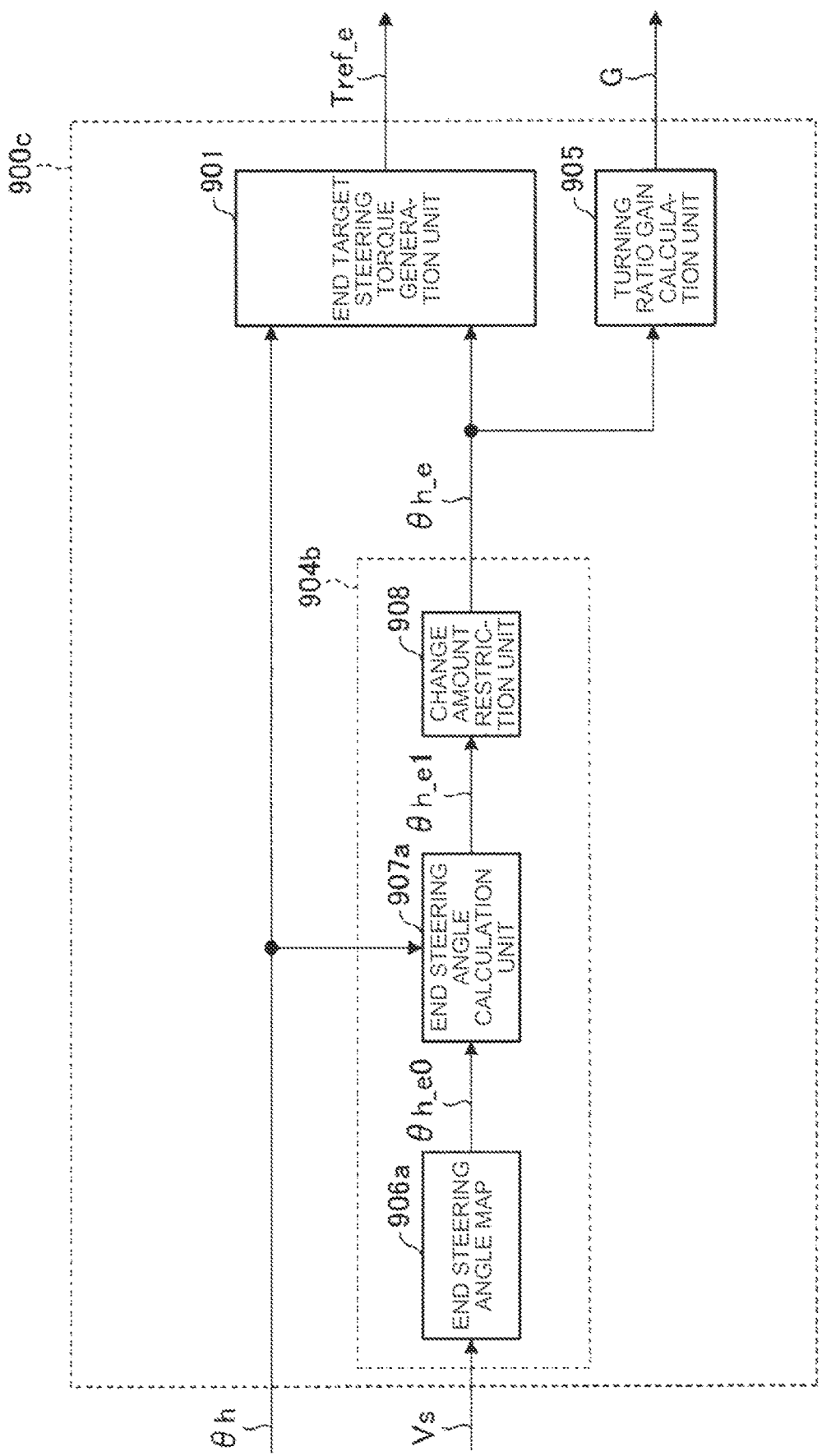
FIG. 62 is a block diagram illustrating an exemplary configuration of a steering end control unit according to a fourth embodiment.

(Fourth embodiment) FIG. 62 is a block diagram illustrating an exemplary configuration of a steering end control unit according to a fourth embodiment. Note that, any component same as that of the configurations described above in the first to third embodiments is denoted by the same reference sign and duplicate description thereof is omitted. The configuration of a steering end control unit 900c according to the fourth embodiment is different from that in the third embodiment in that an end steering angle setting unit 904b includes a change amount restriction unit 908.

The end steering angle map 906a is same as the end steering angle map 906 of the second embodiment in effect. The basic end steering angle θh_e0 in accordance with the vehicle speed Vs of the vehicle is set to the end steering angle map 906a. For example, the end steering angle map 906a may be stored in the EEPROM 1004 or the like of the control computer 1100 configured as the control unit 50 or may be held by the steering end control unit 900b. An end steering angle calculation unit 907a is same as the end steering angle calculation unit 907 of the third embodiment in effect. The end steering angle calculation unit 907a calculates an end steering angle θh_e1 based on the steering angle θh and the basic end steering angle θh_e0 and outputs the end steering angle θh_e1 to the change amount restriction unit 908. The change amount restriction unit 908 restricts the change amount of the end steering angle θh_e1 and outputs the end steering angle θh_e to the end target steering torque generation unit 901 and the turning ratio gain calculation unit 905.

Figure 63:
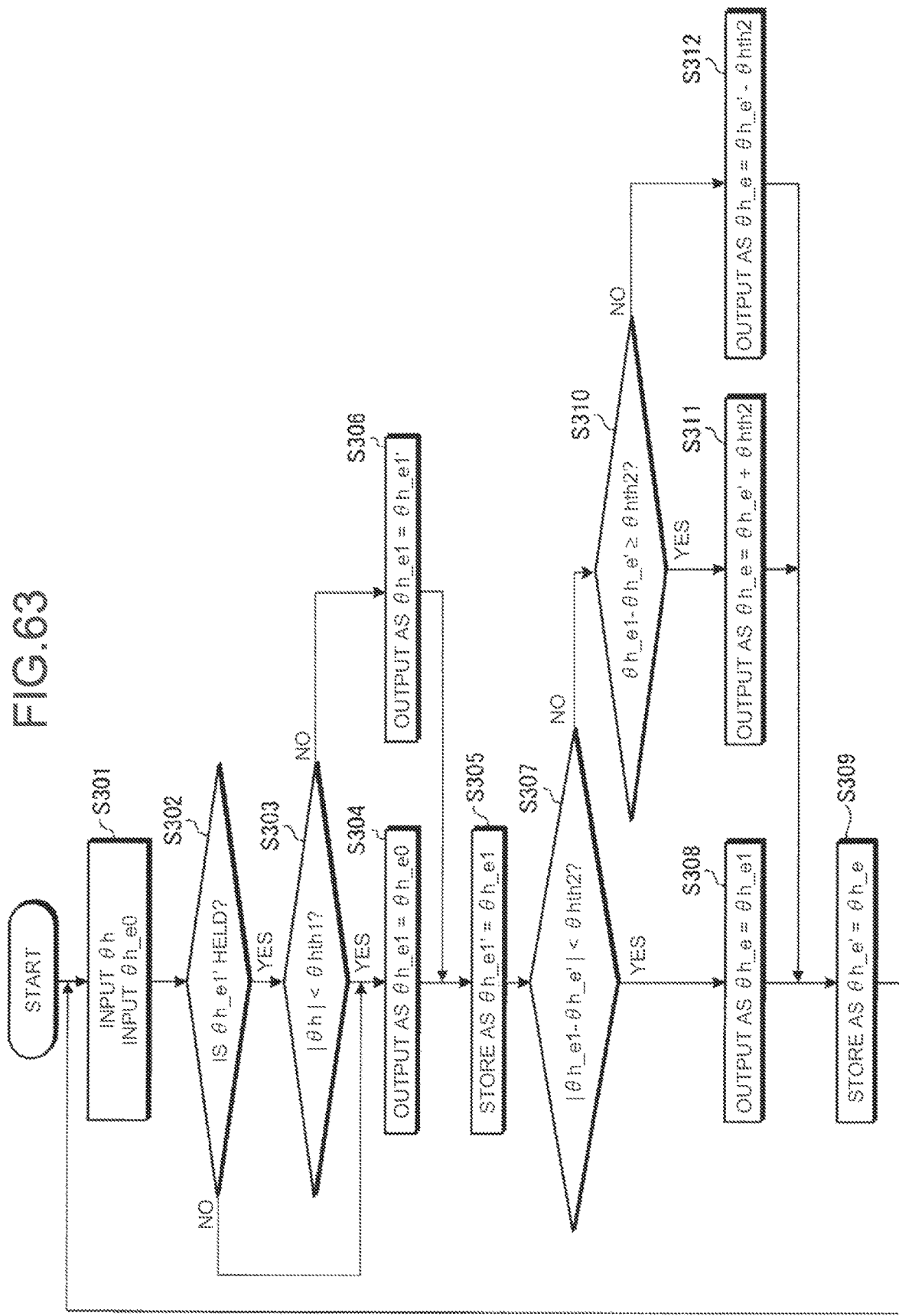
FIG. 63 is a flowchart illustrating first exemplary processing at an end steering angle calculation unit and a change amount restriction unit according to the fourth embodiment.

Processing at the end steering angle calculation unit 907a and the change amount restriction unit 908 will be described below. FIG. 63 is a flowchart illustrating a first example of the processing at the end steering angle calculation unit and the change amount restriction unit according to the fourth embodiment. In the first example of the processing at the end steering angle calculation unit 907a according to the fourth embodiment, θh_e1' represents the previous value of the end steering angle θh_e1 output from the end steering angle calculation unit 907a. In addition, θh_e' represents the previous value of the end steering angle θh_e output from the change amount restriction unit 908.

When the steering angle θh and the basic end steering angle θh_e0 are input (step S301), the end steering angle calculation unit 907a determines whether the end steering angle calculation unit 907a holds the previous value θh_e1' of the end steering angle θh_e1 (step S302). Note that, the previous value θh_e1' of the end steering angle θh_e1 may be held by the end steering angle calculation unit 907a or may be held at, for example, the RAM 1003 or the EEPROM 1004 of the control computer 1100 configured as the control unit 50 and read at step S302.

When the end steering angle calculation unit 907a does not hold the previous value θh_e1' of the end steering angle θh_e1 (No at step S302), the end steering angle calculation unit 907a outputs the basic end steering angle θh_e0 as the end steering angle θh_e1 (step S304) and stores the end steering angle θh_e1 as the previous value θh_e1' of the end steering angle θh_e1 (step S305).

When the end steering angle calculation unit 907a holds the previous value θh_e1' of the end steering angle θh_e1 (Yes at step S302), the end steering angle calculation unit 907a determines whether the absolute value |θh| of the steering angle θh is smaller than a predetermined first threshold value θhth1 (|θh|<θhth1) (step S303). The first threshold value θhth1 used for the determination at step S303 may be, for example, 180 [deg]. Note that, the first threshold value θhth1 used for the determination at step S303 is exemplary, and the present embodiment is not limited thereto.

When the absolute value |θh| of the steering angle θh is smaller than the first threshold value θhth1 (|θh|<θhth1) (Yes at step S303), the end steering angle calculation unit 907a outputs the basic end steering angle θh_e0 as the end steering angle θh_e1 (step S304) and stores the end steering angle θh_e1 as the previous value θh_e1' of the end steering angle θh_e1 (step S305). When the absolute value |θh| of the steering angle θh is equal to or larger than the first threshold value θhth1 (|θh|≥θhth1) (No at step S303), the end steering angle calculation unit 907a outputs the previous value θh_e1' of the end steering angle θh_e1 as the end steering angle θh_e1 (step S306) and stores the end steering angle θh_e1 as the previous value θh_e1' of the end steering angle θh_e1 (step S305).

When the end steering angle θh_e1 is input to the change amount restriction unit 908, the change amount restriction unit 908 determines whether the absolute value of the difference value between the input end steering angle θh_e1 and the previous value θh_e' of the end steering angle θh_e is smaller than a predetermined second threshold value θhth2 (|θh_e1−θh_e'|<θhth2) (step S307). The second threshold value θhth2 used for the determination at step S307 may be, for example, a value corresponding to 10 [deg/s]. Note that, the second threshold value θhth2 used for the determination at step S307 is exemplary, and the present embodiment is not limited thereto.

When the absolute value of the difference value between the end steering angle θh_e1 and the previous value θh_e' of the end steering angle θh_e is smaller than the second threshold value θhth2 (|θh_e1−θh_e'|<θhth2) (Yes at step S308), the change amount restriction unit 908 outputs a basic end steering angle θh_e1 as the end steering angle θh_e (step S308) and stores the end steering angle θh_e as the previous value θh_e' of the end steering angle θh_e (step S309). Thereafter, the process returns to the processing at step S301 and repeatedly performs the same processing. When the absolute value of the difference value between the end steering angle θh_e1 and the previous value θh_e' of the end steering angle θh_e is equal to or larger than the second threshold value θhth2 (|θh_e1−θh_e'|≥θhth2) (No at step S307), the change amount restriction unit 908 subsequently determines whether a value obtained by subtracting the previous value θh_e' of the end steering angle θh_e from the end steering angle θh_e1 is equal to or larger than the second threshold value θhth2 (θh_e1−θh_e'≥θhth2) (step S310).

When the absolute value of the difference value between the end steering angle θh_e1 and the previous value θh_e' of the end steering angle θh_e is equal to or larger than the second threshold value θhth2 (|θh_e1−θh_e'|≥θhth2) (No at step S307) and the value obtained by subtracting the previous value θh_e' of the end steering angle θh_e from the end steering angle θh_e1 is equal to or larger than the second threshold value θhth2 (θh_e1−θh_e'≥θhth2) (Yes at step S310), the change amount restriction unit 908 adds the second threshold value θhth2 to the previous value θh_e' of the end steering angle θh_e and outputs a result of the addition as the end steering angle θh_e (step S311) and stores the end steering angle θh_e as the previous value θh_e' of the end steering angle θh_e (step S309). Thereafter, the process returns to the processing at step S301 and repeatedly performs the same processing.

When the absolute value of the difference value between the end steering angle θh_e1 and the previous value θh_e' of the end steering angle θh_e is equal to or larger than the second threshold value θhth2 (|θh_e1−θh_e'|≥θhth2) (No at step S307) and the value obtained by subtracting the previous value θh_e' of the end steering angle θh_e from the end steering angle θh_e1 is smaller than the second threshold value θhth2 (θh_e1−θh_e'<θhth2) (No at step S310), in other words, when θh_e1−θh_e'<(−θhth2) is satisfied, the change amount restriction unit 908 subtracts the second threshold value θhth2 from the previous value θh_e' of the end steering angle θh_e and outputs a result of the subtraction as the end steering angle θh_e (step S312) and stores the end steering angle θh_e as the previous value θh_e' of the end steering angle θh_e (step S309). Thereafter, the process returns to the processing at step S301 and repeatedly performs the same processing.

With processing in the first example of the processing at the end steering angle calculation unit according to the fourth embodiment described above, change of the end steering angle θh_e1 is restricted when the absolute value |θh| of the steering angle θh is equal to or larger than the predetermined first threshold value θhth1 (|θh|≥θhth1). Accordingly, it is possible to prevent change of the turning angle of the tires due to change of the vehicle speed in a large rudder angle region in which the change ratio is relatively large, thereby reducing discomfort on steering feeling of the driver. In addition, when the change amount of the end steering angle θh_e1 is equal to or larger than a predetermined value, the end steering angle θh_e is set to be a value obtained by adding or subtracting the predetermined value to or from the previous value θh_e' of the end steering angle θh_e. Accordingly, the temporal change amount of the turning ratio gain G is restricted. Thus, it is possible to prevent abrupt change of behavior of the vehicle along with abrupt change of the turning angle, thereby reducing discomfort on steering feeling of the driver.

Figure 64:
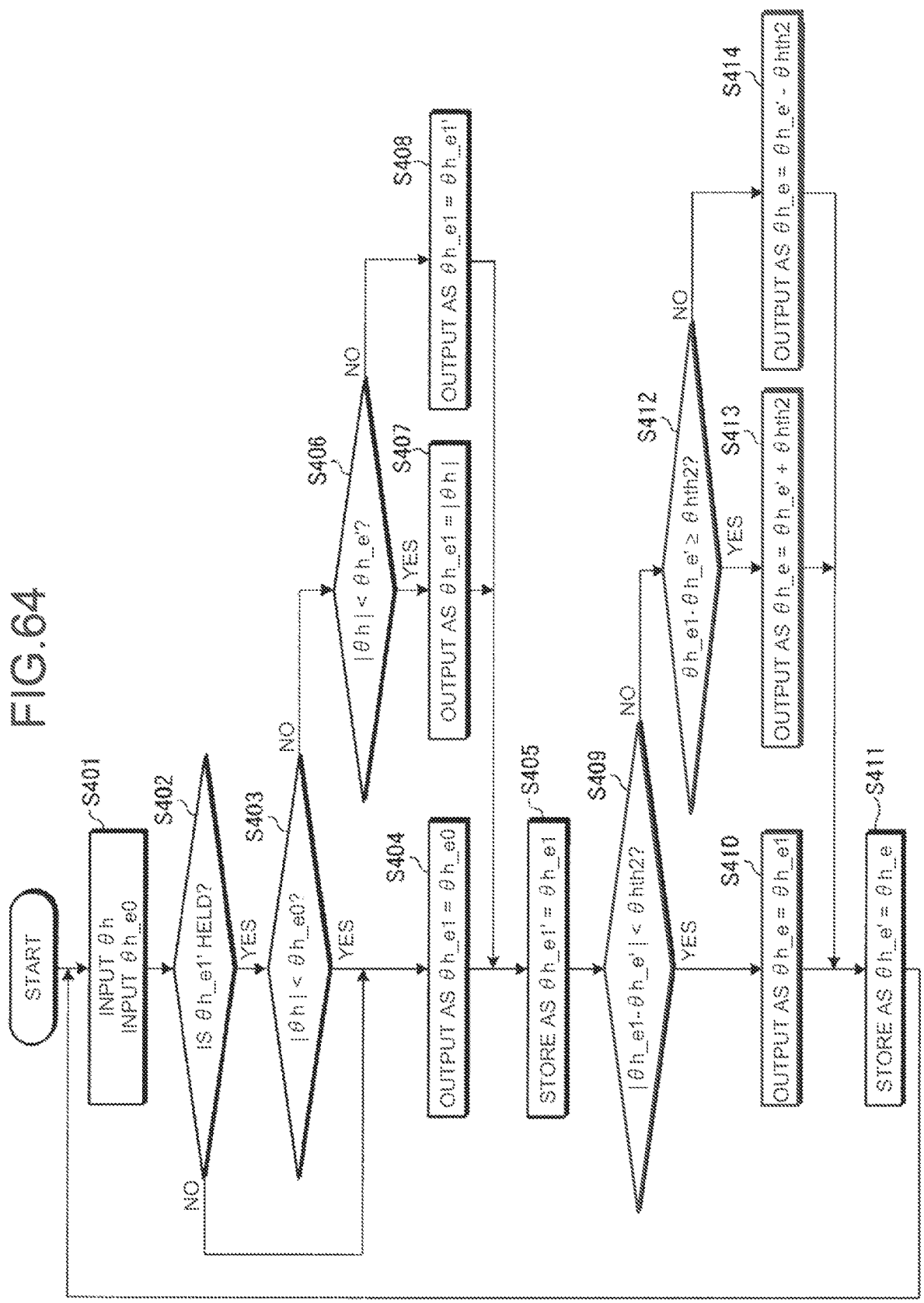
FIG. 64 is a flowchart illustrating processing at the end steering angle calculation unit and a second example of the change amount restriction unit according to the fourth embodiment.

FIG. 64 is a flowchart illustrating the processing at the end steering angle calculation unit according to the fourth embodiment and a second example of the change amount restriction unit. When the steering angle θh and the basic end steering angle θh_e0 are input (step S401), the end steering angle calculation unit 907a determines whether the end steering angle calculation unit 907a holds the previous value θh_e1' of the end steering angle θh_e1 (step S402). When the end steering angle calculation unit 907a holds the previous value θh_e1' of the end steering angle θh_e1 (Yes at step S402), the end steering angle calculation unit 907a determines whether the absolute value |θh| of the steering angle θh is smaller than the basic end steering angle θh_e0 (|θh|<θh_e0) (step S403).

When the absolute value |θh| of the steering angle θh is smaller than the basic end steering angle θh_e0 (|θh|<θh_e0) (Yes at step S403), the end steering angle calculation unit 907a outputs the basic end steering angle θh_e0 as the end steering angle θh_e1 (step S404) and stores the end steering angle θh_e1 as the previous value θh_e1' of the end steering angle θh_e1 (step S405). When the absolute value |θh| of the steering angle θh is equal to or larger than the basic end steering angle θh_e0 (|θh|≥θh_e0) (No at step S403), the end steering angle calculation unit 907a determines whether the absolute value |θh| of the steering angle θh is smaller than the previous value θh_e' of the end steering angle θh_e (|θh|<θh_e') (step S406). When the absolute value |θh| of the steering angle θh is smaller than the previous value θh_e' of the end steering angle θh_e (|θh|<θh_e') (Yes at step S406), the end steering angle calculation unit 907a outputs the absolute value |θh| of the steering angle θh as the end steering angle θh_e1 (step S404) and stores the end steering angle θh_e1 as the previous value θh_e1' of the end steering angle θh_e1 (step S405). When the absolute value |θh| of the steering angle θh is equal to or larger than the previous value θh_e' of the end steering angle θh_e (|θh|≥θh_e') (No at step S406), the end steering angle calculation unit 907a outputs the previous value θh_e1' of the end steering angle θh_e1 as the end steering angle θh_e1

(step S408) and stores the end steering angle θh_e1 as the previous value θh_e1' of the end steering angle θh_e1 (step S405).

In the second example of the processing at the end steering angle calculation unit 907a and the change amount restriction unit 908 according to the fourth embodiment illustrated in FIG. 64, processing at steps S409 to S414 is same as the processing at steps S307 to S312 in the first example of the processing at the end steering angle calculation unit 907a and the change amount restriction unit 908 according to the fourth embodiment described above.

With processing in the second example of the processing at the end steering angle calculation unit 907a and the change amount restriction unit 908 according to the fourth embodiment described above, change of the end steering angle θh_e1 is restricted in a region in which the absolute value |θh| of the steering angle θh is equal to or larger than the basic end steering angle θh_e0. Accordingly, it is possible to prevent change of the end steering angle along with change of the vehicle speed Vs, thereby reducing discomfort on steering feeling of the driver. In addition, when the change amount of the end steering angle θh_e1 is equal to or larger than a predetermined value, the end steering angle θh_e is set to be a value obtained by adding or subtracting the predetermined value to or from the previous value θh_e' of the end steering angle θh_e. Accordingly, the temporal change amount of the turning ratio gain G is restricted. Thus, it is possible to prevent abrupt change of behavior of the vehicle along with abrupt change of the turning angle, thereby reducing discomfort on steering feeling of the driver.

As described above, the vehicle steering device (SBW system) according to the fourth embodiment includes the end steering angle map 906 in which the basic end steering angle θh_e0 in accordance with the vehicle speed Vs of the vehicle is set, the end steering angle calculation unit 907a configured to calculate the end steering angle θh_e1 based on the steering angle θh and the basic end steering angle θh_e0, and the change amount restriction unit 908 configured to restrict the end steering angle θh_e1 and output the end steering angle θh_e to the end target steering torque generation unit 901 and the turning ratio gain calculation unit 905. Accordingly, it is possible to reduce discomfort on steering feeling of the driver due to variation of the vehicle speed Vs of the vehicle and the steering angle θh. In addition, it is possible to prevent abrupt change of behavior of the vehicle along with abrupt change of the turning angle, thereby reducing discomfort on steering feeling of the driver.

Note that, although the example in which the change amount of the end steering angle θh_e1 is restricted is described above in the fourth embodiment, the change rate of the end steering angle θh_e1 may be restricted or the difference rate of the end steering angle θh_e1 may be restricted. In addition, the drawings used in the above description are conceptual diagrams for performing qualitative description of the present disclosure, and the present disclosure is not limited to these drawings. The above-described embodiments are preferable examples of the present disclosure, but not limited thereto, and may be modified in various manners without departing from the scope of the present disclosure.

Technological ideas that solve the problem related to the second background art will be described below.

(1) A vehicle steering device including: a reaction force device configured to apply steering reaction force to a wheel; a drive device configured to turn tires in accordance with steering of the wheel; and a control unit configured to control the reaction force device and the drive device, in which: the control unit includes a target steering torque generation unit configured to generate target steering torque as a target value of steering torque, and an end target steering torque generation unit configured to generate, based on the steering angle of the wheel and an end steering angle corresponding to a maximum turning angle, a first torque signal that is zero in a region in which the absolute value of the steering angle of the wheel is smaller than the end steering angle and that increases from zero at a predetermined change rate in a region in which the absolute value of the steering angle is equal to or larger than the end steering angle; and the target steering torque generation unit generates a second torque signal based on a predetermined basic map in accordance with at least the vehicle speed of a vehicle and the steering angle and generates the target steering torque by adding the first torque signal to the second torque signal.

(2) The vehicle steering device described in (1), in which: the second torque signal increases along a curve having a change rate gradually decreasing as at least the absolute value of the steering angle increases, and the change rate of the first torque signal in the region in which the absolute value of the steering angle is equal to or larger than the end steering angle is larger than the maximum change rate of the second torque signal.

(3) The vehicle steering device described in (1) or (2), in which: the end target steering torque generation unit generates the first torque signal by using Expression (1) below when Tref_e represents the first torque signal, θh represents the steering angle, θh_e represents the end steering angle, and Ke represents a coefficient that determines the gradient of the first torque signal in the region in which the absolute value of the steering angle is equal to or larger than the end steering angle.

$$Tref\_e = Ke \times \max(0, (|\theta h| - \theta h\_e)) \times \text{sign}(\theta h) \qquad (1)$$

(4) The vehicle steering device described in any one of (1) to (3), in which: the control unit includes an end steering angle setting unit configured to set the end steering angle in accordance with at least the vehicle speed, and a turning ratio gain calculation unit configured to calculate a turning ratio gain by which the steering angle is multiplied to generate a target turning angle of the tires based on the end steering angle.

(5) The vehicle steering device described in (4), in which: the turning ratio gain calculation unit generates the turning ratio gain by using Expression (2) below when G represents the turning ratio gain, θh represents the steering angle, θh_e represents the end steering angle, θt_max represents the maximum turning angle, and Kt represents a reference value of the turning ratio gain.

$$G = (\theta t\_\max / Kt) / \theta h\_e \qquad (2)$$

(6) The vehicle steering device described in (4) or (5), in which: when a first region is defined to be a region in which the vehicle speed of the vehicle is equal to or higher than a first vehicle speed, a second region is defined to be a region in which the vehicle speed of the vehicle is equal to or higher than a third vehicle speed lower than the first vehicle speed and lower than the first vehicle speed, and a third region is defined to be a region in which the vehicle speed of the vehicle is equal to or higher than zero and lower than the third vehicle speed, the end steering angle setting unit sets the end steering angle in the third region to be a value smaller than the end steering angle in the first region.

(7) The vehicle steering device described in (6), in which: the end steering angle setting unit sets the end steering angle in the first region to be a constant value, sets the end steering angle in the third region to be a constant value different from the end steering angle in the first region, and sets the end steering angle in the second region to be a value gradually decreasing in a range from the end steering angle in the first region to the end steering angle in the third region.

(8) The vehicle steering device described in any one of (4) to (7), in which: the end steering angle setting unit includes an end steering angle map in which a basic end steering angle in accordance with the vehicle speed of the vehicle is set, and an end steering angle calculation unit configured to calculate the end steering angle based on the steering angle and the basic end steering angle.

(9) The vehicle steering device described in (8), in which: the end steering angle calculation unit outputs the basic end steering angle when the absolute value of the steering angle is smaller than a predetermined first threshold value, and outputs the previous value of the end steering angle when the absolute value of the steering angle is equal to or larger than the first threshold value.

(10) The vehicle steering device described in (8), in which: the end steering angle calculation unit outputs the basic end steering angle when the absolute value of the steering angle is smaller than the basic end steering angle, outputs the absolute value of the steering angle when the absolute value of the steering angle is equal to or larger than the basic end steering angle and the absolute value of the steering angle is smaller than the previous value of the end steering angle, and outputs the previous value of the end steering angle when the absolute value of the steering angle is equal to or larger than the basic end steering angle and the absolute value of the steering angle is equal to or larger than the previous value of the end steering angle.

(11) The vehicle steering device described in (8), in which: the end steering angle setting unit further includes a change amount restriction unit configured to restrict the change amount of the end steering angle; the end steering angle calculation unit outputs the basic end steering angle when the absolute value of the steering angle is smaller than a predetermined first threshold value, and outputs the previous value of the end steering angle when the absolute value of the steering angle is equal to or larger than the first threshold value; and the change amount restriction unit outputs the end steering angle when the absolute value of the difference value between the end steering angle and the previous value of the end steering angle is smaller than a predetermined second threshold value, adds the second threshold value to the previous value of the end steering angle and outputs a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, or subtracts the second threshold value from the previous value of the end steering angle and outputs a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value.

(12) The vehicle steering device described in (8), in which: the end steering angle setting unit further includes a change amount restriction unit configured to restrict the change amount of the end steering angle; the end steering angle calculation unit outputs the basic end steering angle when the absolute value of the steering angle is smaller than the basic end steering angle, outputs the absolute value of the steering angle when the absolute value of the steering angle is equal to or larger than the basic end steering angle and the absolute value of the steering angle is smaller than the previous value of the end steering angle, and outputs the previous value of the end steering angle when the absolute value of the steering angle is equal to or larger than the basic end steering angle and the absolute value of the steering angle is equal to or larger than the previous value of the end steering angle; and the change amount restriction unit outputs the end steering angle when the absolute value of the difference value between the end steering angle and the previous value of the end steering angle is smaller than a predetermined second threshold value, adds the second threshold value to the previous value of the end steering angle and outputs a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, or subtracts the second threshold value from the previous value of the end steering angle and outputs a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value.

REFERENCE SIGNS LIST

Reference Signs List Related to FIGS. 1 to 10

1 wheel
2 column shaft
3 deceleration mechanism
5 pinion rack mechanism
6a, 6b tie rod
7a, 7b hub unit
8L, 8R steering wheel
10 torque sensor
11 ignition key
12 vehicle speed sensor
13 battery
14 rudder angle sensor
50 control unit (ECU)
60 reaction force device
61 reaction force motor
70 drive device
71 drive motor
72 gear
73 angle sensor
130 current control unit
140 motor current detector
200 target steering torque generation unit
300 twist angle control unit
310 twist angle feedback (FB) compensation unit
320 twist angular velocity calculation unit
330 speed control unit
331 integral unit
332 proportional unit 333, 334 subtraction unit
340 stabilization compensation unit
350 output restriction unit
361 subtraction unit
362 addition unit
500 conversion unit
900 turning ratio map unit
910 target turning angle generation unit
920 turning angle control unit
921 turning angle feedback (FB) compensation unit
922 turning angular velocity calculation unit
923 speed control unit
926 output restriction unit
927 subtraction unit
930 current control unit
931 restriction unit
933 correction unit
932 rate restriction unit
940 motor current detector
1001 CPU
1005 interface
1006 A/D converter
1007 PWM controller
1100 control computer (MCU)

Reference Signs List Related to FIGS. 10 to 38

1 wheel
2 column shaft
2A torsion bar
3 deceleration mechanism
4a, 4b universal joint
5 pinion rack mechanism
6a, 6b tie rod
7a, 7b hub unit
8L, 8R steering wheel
10 torque sensor
11 ignition key
12 vehicle speed sensor
13 battery
14 rudder angle sensor
15 low-speed driving mode sensing unit (determination unit)
20 motor
30, 30a, 50 control unit (ECU)
60 reaction force device
61 reaction force motor
70 drive device
71 drive motor
72 gear
73 angle sensor
100 EPS steering system/vehicle system
130 current control unit
140 motor current detector
200, 201, 202 target steering torque generation unit
210 basic map unit
211 multiplication unit
213 sign extraction unit
220 differential unit
230 damper gain map unit
240 hysteresis correction unit
250 SAT information correction unit
251 SAT calculation unit
251A conversion unit
251B angular velocity calculation unit
251C angular acceleration calculation unit
251D, 251E, 251F block
251H, 251I, 251J adder
252 filter unit
253 steering torque sensitive gain unit
254 vehicle speed sensitive gain unit
255 rudder angle sensitive gain unit
256 restriction unit
260, 264 multiplication unit
261, 262, 265 addition unit
280 steering reaction force correction unit
281 correction gain generation unit
282 correction torque map
283 sign extraction unit
284 multiplication unit
300, 300a twist angle control unit
310 twist angle feedback (FB) compensation unit
320 twist angular velocity calculation unit
330 speed control unit
331 integral unit
332 proportional unit
333, 334 subtraction unit
340 stabilization compensation unit
350 output restriction unit
360 rudder angle disturbance compensation unit
361 subtraction unit
362, 363 addition unit
370 speed reduction ratio unit
400 steering direction determination unit
500 conversion unit
910 target turning angle generation unit
920 turning angle control unit
921 turning angle feedback (FB) compensation unit
922 turning angular velocity calculation unit
923 speed control unit
926 output restriction unit
927 subtraction unit
930 current control unit
931 restriction unit
933 correction unit
932 rate restriction unit
940 motor current detector
1001 CPU
1005 interface
1006 A/D converter
1007 PWM controller
1100 control computer (MCU)

Reference Signs List Related to FIGS. 39 to 68

1 wheel
2 column shaft
3 deceleration mechanism
5 pinion rack mechanism
6a, 6b tie rod
7a, 7b hub unit
8L, 8R steering wheel
10 torque sensor
11 ignition key
12 vehicle speed sensor
13 battery
14 rudder angle sensor
50 control unit (ECU)
60 reaction force device
61 reaction force motor
70 drive device
71 drive motor
72 gear
73 angle sensor 130 current control unit
140 motor current detector
200 target steering torque generation unit
210 basic map unit
211 multiplication unit
213 sign extraction unit
220 differential unit
230 damper gain map unit
240 hysteresis correction unit
260 multiplication unit
261, 262, 263 addition unit
300 twist angle control unit
310 twist angle feedback (FB) compensation unit
320 twist angular velocity calculation unit
330 speed control unit
331 integral unit
332 proportional unit
333, 334 subtraction unit
340 stabilization compensation unit
350 output restriction unit
361 subtraction unit
362 addition unit
500 conversion unit
900, 900a, 900b, 900c steering end control unit
901 end target steering torque generation unit
904, 904a, 904b end steering angle setting unit
905 turning ratio gain calculation unit
906, 906a end steering angle map
907, 907a end steering angle calculation unit
908 change amount restriction unit
910 target turning angle generation unit
920 turning angle control unit
921 turning angle feedback (FB) compensation unit
922 turning angular velocity calculation unit
923 speed control unit
926 output restriction unit
927 subtraction unit
930 current control unit
931 restriction unit
932 rate restriction unit
933 correction unit
940 motor current detector
1001 CPU
1005 interface
1006 A/D converter
1007 PWM controller
1100 control computer (MCU)

The invention claimed is:

1. A vehicle steering device comprising:
a reaction force device configured to apply steering reaction force to a wheel;
a drive device configured to turn tires in accordance with steering of the wheel; and
a control unit configured to control the reaction force device and the drive device, wherein
the control unit includes
  a turning ratio map unit configured to set a turning ratio gain in accordance with a vehicle speed of a vehicle, and
  a target turning angle generation unit configured to generate a target turning angle by multiplying a steering angle of the wheel by the turning ratio gain,
the turning ratio gain at backward traveling of the vehicle is equal to or larger than the turning ratio gain at forward traveling of the vehicle,
when a first region is defined to be a region in which the magnitude of the vehicle speed at forward traveling of the vehicle is equal to or larger than zero and smaller than a first vehicle speed, a first gain being defined to be the turning ratio gain in the first region,
a second region is defined to be a region in which the magnitude of the vehicle speed at forward traveling of the vehicle is equal to or larger than the first vehicle speed and smaller than a second vehicle speed higher than the first vehicle speed, a second gain being defined to be the turning ratio gain in the second region,
a third region is defined to be a region in which the magnitude of the vehicle speed at forward traveling of the vehicle is equal to or larger than the second vehicle speed, a third gain being defined to be the turning ratio gain in the third region,
a fourth region is defined to be a region in which the magnitude of the vehicle speed at backward traveling of the vehicle is larger than zero and smaller than a third vehicle speed, a fourth gain being defined to be the turning ratio gain in the fourth region,
a fifth region is defined to be a region in which the magnitude of the vehicle speed at backward traveling of the vehicle is equal to or larger than the third vehicle speed and smaller than a fourth vehicle speed higher than the third vehicle speed, a fifth gain being defined to be the turning ratio gain in the fifth region, and
a sixth region is defined to be a region in which the magnitude of the vehicle speed at backward traveling of the vehicle is equal to or larger than the fourth vehicle speed, a sixth gain being defined to be the turning ratio gain in the sixth region,
the fourth gain is a constant value larger than the first gain, the second gain, the third gain, the fifth gain, and the sixth gain.

2. The vehicle steering device according to claim 1, wherein
the third gain is a constant value,
the first gain is a constant value larger than the third gain and smaller than the fourth gain, and
the second gain gradually decrease in a range from the first gain to the third gain as the magnitude of the vehicle speed at forward traveling of the vehicle increases from the first vehicle speed.

3. The vehicle steering device according to claim 1, wherein
the third gain is a constant value,
the sixth gain be a constant value equal to or larger than the third gain and smaller than the fourth gain, and
the fifth gain gradually decrease in a range from the fourth gain to the sixth gain as the magnitude of the vehicle speed at backward traveling of the vehicle increases from the third vehicle speed.

4. A vehicle steering device comprising:
a reaction force device configured to apply steering reaction force to a wheel;
a drive device configured to turn tires in accordance with steering of the wheel; and
a control unit configured to control the reaction force device and the drive device, wherein
the control unit comprises:
a target steering torque generation unit configured to generate target steering torque as a target value of steering torque; and
an end target steering torque generation unit configured to generate, based on the steering angle of the wheel and an end steering angle corresponding to a maximum turning angle, a first torque signal that is zero in a region in which the absolute value of the steering angle of the wheel is smaller than the end steering angle and that increases from zero at a predetermined change rate in a region in which the absolute value of the steering angle is equal to or larger than the end steering angle, and the target steering torque generation unit generates a second torque signal based on a predetermined basic map in accordance with at least the vehicle speed of a vehicle and the steering angle and generates the target steering torque by adding the first torque signal to the second torque signal, wherein the end target steering torque generation unit generates the first torque signal by using Expression (1) below when Tref_e represents the first torque signal, θh represents the steering angle, θh_e represents the end steering angle, and Ke represents a coefficient that determines the gradient of the first torque signal in the region in which the absolute value of the steering angle is equal to or larger than the end steering angle, $$Tref\_e = Ke \times \max(0, (|\theta h| - \theta h\_e)) \times \text{sign}(\theta h) \quad (1).$$

5. The vehicle steering device according to claim 4, wherein the second torque signal increases along a curve having a change rate gradually decreasing as at least the absolute value of the steering angle increases, and the change rate of the first torque signal in a region in which the absolute value of the steering angle is equal to or larger than the end steering angle is larger than a maximum change rate of the second torque signal.

6. The vehicle steering device according to claim 4, wherein the control unit comprises:

an end steering angle setting unit configured to set the end steering angle in accordance with at least the vehicle speed; and a turning ratio gain calculation unit configured to calculate a turning ratio gain by which the steering angle is multiplied to generate a target turning angle of the tires based on the end steering angle.

7. The vehicle steering device according to claim 6, wherein the turning ratio gain calculation unit generates the turning ratio gain by using Expression (2) below when G represents the turning ratio gain, θh represents the steering angle, θh_e represents the end steering angle, θt_max represents the maximum turning angle, and Kt represents a reference value of the turning ratio gain, $$G = (\theta t\_\max / Kt) / \theta h\_e \quad (2).$$

8. The vehicle steering device according to claim 6, wherein when a first region is defined to be a region in which the vehicle speed of the vehicle is equal to or higher than a first vehicle speed, a second region is defined to be a region in which the vehicle speed of the vehicle is equal to or higher than a third vehicle speed lower than the first vehicle speed and is lower than the first vehicle speed, and a third region is defined to be a region in which the vehicle speed of the vehicle is equal to or higher than zero and lower than the third vehicle speed, the end steering angle setting unit sets the end steering angle in the third region to be a value smaller than the end steering angle in the first region.

9. The vehicle steering device according to claim 8, wherein the end steering angle setting unit sets the end steering angle in the first region to be a constant value, sets the end steering angle in the third region to be a constant value different from the end steering angle in the first region, and sets the end steering angle in the second region to be a value gradually decreasing in a range from the end steering angle in the first region to the end steering angle in the third region.

10. The vehicle steering device according to claim 6, wherein the end steering angle setting unit comprises:

an end steering angle map in which a basic end steering angle in accordance with the vehicle speed of the vehicle is set; and an end steering angle calculation unit configured to calculate the end steering angle based on the steering angle and the basic end steering angle.

11. The vehicle steering device according to claim 10, wherein the end steering angle calculation unit outputs the basic end steering angle when the absolute value of the steering angle is smaller than a predetermined first threshold value, and outputs a previous value of the end steering angle when the absolute value of the steering angle is equal to or larger than the first threshold value.

12. The vehicle steering device according to claim 10, wherein the end steering angle calculation unit outputs the basic end steering angle when the absolute value of the steering angle is smaller than the basic end steering angle, outputs the absolute value of the steering angle when the absolute value of the steering angle is equal to or larger than the basic end steering angle and the absolute value of the steering angle is smaller than a previous value of the end steering angle, and outputs the previous value of the end steering angle when the absolute value of the steering angle is equal to or larger than the basic end steering angle and the absolute value of the steering angle is equal to or larger than the previous value of the end steering angle.

13. The vehicle steering device according to claim 10, wherein the end steering angle setting unit further comprises a change amount restriction unit configured to restrict the change amount of the end steering angle, the end steering angle calculation unit outputs the basic end steering angle when the absolute value of the steering angle is smaller than a predetermined first threshold value, and outputs a previous value of the end steering angle when the absolute value of the steering angle is equal to or larger than the first threshold value, and the change amount restriction unit outputs the end steering angle when the absolute value of the difference value between the end steering angle and the previous value of the end steering angle is smaller than a predetermined second threshold value, adds the second threshold value to the previous value of the end steering angle and outputs a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, and subtracts the second threshold value from the previous value of the end steering angle and outputs a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value.

14. The vehicle steering device according to claim 10, wherein the end steering angle setting unit further comprises a change amount restriction unit configured to restrict the change amount of the end steering angle, the end steering angle calculation unit outputs the basic end steering angle when the absolute value of the steering angle is smaller than the basic end steering angle, outputs the absolute value of the steering angle when the absolute value of the steering angle is equal to or larger than the basic end steering angle and the absolute value of the steering angle is smaller than a previous value of the end steering angle, and outputs the previous value of the end steering angle when the absolute value of the steering angle is equal to or larger than the basic end steering angle and the absolute value of the steering angle is equal to or larger than the previous value of the end steering angle, and the change amount restriction unit outputs the end steering angle when the absolute value of the difference value between the end steering angle and the previous value of the end steering angle is smaller than a predetermined second threshold value, adds the second threshold value to the previous value of the end steering angle and outputs a result of the addition when the absolute value of the difference value between the end steering angle and the previous value of the end steering angle is equal to or larger than the second threshold value and a value obtained by subtracting the previous value of the end steering angle from the end steering angle is equal to or larger than the second threshold value, and subtracts the second threshold value from the previous value of the end steering angle and outputs a result of the subtraction when the absolute value of the difference value between the end steering angle and the previous value of the end steering angle is equal to or larger than the second threshold value and the value obtained by subtracting the previous value of the end steering angle from the end steering angle is smaller than the second threshold value.

* * * * *